May 2, 1961 D. C. EVANS 2,982,470

DIGITAL DIFFERENTIAL ANALYZERS

Filed March 1, 1954 16 Sheets-Sheet 1

INVENTOR.
DAVID C. EVANS
BY Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 2

INVENTOR.
DAVID C. EVANS

BY Ellsworth R. Roston

ATTORNEY

May 2, 1961 D. C. EVANS 2,982,470

DIGITAL DIFFERENTIAL ANALYZERS

Filed March 1, 1954 16 Sheets-Sheet 3

INVENTOR.

DAVID C. EVANS

BY Ellsworth R. Roston

ATTORNEY

INVENTOR.
DAVID C. EVANS
BY
Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 5

INVENTOR.
DAVID C. EVANS

BY

Ellsworth R. Roston

ATTORNEY

May 2, 1961 D. C. EVANS 2,982,470

DIGITAL DIFFERENTIAL ANALYZERS

Filed March 1, 1954 16 Sheets-Sheet 6

INVENTOR.
DAVID C. EVANS
BY
Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 7

INVENTOR.
DAVID C. EVANS
BY
Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 8

INVENTOR.
DAVID C. EVANS
BY
Ellsworth R. Roston
ATTORNEY

INVENTOR.
DAVID C. EVANS
BY
Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 10

INVENTOR.
DAVID C. EVANS
BY
Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 11

INVENTOR.
DAVID C. EVANS
BY
Ellsworth R. Roston
ATTORNEY

INVENTOR.
DAVID C. EVANS
BY
Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 13

INVENTOR.
DAVID C. EVANS
BY
Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 14

INVENTOR.
DAVID C. EVANS
BY
Ellsworth R. Roston
ATTORNEY

INVENTOR.
DAVID C. EVANS
BY
Ellsworth R. Roston
ATTORNEY

May 2, 1961 D. C. EVANS 2,982,470

DIGITAL DIFFERENTIAL ANALYZERS

Filed March 1, 1954 16 Sheets-Sheet 16

$Y_1$ LOGIC FOR MADDIDA 22
TRANSCRIPTION OF U of U TAPE INPUT

| | $M_4$ | $M_3$ | $M_2$ | $M_1$ | $F_6$ | $F_5$ | $F_4$ | $F_3$ | $F_2$ | $F_1$ | PULSE TIME |
|---|---|---|---|---|---|---|---|---|---|---|---|
| 1 | 0 | 0 | 0 | 0 | 1 | 0 | 1 | 1 | 1 | 1 | 32 |
| 2 | 0 | 0 | 0 | 1 | 1 | 1 | 0 | 0 | 0 | 0 | 33 |
| 3 | 0 | 0 | 1 | 0 | 1 | 1 | 0 | 0 | 0 | 1 | 34 |
| 4 | 0 | 0 | 1 | 1 | 1 | 1 | 0 | 0 | 1 | 0 | 35 |
| 5 | 0 | 1 | 0 | 0 | 1 | 1 | 0 | 0 | 1 | 1 | 36 |
| 6 | 0 | 1 | 0 | 1 | 1 | 1 | 0 | 1 | 0 | 0 | 37 |
| 7 | 0 | 1 | 1 | 0 | 1 | 1 | 0 | 1 | 0 | 1 | 38 |
| 8 | 0 | 1 | 1 | 1 | 1 | 1 | 0 | 1 | 1 | 0 | 39 |
| 9 | 1 | 0 | 0 | 0 | 1 | 1 | 0 | 1 | 1 | 1 | 40 |
| 10 | 1 | 0 | 0 | 1 | 1 | 1 | 1 | 0 | 0 | 0 | 41 |
| 11 | 1 | 0 | 1 | 0 | 1 | 1 | 1 | 0 | 0 | 1 | 42 |
| 12 | 1 | 0 | 1 | 1 | 1 | 1 | 1 | 0 | 1 | 0 | 43 |
| 13 | 1 | 1 | 0 | 0 | 1 | 1 | 1 | 0 | 1 | 1 | 44 |
| 14 | 1 | 1 | 0 | 1 | 1 | 1 | 1 | 1 | 0 | 0 | 45 |
| 15 | 1 | 1 | 1 | 0 | 1 | 1 | 1 | 1 | 0 | 1 | 46 |
| 16 | 1 | 1 | 1 | 1 | 1 | 1 | 1 | 1 | 1 | 0 | 47 |

FIG. 19

INVENTOR.
DAVID C. EVANS
BY
Ellsworth R. Roston
ATTORNEY

United States Patent Office 2,982,470
Patented May 2, 1961

2,982,470

DIGITAL DIFFERENTIAL ANALYZERS

David C. Evans, Los Angeles, Calif., assignor to The University of Utah, Salt Lake City, Utah Filed Mar. 1, 1954, Ser. No. 413,058

5 Claims. (Cl. 235—61.6)

This invention relates to digital differential analyzers and more particularly to apparatus for operating in conjunction with an analyzer to introduce empirical information to the analyzer for utilization by the analyzer. The invention also relates to apparatus for operating in conjunction with an analyzer to provide a permanent record of any particular quantity during and at the end of a computation.

In U.S. Patent 2,900,134 issued to Floyd G. Steele and William S. Collison, a digital differential analyzer is disclosed for solving complex differential problems by digital steps. The analyzer has the advantages of both digital computers and differential analyzers. The analyzer obtains the advantages of differential analyzers in that it is relatively simple in construction. The analyzer also has the advantage of digital computers in its speed and accuracy of operation. By combining these advantages, a computer is obtained which is able to solve complex differential equations even though it is housed in a cabinet smaller than a desk.

Since the analyzer operates on a differential basis, it has a plurality of integrators which are interconnected in a particular manner in accordance with a mathematical problem which has to be solved. Because of these interconnections, quantities which are obtained by one integrator are introduced to other integrators to vary the quantities in these other integrators. Sometimes, however, it is necessary to introduce to an integrator empirical information which cannot be represented by a differential equation or in differential form.

This invention provides apparatus for operating in conjunction with a digital differential analyzer to introduce empirical information periodically and in digital form to the analyzer. The apparatus includes components for synchronizing its operation with that of the analyzer so that the empirical information is introduced to the analyzer at the appropriate times. The invention also includes apparatus for periodically withdrawing information relating to a particular quantity computed by the analyzer so as to provide a permanent record of the manner in which the quantity varies during the solution of a problem.

An object of this invention is to provide a digital differential analyzer which operates in digital steps to obtain a solution of complex differential problems.

Another object is to provide an analyzer of the above character which includes apparatus for introducing empirical information to the analyzer so as to increase the range of problems which can be solved by the analyzer.

A further object is to provide an analyzer of the above character which operates to receive empirical information periodically and in digital form from a permanent record such as a tape so as to solve differential problems defined at least in part by such empirical information.

Still another object is to provide apparatus for operating in conjunction with a digital differential analyzer to provide a continuous record in permanent form of the value of a quantity computed by the analyzer.

A still further object is to provide a method of introducing empirical information to an analyzer for utilization by the analyzer during the solution of a problem and of withdrawing computed information from the analyzer during the solution of the problem.

Other objects and advantages will be apparent from a detailed description of the invention and from the appended drawings and claims.

In the drawings:

Figures 6, 7 and 8 are schematic diagrams, partly in block form and partly in perspective, illustrating in some detail the cooperative relationship between certain of the electrical features and certain of the mechanical features constituting the invention;

Figure 19 is a chart illustrating the operation of certain of the components shown in Figure 5.

Figure 1:
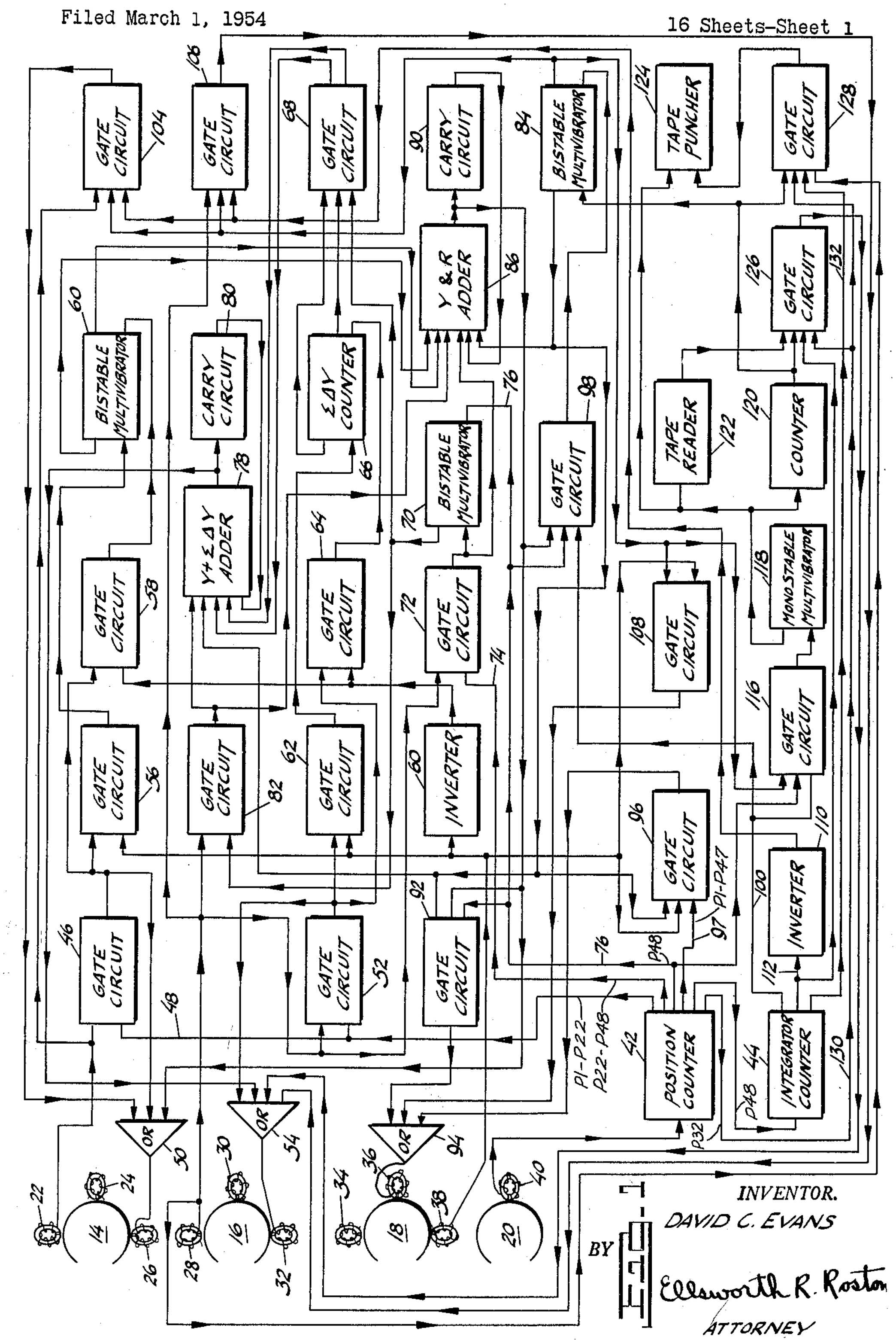
Figure 1 is a simplified block diagram which schematically illustrates a digital differential analyzer forming one embodiment of this invention.

A simplified block diagram is shown in Figure 1 of a digital differential analyzer which includes apparatus forming one embodiment of this invention. The analyzer includes a drum 10 (schematically shown in Figures 2 to 6, inclusive) adapted to be rotated by a suitable motor (not shown). A thin coating 12 (Figure 2) of magnetic material is applied to the periphery of the drum. The coating 12 can be considered as being divided into a plurality of annular channels 14, 16, 18 and 20. These channels are shown schematically in Figure 1 in separated relationship for purposes of convenience. Each of the channels is separated by a sufficient distance from its adjacent channel so as to be substantially unaffected by the magnetic information provided in the adjacent channel.

The circumferential distance of each channel may be considered as being divided into a plurality of positions. Each of the positions is sufficiently separated from its adjacent positions to receive a different magnetization than that provided on the adjacent positions. For example, approximately 1,060 equally separated pulse positions may be provided in each channel when the drum has a radius of approximately 4 inches.

A plurality of toroidal coils are positioned adjacent to each of the channels 14, 16, 18 and 20. For example, coils 22, 24 and 26 are provided in contiguous relationship to the channel 14. These channels are shown schematically in Figure 1. Similarly, coils 28, 30 and 32 and coils 34, 36 and 38 are associated with the channels 16 and 18, respectively. A single coil 40 is disposed adjacent the channel 20.

The coils 22 and 26 are effectively separated from each other by approximately 104 pulse positions, and the coil 24 is disposed at an intermediate position between the coils 22 and 26. The coil 26 is adapted to provide electrical signals in a pattern dependent upon the operation of the digital differential analyzer and to induce the corresponding magnetic pattern on the drum 10 as the drum rotates. The pattern induced on the drum 10 by the coil 26 is of the binary form in which a magnetization in one circumferential direction indicates one value and a magnetization in the other direction indicates a second value.

The coil 22 is adapted to pick up the changes in the direction of magnetization in the channel 14 as the drum rotates and to produce corresponding electrical signals. The coil 28 is adapted to produce a substantially constant signal for returning the direction of magnetization on the drum to that representing a value of "0" after the magnetic pattern on the drum has been converted into a corresponding electrical pattern by the coil 22.

The coils 28, 30 and 32 in the channel 16 are separated from one another by distances corresponding to the distances between the coils 22, 24 and 26 and are adapted to perform functions similar to those performed by the coils 22, 24 and 26, respectively. The coils 36 and 38 in the channel 18 effectively separated from the coil 38 by approximately 49 pulse positions during the operation of the analyzer to obtain the solution of a mathematical problem. The coil 36 is disposed between the coils 34 and 38.

The coil 36 is adapted to operate in a manner similar to the coil 38 to convert electrical signals into magnetic signals for recordation in the channel 18. The coil 38 is adapted to produce signals in accordance with the magnetic pattern provided in the channel 18 by the coil 36. The coil 34 is adapted to operate in a manner similar to the coil 24 to produce a "0" direction of magnetization in the channel 18 after the pattern provided by the coil 36 has been utilized by the coil 38.

The coil 40 is adapted to produce an electrical signal approximating a sine wave as each pulse position in the channel 20 moves past the coil. The coil 40 produces sinusoidal electrical signals because of the magnetic pattern permanently provided in the channel 20. This pattern remains constant regardless of the problem to be solved.

A counter 42 is connected to the coil 40 to count the sinusoidal electrical signals in the channel 20 as the drum 10 rotates. The counter 42 may be formed from a plurality of bistable multivibrators connected in cascade arrangement and is adapted to count successive sine signals in a numerical range from "1" to "48." Upon each count of "48," the counter 42 is adapted to return to its initial state for the commencement of a new count. As will be disclosed hereinafter, a new integrator is presented for computation upon the completion of each count of "48."

Similarly, a counter 44 may be formed from a plurality of bistable multivibrators in cascade arrangement. The counter 44 is connected to the counter 42 to count the number of times that a full count is obtained in the counter 42. For example, the counter 44 may count up to 22 full counts in the counter 42 before returning to its initial state for the initiation of a new count. In this way, the counters 42 and 44 divide the drum 10 into 22 integrator sections, each having 48 pulse positions. The construction and operation of the counters 42 and 44 are fully disclosed in U.S. Patent 2,900,134 issued to Floyd G. Steele and William S. Collison. As schematically shown in Figure 1, the output signals induced in the coil 22 are introduced to a gate circuit 46 which also has signals applied to it through a line 48 from the counter 42. The output signals from the gate circuit 46 are in turn applied through an "or" network 50 to the coil 26 for recordation in the channel 14. The systems described herein include two types of logic circuits, "and" gates and "or" networks. In the figures, the "or" networks are shown as triangles while the "and" gates are represented by rectangles. Both of these circuits are used in conjunction with two-state signals. An "and" gate provides a high two-state signal at its output when all its input signals are at a high state, while an "or" network provides a high output when any of its inputs are high. To avoid confusion herein, "and" gates will be referred to hereinafter as simply gates and "or" networks will be referred to as "or" networks. Similarly, a gate circuit 52 receives signals from the coil 28 and through the line 48 from the counter 42. The output terminal of the gate circuit 52 is connected to an input terminal of an "or" network 54 having its output terminal connected to the coil 32.

The output signals from the gate circuit 46 are not only applied to the "or" network 50 but also to gate circuits 56 and 58. The gate circuit 56 also receives signals from the coil 38, and the gate circuit 58 has signals introduced to it from an inverter 60 connected to the coil 38. The output signals from the gate circuits 56 and 58 respectively pass to the grids of the left and right tubes in a bistable multivibrator 60.

Similarly, connections are made to input terminals of a gate circuit 62 from the gate circuit 52 and from the coil 38 and to input terminals of a gate circuit 64 from the gate circuit 52 and the inverter 60. The output terminals of the gate circuits 62 and 64 are connected to a counter 66, which may be formed from a plurality of multivibrators (not shown) in cascade arrangement. The construction and operation of the counter 66 are fully disclosed in U.S. Patent 2,900,134.

The output signals from the counter 66 pass to input terminals of a gate circuit 68, another input terminal of which is connected to the plate of the left tube in a bistable multivibrator 70. The grid of the left tube in the multivibrator 70 receives its voltage from the output terminal of a gate circuit 72 having input terminals connected to the coil 28 and through a line 74 to the counter 42. The grid of the right tube in the multivibrator 70 is connected through a line 76 to the counter 42.

The signals passing through the gate circuit 68 are introduced to input terminals of an adder 78. Another input terminal of the adder 78 receives the signals from a carry circuit 80, the input terminal of which is connected to the output terminal of the adder 78. Signals are also introduced to the adder 78 from a gate circuit 82 having input terminals connected to the coil 28 and to the plate of the left tube in the multivibrator 70. The operation of the adder 78 is controlled by the voltage on the plate of the left tube in a multivibrator 84.

The operation of an adder 86 is also controlled by the voltage on the plate of the left tube in the multivibrator 84. The adder 86 receives for arithmetical combination the signals from the gate circuits 72 and 82. The adder 86 also receives for arithmetical combination the signals from a carry circuit 90, the input terminal of which is connected to the output terminal of the adder. Connections are made from the plates of the left and right tubes in the multivibrator 60 to the adder 86 to control the particular manner in which the different signals are arithmetically combined by the adder. The output from the adder is introduced through the "or" network 50 to the coil 26 for recordation in the channel 14.

The output from the adder 86 passes to a gate circuit 92 having other input terminals connected to the plate of the left tube in the multivibrator 84 and through a line 76 to the counter 42. The signals passing through the gate circuit 92 are applied through an "or" network 94 to the coil 36 for recordation in the channel 18. Signals are also applied to the "or" network 94 from a gate circuit 96, input terminals of which are connected to the coil 38, to the plate of the left tube in the multivibrator 84 and through a line 97 to the counter 42.

In addition to being connected to the gate circuit 92, the output terminal of the adder 86 is connected to an input terminal of a gate circuit 98 having other input terminals connected through the line 76 to the counter 42 and through a line 100 to the counter 44. The signals passing through the gate circuit 98 are introduced to the grid of the right tube in the multivibrator 84. The plate of the right tube in the multivibrator 84 is connected to input terminals of gate circuits 104, 106 and 108 to control the operation of these circuits.

The gate circuit 104 has other input terminals connected to the coil 22 and to an inverter 110 the operation of which is controlled by signals passing through a line 112 from the counter 44. The output signals from the gate circuit 104 are applied through the "or" network 50 to the coil 26 for recordation in the channel 14. Similarly, connections are made to other input terminals of the gate circuit 106 from the coil 28 and the inverter 110 and the output from the gate circuit 106 is introduced to the "or" network 54 for recordation by the coil 32 in the channel 16. The gate circuit 108 has an input terminal connected to the coil 38 as well as to the plate of the right tube in the multivibrator 84. The signals passing through the gate circuit 108 are introduced to the "or" network 94 for recordation by the coil 36 in the channel 18.

The voltage on the plate of the right tube in the multivibrator 84 is also introduced to a gate circuit 116 having other input terminals connected through the line 76 to the counter 42 and through the line 100 to the counter 44. The output from the gate circuit 116 is introduced to the grid of a normally conductive left tube in a monostable multivibrator 118 to trigger the tube into nonconductivity. The plate of the left tube in the multivibrator 118 is connected to a counter 120 which may be formed from a plurality of multivibrators connected in a cascade arrangement to provide only a positive and sequential count. A connection is also made from the plate of the left tube in the multivibrator 118 to a tape reader 122 and a tape puncher 124. The construction and operation of the tape reader 122 and the tape puncher 124 will be disclosed in detail hereafter.

Connections are made from the output terminal of the counter 120 to the grid of the left tube in the multivibrators 84 and to input terminals of gate circuits 126 and 128. The gate circuit 126 has other input terminals connected to the tape reader 122, through a line 130 to the counter 42 and through the line 112 to the counter 44. The output signals from the gate circuit 126 are introduced through the "or" network 54 to the coil 32 for recordation in the channel 16. In addition to being connected to the counter 120, input terminals of the gate circuit 128 are connected to the coil 28, through the line 130 to the counter 42 and through a line 132 to the counter 44. The output signals from the gate circuit 128 operate the tape puncher 124 to provide a permanent record of the information represented by the signals.

The digital differential analyzer disclosed above in simplified form is adapted to provide the solution of differential equations. For example, it may provide the solution of the problem of evaluating the integral of a general equation $y=f(x)$ so as to obtain a function $\int y dx=\int f(x) dx$, where $f(x)$ represents a function of $x$ and $\int f(x) dx$ represents the integral of the function. If a curve $y=f(x)$ is plotted with $x$ as the abscissa and $y$ as the ordinate, the analyzer obtains the relationship $\int y dx=\int f(x) dx$ by computing the area under the curve $y=f(x)$. By determinining the area under the curve $y=f(x)$, the analyzer performs electronically operations which may sometimes be performed mentally by a skilled mathematician when the problem to be solved is relatively simple.

Figure 13:
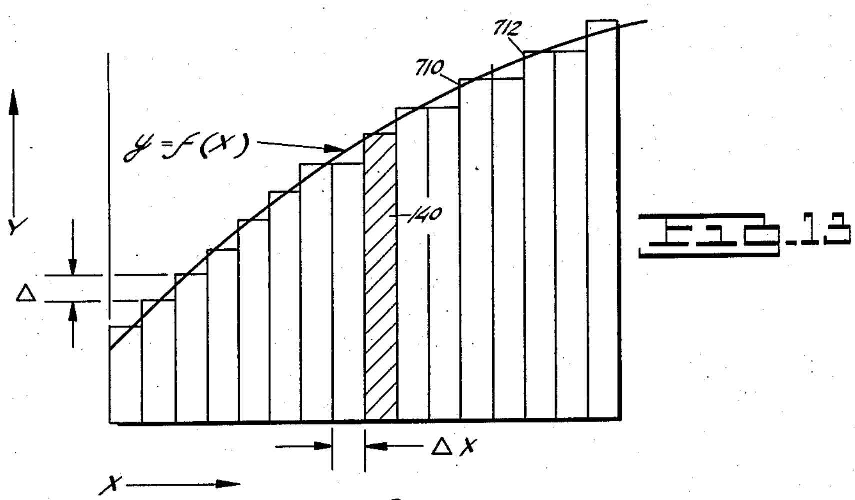
Figure 13 is a curve illustrating the operation of an integrator such as the integrator shown in Figure 12.

The analyzer obtains the value of the function $\int y dx=\int f(x) dx$ by producing small increments of $x$. These increments may be represented by the symbol $\Delta x$. For each $\Delta x$ increment, the analyzer determines the value of $y$ and obtains the product $y\Delta x$. This product $y\Delta x$ approximates the area under the curve $y=f(x)$ for each $\Delta x$ increment, as indicated in Figure 13 by the shaded area 140 for a particular $\Delta x$ increment. If the product $y\Delta x$ is obtained for successive $\Delta x$ increments and if all of the $y\Delta x$ increments are added together, the area under the interval of the curve representing $f(x)$ from $x_0$ to $x$ may be approximated. A relatively accurate approximation may be obtained by decreasing the value of each $\Delta x$ increment.

Figure 12:
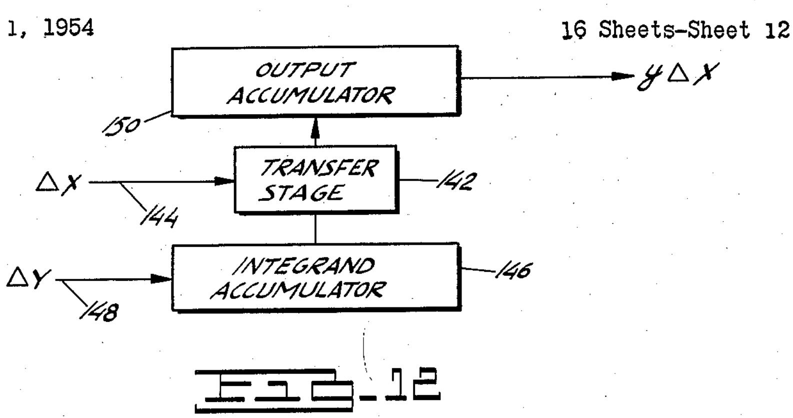
Figure 12 is a block diagram illustrating the operation of one of the integrators forming part of the digital differential analyzer shown in Figure 1 and in Figures 2 to 10, inclusive.

An integrator for determining the $y\Delta x$ increments and for storing the cumulative values of these increments is shown in Figure 12. The integrator includes a transfer stage 142 for obtaining $\Delta x$ increments at periodic intervals through a line 144. The integrator also has an integrand accumulator 146 for storing the value of the dependent quantity $y$ and for receiving $\Delta y$ increments through a line 148 from its own and from other integrators so as to vary the value of $y$ in accordance with the function $y=f(x)$. An output accumulator 150 is provided to receive $y\Delta x$ increments, to combine each $y\Delta x$ increment with the previous increments and to deliver the cumulative value obtained to another integral accumulator or transfer stage while holding the remainder in store. A detailed explanation of this will be given hereafter.

Figure 15:
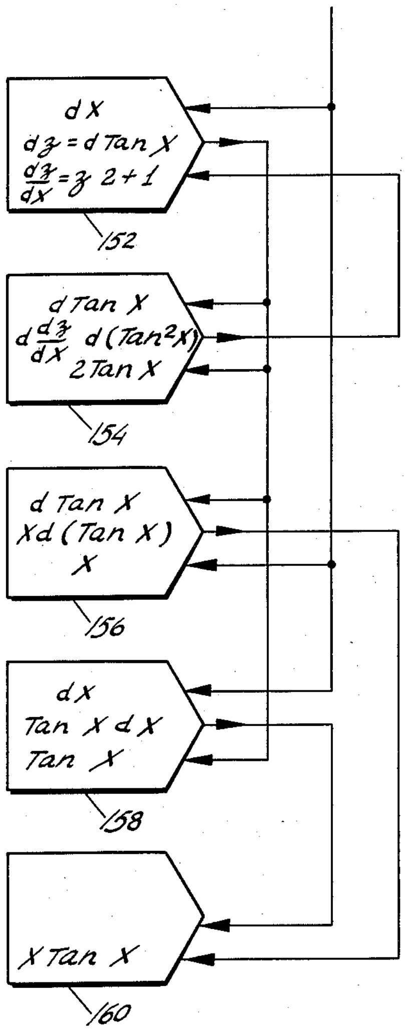
Figure 15 is a schematic diagram illustrating the relationship between different integrators forming the digital differential analyzer shown in Figure 1 and in Figures 2 to 10, inclusive, when the analyzer is solving a particular problem.

The interrelationship between different integrators is illustrated in Figure 15 for a particular problem. This problem starts with a differential equation represented by $$\frac{dy}{dx}=y^2+1$$

As is mathematically known, the differential solution of this problem indicates that $y=\tan x$. The interrelationship illustrated in Figure 10 utilizes this solution to generate the function $\tan x$ which is accumulated in the register of an output integrator. The integrators involved in the solution of $$\frac{dy}{dx}=y^2+1$$

to obtain the function $y=\tan x$ are indicated in Figure 15 by blocks 152, 154 and 156. The generation of the function $x \tan x$ from the function $\tan x$ is accomplished by blocks 158 and 160 shown in Figure 15. The value of the function $x \tan x$ at any instant is accumulated in the integrator 160. In each of the integrators in Figure 15, the introduction of the $\Delta x$ increments constituting changes in the independent variable quantity for the integrator is indicated by a line extending into the upper right position in the block. The $\Delta y$ increments are introduced into the integrator through a line or a plurality of lines extending into the lower right portion of the block representing the integrator. The output of the integrator is obtained from a line extending from an intermediate position at the right side of the appropriate block.

As will be seen in Figure 15, $\Delta x$ increments of the independent variable quantity for a particular integrator may be obtained from the output of another integrator.

For example, in Figure 15, the $\Delta x$ increments for the integrators 154 and 156 are obtained from the output of the integrator 152. Similarly, $\Delta y$ increments for a particular integrator may be obtained from the output of other integrators as well as from the output of the integrator itself. For example, $\Delta y$ increments for the integrators 154 and 158 are obtained from the output of the integrator 152.

The $\Delta x$ and $\Delta y$ increments for each integrator are actually determined from a coded pattern provided in the channels 14 and 16, respectively. As previously disclosed, the pulse positions in each channel are subdivided into 22 integrators each having 48 pulse positions. The first 22 positions in each integrator in the channel 14 are coded to indicate a $\Delta x$ increment. Since the first 22 positions in the channel 14 for each integrator section correspond in number to the 22 integrators in the analyzer, each integrator can receive a $\Delta x$ increment from the output of any of the other integrators. This can be effectuated by providing a pulse in the channel 14 in a particular one of the first 22 positions for the integrator.

Figure 14:
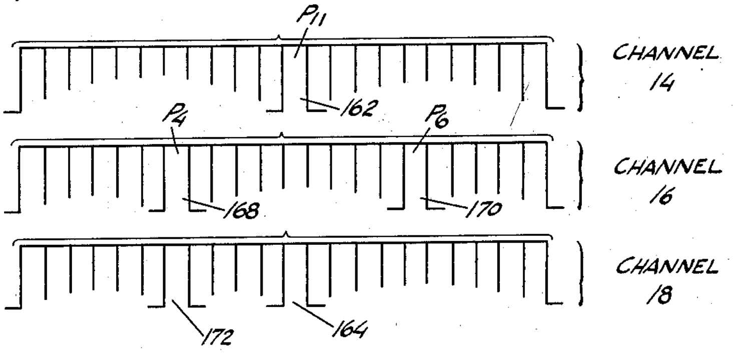
Figure 14 is a chart which illustrates how different parts of an integrator such as that shown in Figure 11 are coded to control the operation of the integrator.

For example, the $\Delta x$ increments for the integrator 154 in Figure 15 would be coded in a particular one of the 22 positions in the channel 14. As will be disclosed in detail hereinafter, the particular position corresponds to the time at which the output from the integrator 152 appears on the coil 38. In Figure 14, a pulse 162 is shown as being recorded in the channel 14 in the 11th pulse position of a particular integrator section.

A pulse in the channel 14 in one of the first 22 positions for a particular integrator indicates that a $\Delta x$ increment is to occur for the integrator. However, such a pulse does not indicate the polarity of the $\Delta x$ increment. The polarity of the $\Delta x$ increment for the integrator is indicated by the presence or absence of a coincidental pulse in the channel 18. If a positive pulse is picked up from the channel 18 by the coil 38 at the same time as the pulse representing the $\Delta x$ increment for a particular integrator is picked up by the coil 22, the $\Delta x$ increment for the integrator is positive. For example, the pulse 162 in Figure 14 indicates a positive $\Delta x$ increment for a particular integrator since it coincides in time with a pulse 164 in the channel 18. A negative $\Delta x$ increment occurs for an integrator if a positive pulse does not appear in the channel 18 at the same time as the pulse in the channel 14.

The first 22 positions in the channel 16 for each integrator are coded to indicate $\Delta y$ increments in a manner similar to the coding of corresponding positions in the channel 14 to indicate $\Delta x$ increments. Since the first 22 positions in each integrator section correspond to the 22 integrators in the digital differential analyzer, each integrator section is coded with particular ones of the first 22 positions in the channel 16 so as to receive the output from certain other integrators in accordance with the problem to be solved. For example, a pulse is coded in the channel 16 in a particular one of the first 22 positions for the integrator 158 in Figure 15 so as to coincide with the time at which the output from the integrator 152 is made available to the coil 38 in the channel 18. Although only one $\Delta x$ increment can be obtained for an integrator upon each presentation of the integrator for computation, several $\Delta y$ increments can be obtained. This may be seen by the pulses 168 and 170 in the channel 16 in the Figure 14.

Each pulse in the first 22 positions in the channel 16 for each integrator represents a $\Delta y$ increment, but it does not indicate the polarity of such an increment. The polarity of the increment is indicated by the presence or absence of a pulse in the channel 18 at the time that a coding pulse is induced in the coil 28. For example, the pulse 168 in Figure 14 indicates a positive $\Delta y$ increment for a particular integrator since it coincides in time with a pulse 172 in the channel 18. However, a negative $\Delta y$ increment is obtained when the pulse 170 is picked up by the coil 28 since there is no coincidental pulse in the channel 18.

Since the interrelationship between the different integrators remains constant during the solution of a particular problem, the coding pulses in the channels 14 and 16 for the first 22 positions from each integrator section must be retained during the computation. Retention of the pulses in the channel 14 is effectuated by the gate circuit 46, which remains open during the first 22 positions for each integrator to pass the coded information in these positions. This is indicated in Figure 1 by the indication P1–P22 adjacent the line 48 from the counter 42 to the gate 52, indicating that the line 48 carries a high signal during the first twenty-two pulse positions of each integrator storage section. The gate circuit 46 opens during these positions because of the introduction of a relatively high voltage through the line 48 from the counter 42. The signals then pass through the "or" network 50 for recordation by the coil 26 in the channel 14. Similarly, the gate circuit 52 opens during the first 22 positions for each integrator so that the coding information in the channel 16 can pass through the "or" network 54 for recordation by the coil 32 in the channel.

It should be appreciated that the gate circuits similar to the circuit 46 operate to pass information only when positive pulses are simultaneously introduced to all of the input terminals of the circuit. In computer terminology, such circuits have been designated as "and" networks. The term "or" networks is also common in computer terminology. Such circuits operate to pass information when any one of their input terminals receives a relatively high voltage. Such "or" networks are shown in the drawing as triangles and are exemplified by the networks 50 and 54.

During the first 22 positions of each integrator, the gate circuits 62 and 64 operate to determine the polarity of each $\Delta y$ increment for the integrator. The gate circuit 62 determines the positive $\Delta y$ increments by passing a signal only when a positive signal is produced by the coil 38 at the same time that a signal passes through the gate circuit 52 to indicate a coding pulse in the channel 16. Because of the inversion by the inverter 60 of the pulses induced in the coil 38, the gate circuit 64 passes a signal only when a relatively low voltage is induced in the coil 38 to indicate a negative value. Since the gate circuit 64 passes a signal only when the inverted voltage coincides with a coding pulse in the channel 16, the gate circuit passes signals to indicate negative $\Delta y$ increments.

At the same time that the gate circuits 62 and 64 operate to determine the polarity of each $\Delta y$ increment for an integrator, the counter 66 arithmetically combines such increments. For example, a signal passing to the counter 66 from the gate circuit 62 may cause the circuit to provide a numerical indication of +4 when an indication of +3 was previously provided by the counter. Similarly, the indications in the counter 66 may change from a value of −2 to a value of −3 upon the introduction of a signal from the gate circuit 64.

The counter 66 retains in binary form the numerical information relating to the cumulative value of the $\Delta y$ increments for an integrator. The counter 66 retains the information in binary form since it comprises a plurality of multivibrators arranged in cascade relationship. In a more complex embodiment, four multivibrators in cascade arrangement are provided. For example, with a resultant count of +5 for the $\Delta y$ increments for a particular integrator, the first and third multivibrators in the cascade arrangement may be operated to indicate a binary pattern of 0101, where the least significant digit is at the right. In binary form, a pattern of 0101 indicates that $(0)(2^3)+(1)(2^2)+(0)(2^1)+(1)(2^0)=5$. Similarly, a value of +3 is indicated by a pattern of 0011, where the least significant digit is at the right. In this embodiment, a single multivibrator is illustratively used to count the $\Delta y$ increments, and is thus limited to a count of positive or negative 1. The resetting of this multivibrator is provided by the program of the computer.

As previously disclosed, the coded information controlling the occurrence of increments in the dependent quantity $y$ for each integrator is provided in the channel 16 in the first 22 pulse positions for the integrator. The information relating to the dependent quantity $y$ itself occurs in the channel 16 after the 22nd pulse position for each integrator. The information relating to the dependent quantity $y$ for each integrator is preceded by a pulse in the channel 16 to indicate that the information which follows relates to the dependent quantity. This pulse occurs after the 22nd pulse position for each integrator. For example, a pulse may occur in pulse position 28 for an integrator to indicate that the subsequent information in the channel 16 relates to the dependent quantity $y$ for the integrator. This pulse has been designated in U.S. Patent 2,900,134 as the "start" pulse.

The "start" pulse in the channel 16 is introduced to the gate circuit 72 which also receives signals through the line 74 from the counter 42. The line 74 is marked P22–P48 to indicate that this line carries a two-state signal that is high during the intervals of these pulses. Since a relatively high voltage appears on the line 74 only after the 22nd pulse position for each integrator, the "start" pulse is the first pulse which is able to pass through the gate circuit 72. This pulse passes to the grid of the left tube in the multivibrator 70 and cuts off the tube.

When the left tube in the multivibrator 70 becomes cut off upon the appearance of the "start" pulse, it remains cut off during the remaining pulse positions of the integrator as indicated in the figure. At pulse position 48 for each integrator, a signal passes from the counter 42 through the line 76 to the grid of the right tube in the multivibrator 70 to cut off the tube. In this way, the multivibrator 70 is prepared at the end of each integrator for proper operation in the next integrator.

When the left tube in the multivibrator 70 becomes cut off, a relatively high voltage is produced on the tube plate. This voltage is introduced to the gate circuit 68 to open the gate circuit for the passage of information from the counter 66. The information passing through the gate circuit 68 is introduced to the adder 78 for arithmetical combination with the signals induced in the coil 28 and with the carry information from the circuit 80. As will be disclosed in detail hereinafter, the adder 78 is able to arithmetically combine the different information introduced to it only when a relatively high voltage is produced on the plate of the left tube in the multivibrator 84.

The adder 78 arithmetically combines the information in the channel 16 relating to the value of the dependent quantity $y$ and the information from the counter 66 relating to the incremental value $\Sigma\Delta y$. In this way, the adder 78 produces signal indications representing a new value of the dependent quantity $y$ for each integrator every time that the integrator is presented for computation. This information passes through the "or" network 54 to the coil 32 for recordation in the channel 16. When the integrator is again presented for computation, the information recorded in the channel 16 serves as the old value $y$ which must be arithmetically combined with the incremental value $\Sigma\Delta y$ to obtain a new value of $y$.

Just as the gate circuits 62 and 64 operate to determine the polarity of each $\Delta y$ increment, the gate circuits 56 and 58 operate to determine the polarity of each $\Delta x$ increment. Because of the operation of the gate circuit 46, the gate circuits 56 and 58 receive the information in the channel 14 for only the first 22 pulse positions of each integrator. As previously disclosed, the coding pulse controlling the $\Delta x$ increments for each integrator is provided in the channel 14 in a particular one of the first 22 positions for each integrator. Since the gate circuit 56 also received the pulses from the coil 38, it passes a signal only when the $\Delta x$ increment for an integrator is positive. The gate circuit 58 passes a signal only upon the occurrence of a negative $\Delta x$ increment because of its connection to the inverter 60, which converts positive pulses in the coil 38 into negative pulses and vice versa.

Each signal passing through the gate circuit 56 triggers the left tube in the multivibrator 60 into a state of non-conductivity and causes the voltage on the plate of the tube to become relatively high. Similarly, each signal passing through the gate circuit 58 triggers the right tube in the multivibrator 60 into a state of non-conductivity and produces a relatively high voltage on the tube plate. In this way, the multivibrator 60 becomes operative during one of the first 22 pulse positions of each integrator to provide an indication during the remaining pulse positions of the integrator as to the polarity of the $\Delta x$ increment for the integrator. Such an indication is provided by the voltages on the plates of the left and right tubes in the multivibrator.

The voltages on the plates of the two tubes in the multivibrator 60 are introduced to the adder 86 to control the manner in which the signals are combined by the adder. The signals which are differentially combined by the adder 86 in accordance with the indications from the multivibrator 60 are those which pass through the gate circuits 82 and 72. As previously disclosed, the signals passing through the gate circuit 72 occur only after the 22 pulse position for each integrator and relate to the value of the dependent quantity $y$ for the integrator. The signals passing through the gate circuit 82 also occur only after the 22 pulse position for each integrator, and these signals relate to the cumulative value of the $y\Delta x$ increments for the integrator.

The signals passing through the gate circuits 82 and 72 are combined only when a relatively high voltage is produced on the plate of the left tube in the multivibrator 84.

The adder 86 combines the information relating the value of $y$ and the information relating to the cumulative value of the $y\Delta x$ increments for each integrator to obtain a new cumulative value of the $y\Delta x$ increments. The value of $y$ is added to the cumulative value of $y\Delta x$ for an integrator when a relatively high voltage appears on the plate of the left tube in the multivibrator 60 to indicate a positive $\Delta x$ increment. The value of $y$ is subtracted from the cumulative value of $y\Delta x$ upon the occurrence of a high voltage on the plate of the right tube in the multivibrator 60 to indicate a negative $\Delta x$ increment. The value of $y$ is subtracted under such circumstances since the negative sign of the $\Delta x$ increment is in effect transferred to the sign of $y$. This results from the fact that $(y)(-\Delta x) = (-y)(\Delta x)$. The resultant indications produced by the adder 86 pass through the "or" network 50 to the coil 26 for recordation in the channel 14. These indications are then presented to the adder 86 for differential combination with a new $y\Delta x$ increment when the integrator is next presented for computation.

Sometimes, as the $y\Delta x$ increments for an integrator are differentially combined with the cumulative value of the differential combination for the integrator, an overflow is obtained in the information stored in the channel 14. When an overflow occurs in the cumulative value of the differential combination for an integrator, the indications representing the cumulative value return to a value less than an overflow value so that they can build up again to a relatively high value. At the same time, an overflow pulse is produced by the carry circuit 90 at pulse position 48 for the integrator. The carry circuit 90 provides such an indication because of its operation to indicate the overflows from each pulse position to the next position when the different quantities are combined by the adder 86 in the first pulse position.

The overflow pulse produced by the adder 90 at pulse position 48 for an integrator passes through the gate circuit 92 since the gate circuit opens at the last pulse position for each integrator because of its connection through the line 76 to the counter 42. The pulse passes through the gate circuit 92 only when a relatively high voltage is produced on the plate of the left tube in the multivibrator 84 to indicate that computation is actually taking place in the analyzer. The pulse then passes through the "or" network 94 for recordation by the coil 36 in the channel 18. For example, a first pulse of relatively high voltage may be provided in the channel 18 at the 48th position of integrator "1." The pulse indicates that a positive overflow has occurred in the cumulative $y\Delta x$ value stored in the channel 14 for the integrator. The pulse is indicated at 180 in the chart shown in Figure 16.

Figure 16:
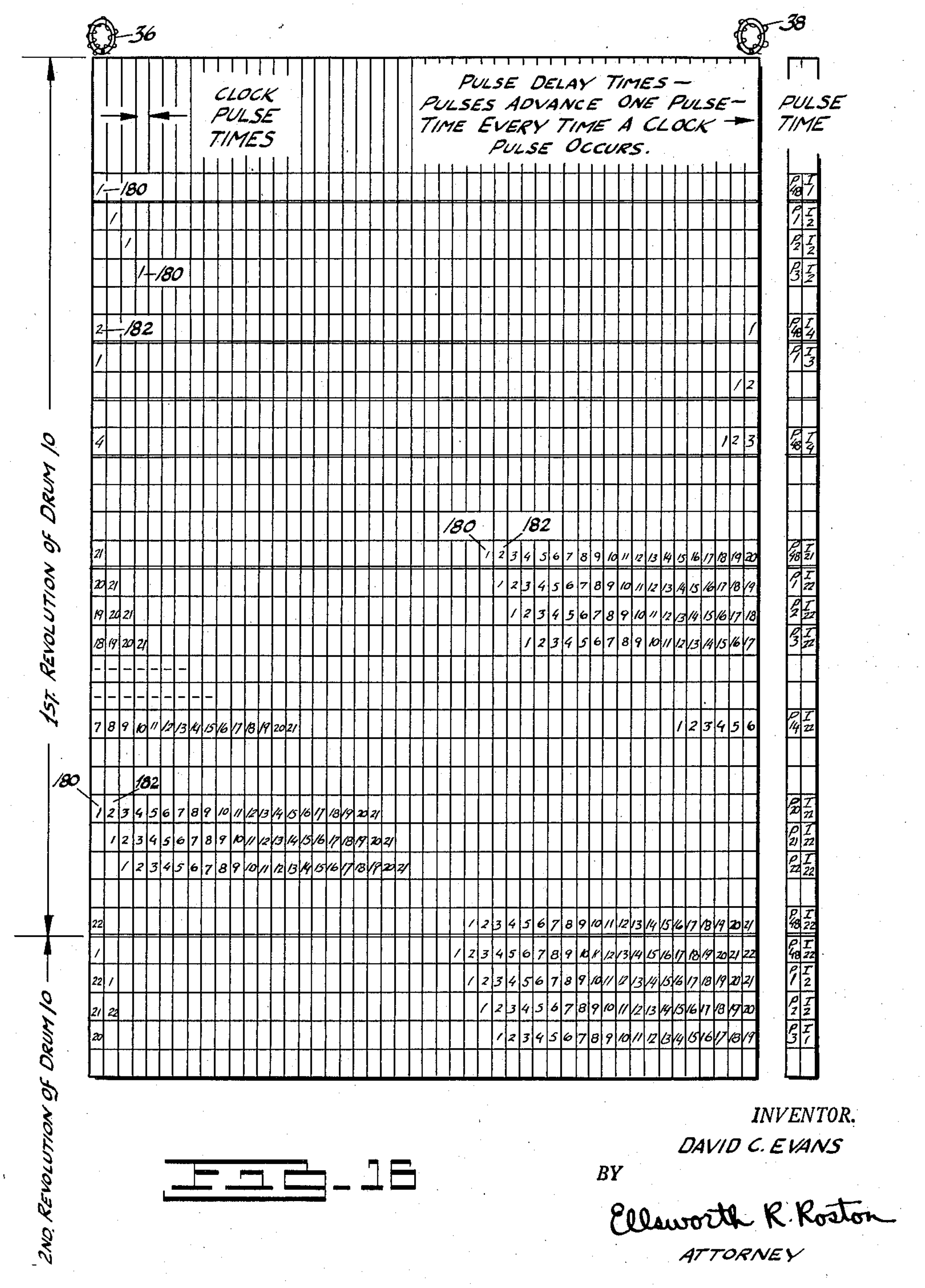
Figure 16 is a chart illustrating the operation of certain of components forming a part of the analyzer shown in Figure 1 and in Figures 2 to 10, inclusive.

In all of the vertical columns in the chart shown in Figure 16, except for the two at the extreme right, numbers between "1" and "22" are shown corresponding to the 22 integrators in the digital differential analyzer. In the two columns at the extreme right, numbers are shown prefaced by the letters "I" and "P." The letter "I" followed by a number indicates the particular integrator that is moving past the coil 36 at any instant. For example, "$I_3$" indicates that a pulse position in the third integrator is moving past the coil 36 in the channel 18. Similarly, a designation such as "$P_{13}$" indicates that the 13th pulse position in the particular integrator is moving past the coil 36.

After the pulse 180 is recorded by the coil 36 in the channel 18, it advances from the coil 36 towards the coil 38. During this time, the first 47 positions of integrators "2" are passing under the coil 36. At the $P_{48}I_2$ position—or, in other words, the last position of integrator "2"—an indication is recorded by the coil 36 in the channel 18, as indicated at 182 in Figure 16. At the $P_1I_3$ position, the indication 180 passes through the gate circuit 96 and the "or" network 94 to the coil 36. The pulse passes through the gate circuit 96 since the gate circuit opens in the first 47 pulse positions of each integrator because of its connection through the line 97 to the counter 42. After passing through the gate circuit 96 and the "or" network 94, the pulse 180 is again recorded by the coil 36 in the channel 18, this time at the pulse position adjacent to the indication 182.

Similarly, indications are provided in adjacent pulse positions to show whether or not an overflow has occurred in the cumulative $y\Delta x$ value for each of the other integrators in the analyzer. These indications are recirculated by the gate circuit 96, which remains open during the first 47 pulse position of each integrator. At the 48th position for each integrator, the gate circuit 96 closes and prevents any recirculation of old information for the integrator as indicated by the designation P1–P47 adjacent the line 97.

At the same time that the gate circuit 96 closes, the gate circuit 92 opens. When the gate circuit 92 opens, the overflow information for the integrator moving past the coil 36 is recorded in the channel 18. In this way, old overflow information for an integrator is replaced by new overflow information for the integrator every time that the integrator is presented for computation. This replacement of old information by new information occurs only during actual computation since both the gate circuit 92 and 96 are connected to the plate of the left tube in the multivibrator 94.

After the indications have been provided in the channel 18 for the 48th pulse position of each integrator, integrator "1" becomes available for computation a second time. As the drum 10 rotates through the first 22 positions for the integrator, the output indications for the 22 integrators move in sequence past the coil 38. This causes the output indications in the channel 18 to become available for determining whether or not a $\Delta x$ increment and $\Delta y$ increments are actually obtained for the integrator during the second computation. The determination of the occurrence of an actual $\Delta x$ increment and of actual $\Delta y$ increments is made by respectively comparing the coding pulses in the channels 14 and 16 with the overflow pulses in the channel 18. The operation of the digital differential analyzer to obtain such a determination has been disclosed previously.

One of the integrators in the analyzer may be adapted to provide a constant value of $y$ and to provide a positive $\Delta x$ increment every time that the integrator is presented for computation. Because of these constant factors, the cumulative value of the $y\Delta x$ increments for the integrator increase by a constant amount every time that the integrator is presented for computation. This causes an overflow to occur at constant periods from the channel 14 to the channel 18. As previously disclosed, the overflow occurs at pulse position 48 for the integrator and is represented by a positive pulse from the carry circuit 90 in this position.

The particular integrator controlling the periodical overflow of the $y\Delta x$ increments may be an integrator such as integrator "7." Upon the presentation of integrator "7" for computation, the counter 44 produces a positive voltage on the line 100. Since a positive voltage also occurs on the line 76 at pulse position 48 for each integrator, the gate circuit 98 passes a signal when a carry indication is provided by the carry circuit 90 for integrator "7."

The output signal from the gate circuit 98 passes to the grid of the right tube in the multivibrator 84 and triggers the tube into a state of nonconductivity. This causes the left tube in the multivibrator 84 to become conductive and a relatively low voltage to be produced on the tube plate. The low voltage on the plate of the left tube in the multivibrator 84 prevents the adders 78 and 86 from operating and also prevents signals from passing through the gate circuits 92 and 96 from recordation by the coil 36 in the channel 18.

When the right tube in the multivibrator 84 becomes cut off, a relatively high voltage is produced on the plate of the tube to prepare the gate circuits 104, 106 and 108 for operation. The gate circuit 104 then passes the information induced in the coil 22 to the "or" network 50 for recordation by the coil 26 in the channel 14. The gate circuit opens to provide for the recirculation of all of the information in the channel 14 except for the information relating to a pair of particular integrators other than integrator "22."

This results from the inversion of the voltage on the line 112 and the introduction of this voltage to the gate circuit. The particular integrators in which the line 112 provides high voltages may be integrators "5" and "6."

In like manner, the gate circuit 106 operates to recirculate all of the information in the channel 16 except for the information relating to integrators "5" and "6." The gate circuit 108 similarly recirculates all of the information in the channel 18 when all of the integrators including the integrators "5" and "6" are presented for computation. Because of such recirculation, all of the information in the analyzer is retained while the computer continues in a state of idling so that the information will be available when computation by the analyzer is resumed. The computer is idling since the adders 78 and 86 are unable to operate to introduce new information into channels 14 and 16.

Upon the production of a relatively high voltage on the plate of the right tube in the multivibrator 84, the gate circuit 116 passes a signal every time that pulse position 48 of integrator "22" appears. This signal passes to the grid of the normally conductive left tube in the mono-stable multivibrator 118 and triggers the multivibrator into a state of nonconductivity. The mono-stable multivibrator 118 is provided with circuit parameters which cause the left tube in the multivibrator to remain cut off for relatively long periods of time, such as a few revolutions of the drum 10. The multivibrator 118 is provided with such parameters so that the mechanical components of the tape reader 122 and the tape puncher 124 will have time to operate.

As shown in Figure 6, the operation of the tape reader 122 is controlled by a tape 170 which has a first sequence of holes 172 to guide the movement of the tape from one position to the next. The tape 170 also has second and third series of holes 174 and 176. The holes 174 control the insertion of information into integrator "5," and the holes 176 control the insertion of information into integrator "6." Each of the holes 174 and 176 provides an indication of a binary value of "1." The absence of a hole at a particular position in the sequence of holes 174 and in the sequence of holes 176 indicates a value of "0."

When the monostable multivibrator 118 is actuated for the first time by a signal passing through the gate circuit 116, the multivibrators in the counter 120 are conducting in a pattern representative of a decimal value of "1." For such a value, the counter 120 operates in conjunction with the voltage imposed on the line 130 by the counter 42 to prepare the gate circuit 126 for opening only at pulse position 32 for each integrator as indicated in Figure 1 by the designation P32. Because of its connection through the line 112 to the gate circuit 126, the gate circuit opens only at pulse position 32 for integrators "5" and "6" to pass the information from the tape reader 122. This information passes through the "or" network 54 to the coil 32 for recordation in the channel 16 and provides an indication of the dependent quantity $y$ at pulse position 32 for integrators "5" and "6."

As previously disclosed, the left tube in the multivibrator 118 remains cut off for a period of a few revolutions of the drum 10 after it has been triggered into a state of non-conductivity by a signal passing through the gate circuit 116. Upon the return of the left tube in the multivibrators 118 to a state of conductivity, the left tube in the multivibrator 118 again becomes triggered into a state of conductivity by a signal which passes through the gate circuit 116 at pulse position 48 of integrator "22." The left tube in the multivibrator 118 then remains conductive for 8 more revolutions of the drum and at the end of this time returns to a state of conductivity for triggering into non-conductivity by the next signal passing through the gate circuit 116. In this way, the left tube in the multivibrator 118 becomes automatically cut off in a repetitive manner during the time that the analyzer is idling. As previously disclosed, the analyzer is idling during the time that a relatively high voltage is produced on the plate of the right tube of the multivibrator 84.

Every time that the left tube in the multivibrator 118 returns to a condition of nonconductivity, a relatively high voltage is produced on the plate of the tube to trigger the counter 120. Since the multivibrators in the counter 120 are connected in cascade arrangement, the count provided by the multivibrator increases by "1" upon each introduction of a voltage pulse from the multivibrator 118. In this way, the count provided by the counter 120 increases in digital fashion from "1" to "16."

As will be disclosed in detail hereinafter, the gate circuit 126 is so constructed that it opens at a different pulse position in integrators "5" and "6" dependent upon the count in the counter 120. For example, the gate circuit 126 opens at pulse position 32 of integrators "5" and "6" when an indication of "1" is provided by the counter 120. Similarly, the gate circuit 126 opens at pulse position 33, 34, 35, etc. when counts of "2," "3," "4," etc. are provided by the counter 120.

Each positive pulse on the plate of the left tube in the multivibrator 118 not only triggers the counter 120 but also the tape reader 122. When the tape reader 122 is actuated, it advances from one hole 172 to the next hole in the sequence. The tape reader then passes information through the gate circuit 126, such information being dependent upon the presence or absence of holes in the sequence of holes 174 and 176 at the operative position of the tape. The information provided by the presence or absence of holes in the sequences 174 and 176 passes through the "or" network 54 for recordation by the coil 32 in the channel 16. In this way, empirical information relating to the dependent quantity $y$ for integrators "5" and "6" is periodically recorded in the channel 16 in pulse positions 32 to 47, inclusive, for the integrators.

The counter 120 controls the passage of information through the gate circuit 128 in a manner similar to the passage of information through the gate circuit 126. Thus, the gate circuit 128 opens at pulse positions 32, 33, 34, etc. for particular integrators controlled by the line 132 as the indications in the counter 120 progress from one value to the next. At each pulse position for the particular integrators, information passes from the coil 28 through the gate circuit 128 to the tape puncher 124 and actuates the tape puncher so that a hole is punched in a tape 530 (Figure 8) for a binary value of "1" and is not punched for a binary value of "0." In this way, a record is provided on the tape 530 for future use so that the tape can be used in a manner similar to that disclosed above for the tape 170.

When the counter 120 has been triggered a number of times by signals from the multivibrator 118 to provide an indication of "16," a signal passes from the counter to the grid of the left tube in the multivibrator 84. This signal triggers the left tube in the multivibrator 84 into a state of non-conductivity and causes the right tube to become conductive. The resultant low voltage on the plate of the right tube in the multivibrator 84 prevents any signals from passing through the gate circuit 116 to the multivibrator 118. This prevents the multivibrator 118 from being triggered to actuate the tape reader 122 and the tape puncher 124.

The low voltage on the plate of the right tube in the multivibrator 84 also prevents the gate circuits 104, 106 and 108 from opening to recirculate the information in the channels 14, 16 and 18, respectively. At the same time the gate circuits 104, 106 and 108 become closed, the adders 78 and 86 become operative because of the relatively high voltage on the plate of the left tube in the multivibrator 84. The adders 78 and 86 then operate to compute new values for the dependent quantity $y$ and the differential $\Sigma y \Delta x$ for each integrator until an overflow is again produced in the control integrator such as integrator "7."

Figure 11:
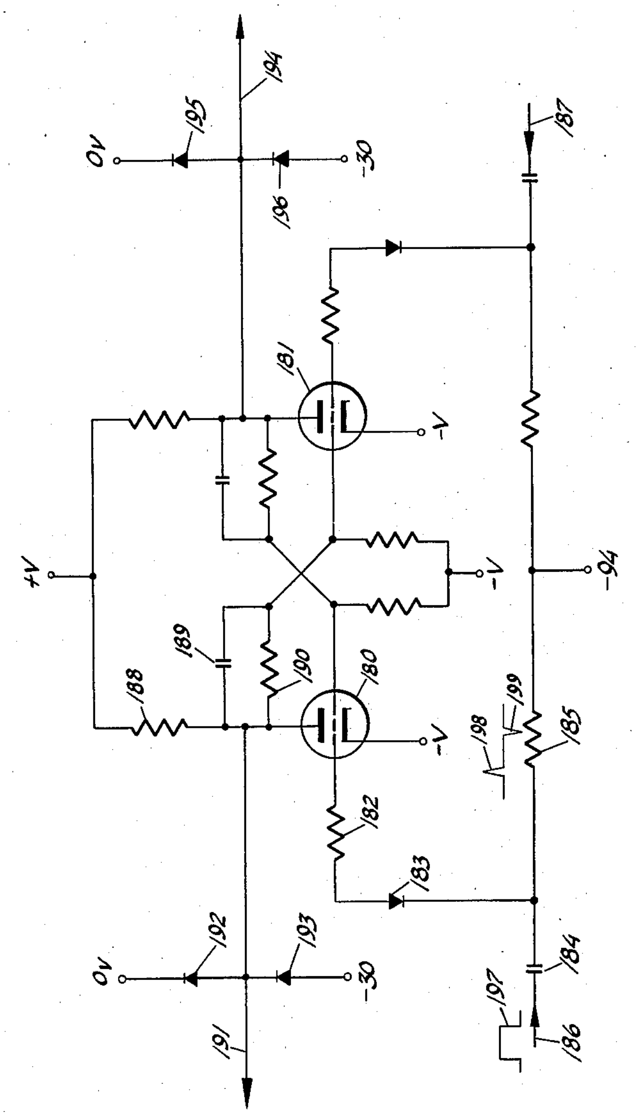
Figure 11 is a circuit diagram of a bistable multivibrator which forms a basic stage of the analyzer shown in Figure 1 and in Figures 2 to 10, inclusive.

In Figure 1, several bistable multivibrators such as the multivibrators 60 and 70 are shown. Furthermore, the construction and operation of these multivibrators have been disclosed above on a general basis. A specific circuit for use as such multivibrators is shown in Figure 11. The multivibrator includes a pair of tubes 180 and 181, each of which has a negatively biased cathode. The grid of the tube 180 is connected through a resistance 182 to the plate of a diode 183 having its cathode connected to the common terminal between a capacitance 184 and a resistance 185. Input signals are introduced to the capacitance 184 through a line 186. For example, if the circuit shown in Figure 11 serves as the multivibrator 60 in Figure 1, input signals would be introduced to the line 186 from the gate circuit 56.

The grids of the tubes 180 and 181 are negatively biased through suitable resistances from a voltage source (not specifically shown). The grid of the tube 181 is also associated with a pair of resistances, a diode and a capacitance in a manner similar to the association of the resistances 182 and 185, the diode 183 and the capacitance 184 wth the grid of the tube 180. Input signals are adapted to be introduced to the grid of the tube 181 through a line 187 from appropriate stages. For example, when the circuit shown in Figure 11 serves as the multivibrator 60 in Figure 1, input signals would be introduced to the line 187 from the output terminal of the "or" network 58.

The plate of the tube 180 has a positive voltage applied to it through a resistance 188 from a suitable voltage source (not specifically shown) and is electrically coupled to the grid of the tube 181 through a parallel combination of a capacitance 189 and a resistance 190. The plate of the tube 180 is also connected to a suitable output line 191 which is electrically clamped by diodes 192 and 193. The plate of the diode 192 and the cathode of the diode 193 have a common terminal. The cathode of the diode 192 has a potential of approximately 0 volts introduced to it and the plate of the diode 193 has a potential of approximately −30 volts introduced to it from a suitable voltage source (not specifically shown).

In like manner, the plate of the tube 181 receives a positive voltage through a suitable resistance corresponding to the resistance 188. The plate of the tube 181 is coupled to the grid of the tube 180 by a parallel combination of a capacitance and a resistance corresponding to the capacitance 189 and the resistance 190. The voltage on the plate of the tube 181 is introduced to an output line 194, which is electrically clamped by diodes 195 and 196 corresponding to the diodes 192 and 193.

Signals having a rectangular shape are introduced to the line 186 from the stages preceding the multivibrator shown in Figure 11. For example, the signals may have a wave form illustrated schematically at 197 in Figure 11. These signals are differentiated by the capacitance 184 and the resistance 185 to produce relatively sharp signals. Some of the signals are positive as illustrated at 198 in Figure 11, and other signals are negative as illustrated at 199. The positive signals 198 are produced by the differentiation of the leading edges of pulses corresponding to the pulse 197 and the negative signals are produced by the differentiation of the trailing edges of the pulses corresponding to the pulse 197.

Since the positive signals 198 cause the voltage on the cathode of the diode 183 to become more positive than the negatively biased voltage on the grid of the tube 180 and on the plate of the diode 183, the positive signals 198 cannot pass through the diode. However, the negative signals 199 pass through the diode 183 since they cause the cathode of the diode to become negative with respect to the plate of the diode. These signals pass to the grid of the left tube in the multivibrator 180.

If the tube 180 is conductive, the signals 199 cause the tube to become cut off and a relatively high voltage to be produced on the plate of the tube. This high voltage is introduced to the output line 191. The relatively high voltage produced on the plate of the tube 180 also passes to the grid of the tube 181 through the coupling network formed by the capacitance 189 and the resistance 190. This voltage causes the tube 181 to become conductive.

The tube 180 remains cut off and the tube 181 remains conductive until a voltage pulse corresponding to the pulse 197 is introduced to the line 187. This pulse is differentiated to produce a negative signal corresponding to the signal 199, having sharp characteristics at a time corresponding to the trailing edge of the pulse. The negative signal passes to the grid of the tube 181 and causes the tube to become cut off. The resultant high voltage on the plate of the tube is introduced to the grid of the tube 180 to make the tube conductive. In this way, the voltage on the plate of the tube 180 is made relatively low at the time that a relatively high voltage is produced on the plate of the tube 181 and vice versa.

The diodes 192, 193, 195 and 196 serve as a clamping network to maintain the voltages on the output lines 191 and 194 at either a relatively high voltage such as 0 volts or a relatively low voltage such as −30 volts. For example, when a potential of −30 volts is to be produced at the output line 191, current flows through the diode 193 to maintain this potential in case of any tendency of the voltage to become more negative than −30 volts. Similarly, the diode 192 passes a current when a potential of 0 volts is to be produced at the output line 191 and the potential on the line tends to rise above 0 volts.

It should be appreciated that in many instances the pulses corresponding to the pulse 197 do not continue for more than one pulse position. This is especially true when the pulses are formed by an "and" network which includes signals from the coil 40 in the clock channel 20. The pulses cannot continue for more than one pulse position under these circumstances since the clock signal produced by the coil 40 has a negative slope in each pulse position. This would cause a relatively high voltage to be produced on the plate of either the tube 180 or the tube 181 for only one pulse position.

The system shown in Figure 1 and disclosed above is illustrated in some detail in Figures 2 through 10, inclusive. The system includes the channels 14, 16, 18 and 20 and the coils respectively associated with the different channels. For example, the coils 22, 24, and 26 are associated with the channel 14. The coil 22 is connected to the grid of the left tube in a bistable multivibrator 202 and to the input terminal of an inverter 204 the output from which is introduced to the grid of the right tube in the multivibrator 202.

In like manner, a multivibrator 206 and an inverter 208 and a multivibrator 210 and an inverter 212 are respectively associated with the coils 28 and 38. The voltages on the plates of the left and right tubes in the multivibrator 210 are applied to the grids of the left and right tubes, respectively in a multivibrator 211 to provide a delay of one pulse position in the output of the multivibrator 210.

The multivibrators 202, 206 and 210 are associated with the coil 40 in the channel 20 to synchronize the signals produced by the multivibrators with the clock signals in the channel 20. This synchronizing action is disclosed in detail in Figure 15 and the related descriptive material beginning on line 49 of column 25 in U.S. Patent 2,900,134, Digital Differential Analyzer.

Connections are respectively made from the plates of the left tubes in the multivibrators 202 and 206 to input terminals of gate circuits 214 and 216. Other input terminals of the gate circuit 214 and 216 receive a voltage through a line 220 from a counter 222 corresponding to the counter 42 in Figure 1. The output signals from the gate circuit 214 are introduced to an "or" network 224 for recordation by the coil 26 in the channel 14. Similarly, the output signals from the gate circuit 216 pass through an "or" network 226 to the coil 32 for recordation in the channel 16.

The output signals from the gate circuit 214 are also applied to input terminals of gate circuits 228 and 230 having other input terminals respectively connected to the plates of the left and right tubes in the multivibrator 211. The output signals from the gate circuits 228 and 230 in turn pass to the grids of the left and right tubes respectively in a multivibrator 232.

In like manner, connections are made to input terminals of a gate circuit 234 from the gate circuit 216 and from the plate of the left tube in the multivibrator 211 and to a gate circuit 236 from the gate circuit 216 and the plate of the right tube in the multivibrator 211. The signals from the gate circuits 234 and 236 pass to a circuit 240 corresponding to the circuit 66 in Figure 1 and disclosed in Figure 29 and described beginning at line 54 of column 34 of the above-referenced Patent 2,900,134.

In addition to being introduced to the gate circuit 216, the voltage on the plate of the left tube in the multivibrator 206 is introduced to a gate circuit 244 having another input terminal connected through a line 246 to the counter 222. The output from the gate circuit 244 passes to the grid of the left tube in a bistable multivibrator 248 corresponding to the multivibrator shown in Figure 1. The grid of the right tube in the multivibrator 248 is connected through a line 250 to the counter 222.

The voltage on the plate of the left tube in the multivibrator 248 is applied to an adder 252 to control the operation of the adder. Control over the operation of the adder 252 is also provided by the voltage on a line 254 which is connected to the movable contacts of a pair of ganged switches 256 and 258 and to the stationary contact of a switch 259. The switches 256, 258 and 259 are manually operated. The stationary contacts of the switches 256 and 258 are respectively connected to grounded resistances 260 and 261. The movable contact of the switch 259 is connected to the positive terminal of a suitable power supply such as a battery 262, the negative terminal of which is grounded.

In addition to the controls previously disclosed for the operation of the adder 252, a control is provided on the operation of the adder by the voltage on the plate of the left tube in a multivibrator 263. The adder 252 receives for arithmetical combination the signals from the counter 240 and from the plates of the left and right tubes in the multivibrator 206. The adder combines these signals with the signals from a carry circuit 264, the input terminal of which is connected to the output terminal of the adder. The construction and operation of the adder 252 and the carry circuit 264 are fully disclosed in U.S. Patent 2,900,134 and at page 1-1-15 and Figure PY-0-101 of Progress Report on The Edvac, volume I. It is to be noted that the inputs to the adder 252 include the negation of several of the signals. Of course, these signals could be generated within the adder as shown in the Edvac Progress Report, published by the Moore School of Electrical Engineering.

That is, the adder 252 may comprise a conventional series binary adder as disclosed in the above references with logical "and" and "or" gates to perform the summation of two digital values. Furthermore, all the "and" gates in the adder are also connected to receive certain control signals in addition to the signals representing the numerical values to be added. Specifically, the inputs to the adder 252 are set forth in the following chart, from top to bottom, along with the signal sources, as explained in detail hereafter.

INPUTS TO ADDER 252

| Line | Signal Representation | Source |
|---|---|---|
| 1 | $\Delta y$ | Counter 240. |
| 2 | $\Delta y'$ | Counter 240. |
| 3 | $\Delta x$ | Multivibrator 206. |
| 4 | Control | Multivibrator 248, signal high until after pulse position 22. |
| 5 | Control | Multivibrator 263, signal high when analyzer is processing. |
| 6 | Control | Switches 256 and 258, signal high when analyzer is processing. |
| 7 | Carry | Carry circuit 264. |
| 8 | $\Delta x'$ | Multivibrator 206. |

It is to be noted that the negation of the carry signal is developed in the adder, as disclosed in the above-referenced Edvac Report. The voltage on the plate of the left tube in the multivibrator 232 is applied to input terminals of gate circuits 265 and 266 and the voltage on the plate of the right tube in the multivibrator is introduced to gate circuits 267 and 268. Each of the gate circuits 265, 266, 267 and 268 has a second input terminal connected to the plate of the left tube in the multivibrator 248. The gate circuits 265 and 267 have third input terminals connected to the plate of the left tube in the multivibrator 206, and the gate circuits 266 and 268 have input terminals connected to the plate of the right tube in the multivibrator 206. The signals passing through the gate circuits 265 and 268 are introduced to an "or" network 269, and the signals from the gate circuits 266 and 267 are applied to an "or" network 270.

The signals from the "or" networks 269 and 270 pass to an adder 272 corresponding to the adder 86 in Figure 1. In accordance with the disclosure of the referenced patent application and the Edvac Progress Report, the adder 272 combines these signals with signals from the plates of the left and right tubes in the multivibrator 202 and from a carry circuit 274 having an input terminal connected to the output terminal of the adder. Controls are imposed on the adder 272 by voltages on the movable contacts of the switches 256 and 258 and on the plate of the left tube in the multivibrator 258. The construction and operation of the adder 272 is fully disclosed in the above-referenced Patent 2,900,134 in Figures 45, 46, 55 and 56 of the drawings and described beginning at line 59 of column 51.

Considering the various inputs to the adder 272, the following chart of the inputs from top to bottom is provided.

INPUTS TO ADDER 272

| Line | Signal Representation | Source |
|---|---|---|
| 1 | Control | Multivibrator 263, signal high when analyzer is processing. |
| 2 | $y'\Delta x$ | "or" network 270. |
| 3 | $y\Delta x$ | "or" network 269. |
| 4 | R | Multivibrator 202. |
| 5 | Control | Switches 256 and 258, signal high when analyzer is processing. |
| 6 | R | Multivibrator 202. |
| 7 | Carry | Carry circuit 274. |

It is again to be noted that the negation form of the carry signal is formed inside the adder. Of course it is well known that the negation of any signal can be formed from the signal. Thus the outputs from both the adders 252 and 272 may be represented by single signals in single output lines. The voltage on the plate of the left tube in the multivibrator 211 is applied to a gate circuit 276 as well as to the gate circuits 228 and 234. Other input terminals of the gate circuit 276 are connected to the movable contacts on the switches 256 and 258, to the plate of the left tube in the multivibrator 263 and through a line 278 to the counter 222. The signals from the gate circuit 276 pass through an "or" network 280 to the coil 36 for recordation in the channel 18. The output terminal of a gate circuit 282 is also connected to the "or" network 280. Connections are made to input terminals of the gate circuit 282 from the adder 272, the plate of the left tube in the multivibrator 263, the movable contacts of the switches 256 and 258 and through the line 250 from the counter 222.

The grid of the left tube in the multivibrator 263 receives its voltage from a gate circuit 284. Input terminals of the gate circuit 284 are connected to the plate of the right tube in the multivibrator 263, to the plate of the left tube in a multivibrator 286, through the line 250 to the counter 222 and through a line 288 to a counter 290 corresponding to the counter 44 in Figure 1. The counter 290 functions to count pulses $P_{48}$, as disclosed in Figure 24 of the above-referenced Patent No. 2,900,134, and provide pulses indicative of the integrator time intervals. The grid of the right tube in the multivibrator 263 has a voltage applied to it from a gate circuit 292. The gate circuit 292 in turn receives voltages from an "or" network 294, from the plate of the left tube in the multivibrator 263, through the line 250 from the counter 222 and through the line 288 from the counter 290.

The "or" network 294 passes signals from the output terminal of the adder 272 and from a driver 296. The driver 296 corresponds in construction and operation to a driver disclosed in the above-referenced Patent 2,900,134 at line 66, column 54 of the specification and shown in Figure 52 of the drawings. The output from the driver 296 is also applied to an inverter 298 which inverts the voltage and applies it to a gate circuit 300.

Another input terminal of the gate circuit 300 is connected to the plate of the right tube in the multivibrator 263, and the output terminal is connected to the grid of the left tube in the multivibrator 286. The grid of the right tube in the multivibrator 286 receives its voltage from a gate circuit 302 having input terminals connected to the plate of the left tube in the multivibrator 263 and through the line 250 to the counter 222.

Figure 3:
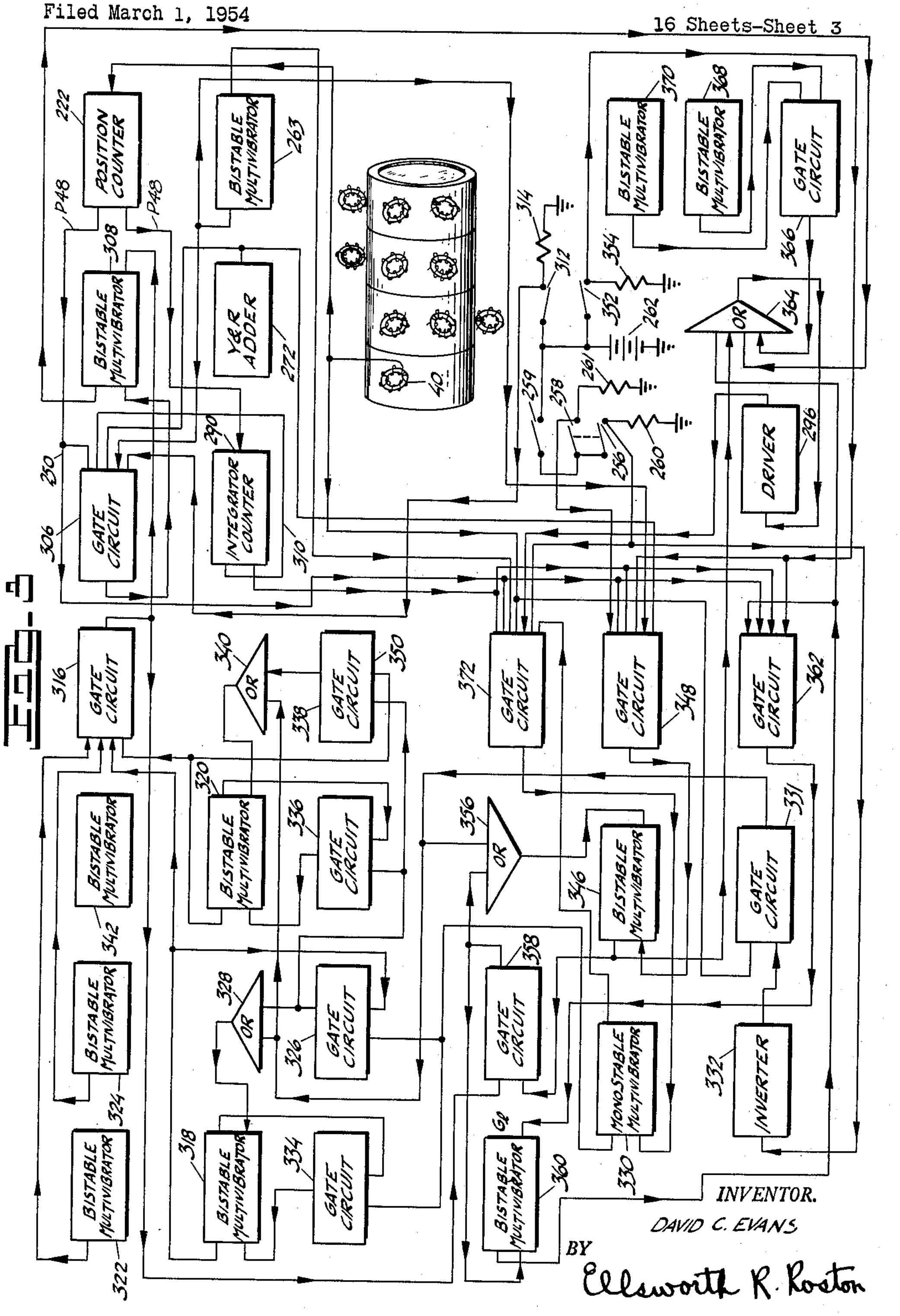
Figure 4:
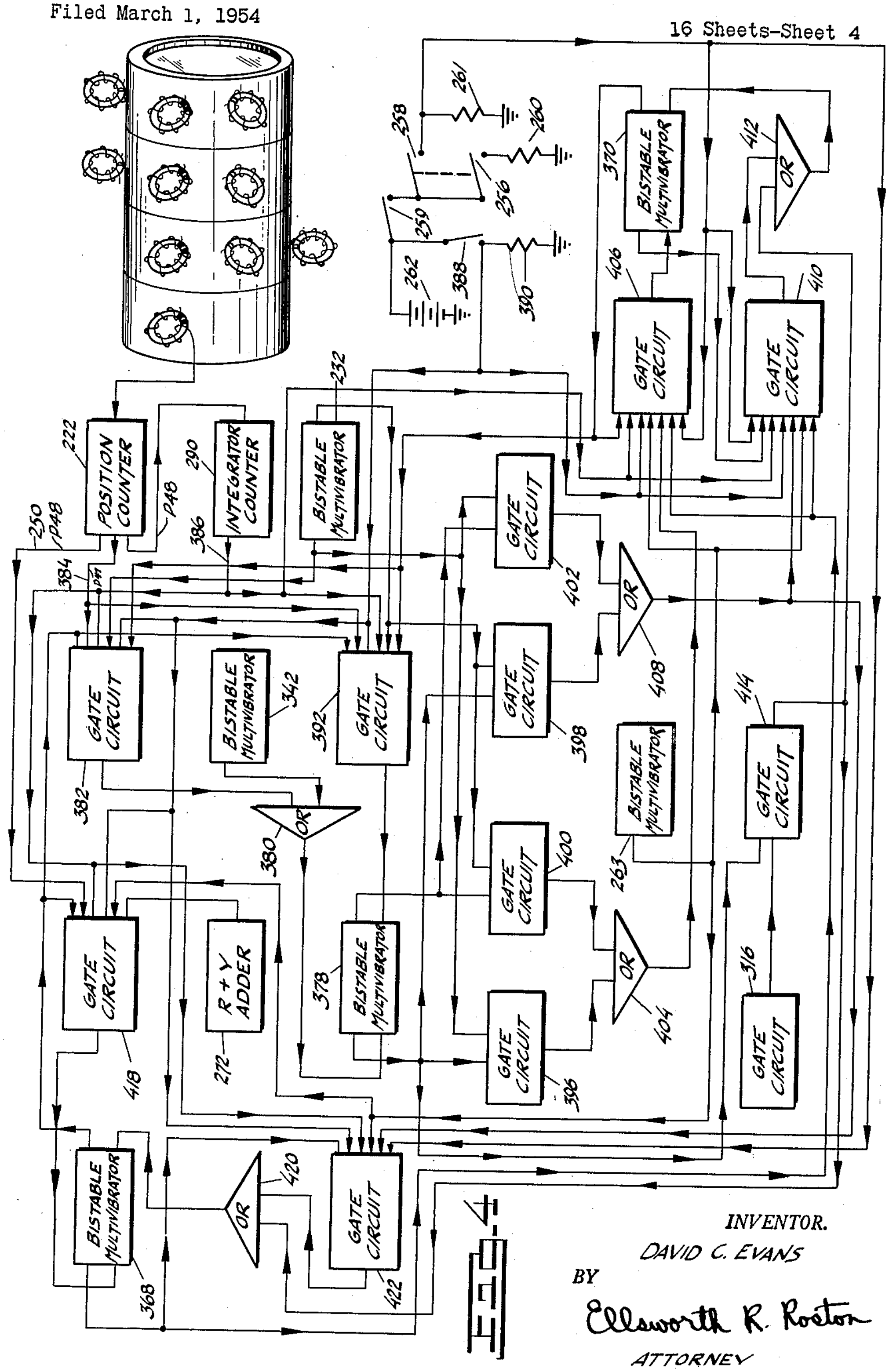

The components affecting the operation of the driver 296 are shown in Figures 3 and 4. The components shown in Figure 3 include a gate circuit 306 having its output terminal connected to the plate of the left tube in a bistable multivibrator 308. Connections are made to input terminals of the gate circuit 306 from the output terminal of the adder 272, from the plate of the left tube in the multivibrator 263 and through the line 250 from the counter 222. Input terminals of the gate circuit 306 are also connected through a line 310 to the counter 290 and to the stationary contact of a manually operated switch 312 having a common terminal with a grounded resistance 314. The movable contact of the switch 312 has voltage applied to it from the positive terminal of the battery 262.

The grid of the right tube in the multivibrator 308 receives its voltage from a gate circuit 316 having input terminals connected to the plates of the left tube in bistable multivibrators 318, 320, 322 and 324. The plate of the left tube in the multivibrator 318 is also connected to an input terminal of a gate circuit 326, another input terminal of which has a voltage applied to it from the monostable multivibrator 330 corresponding to the multivibrator 118 shown in Figure 1. The output from the gate circuit 326 is applied through an "or" network 328 to the grid of the right tube in the multivibrator 318. The "or" network 328 also receives voltage from the output terminal of a gate circuit 331, input terminals of which are connected to the coil 40 and to an inverter 332. The input terminal of the inverter 332 is connected to the stationary contact of the switch 256.

A gate circuit 334 similar to the circuit 326 receives its voltages from the plate of the right tube in the multivibrator 318 and the plate of the left tube in the multivibrator 330. The output from the gate circuit 334 is applied to the grid of the left tube in the multivibrator 318. Similarly, a gate circuit 336 has voltages applied to its input terminals from the plate of the right tube in the multivibrator 320 and from the gate circuit 326. The output signal from the gate circuit 336 passes to the grid of the left tube in the multivibrator 320.

Connections are made to input terminals of a gate circuit 338 from the gate circuit 326 and from the plate of the left tube in the multivibrator 320. The output signals from the gate circuit 338 pass through an "or" network 340 to the grid of the right tube in the multivibrator 320. The "or" network 340 also has a voltage applied to it from the gate circuit 331. The multivibrators 322 and 324 are connected in a similar manner to operate in conjunction with the multivibrators 318 and 320 to provide a binary count from "1" to "16." A multivibrator 342 is also associated with the multivibrators 318, 320, 322 and 324 to increase the count from "16" to "32." The construction and operation of the multivibrators 318, 320, 322, 324 and 342 are similar in construction and operation to the cascade of multivibrators shown in Figure 17 of U.S. Patent 2,900,134.

A multivibrator 346 also controls the operation of the driver 296. The grid of the left tube in the multivibrator 346 receives its voltage from a gate circuit 348 having certain input terminals connected to the adder 272, the plate of the left tube in the multivibrator 263, through the line 250 to the counter 222 and through a line 350 to the counter 290. Other input terminals of the gate circuit 348 are connected to the stationary contact of the switch 258 and to the movable contact of a switch 352. The stationary contact of the switch 352 also has a common terminal with a grounded resistance 354, and the movable contact receives its voltage from the positive terminal of the battery 262.

The grid of the right tube in the multivibrator 346 receives the signals passing through an "or" network 356 from the gate circuit 330 and a gate circuit 358. Connections are made to input terminals of the gate circuit 358 from the plate of the left tube in the multivibrator 346 and from the gate circuit 316. The output signals from the gate circuits 358 also pass to the grid of the left tube in a bistable multivibrator 360, which also provides one of the controls over the operation of the driver 296. The grid of the right tube in the multivibrator 360 is connected to a gate circuit 362 having input terminals connected to the plate of the left tube in the multivibrator 360, to the stationary contact of the switch 352 and through the lines 250 and 350 to the counters 222 and 290, respectively.

The driver 296 is operated by the signals passing through an "or" network 364. Connections are made to input terminals of the "or" network 364 from the plates of the left tubes in the multivibrators 308, 346 and 360 and from the output terminal of a gate circuit 366. Input terminals of the gate circuit 366 are connected to the plates of the left tubes in multivibrators 368 and 370. The output from the driver 296 is in turn applied to an input terminal of a gate circuit 372 having other input terminals connected to the coil 40, to the plate of the left tube in the multivibrator 330 and to the plate of the right tube in the multivibrator 263. Other input terminals of the gate circuit 372 are connected through the line 250 to the counter 222 and through the line 350 to the counter 290. An input terminal of the gate circuit 372 also receives the signals from the movable contacts of the switches 256 and 258.

The circuits controlling the operation of the multivibrators 368 and 370 and of a multivibrator 378 are shown in Figure 4. The grid of the left tube in the multivibrator 378 receives its voltage through an "or" network 380 from a gate circuit 382 and from the plate of the left tube in the multivibrator 342 also shown in Figure 3. The gate circuit 382 has input terminals connected to the plates of the right tubes in the multivibrators 368 and 370 and to the plate of the left tube in the multivibrator 232 also shown in Figure 2. The gate circuit 382 also has signals applied to its input terminals through a line 384 from the counter 222 and through a line 386 from the counter 290. Another input terminal of the gate circuit 382 receives its voltage from the stationary contact of a switch 388. The stationary contact of the switch 388 has a common terminal with a grounded resistance 390 and the movable contact of the switch 388 has voltage applied to it from the positive terminal of the battery 262.

Signals pass to the grid of the right tube in the multivibrator 378 from a gate circuit 392 having input terminals connected to the plates of the right tubes in the multivibrators 232, 368 and 370. Other input terminals of the gate circuit 392 are connected to the stationary contact of the switch 388, through the line 384 to the counter 222 and through the line 386 to the counter 290.

The voltages on the plates of the left and right tubes in the multivibrator 378 are applied to input terminals of gate circuits 396 and 398 and gate circuits 400 and 402, respectively. Other input terminals of the gate circuit 396 and 402 are connected to the plate of the left tube in the multivibrator 232 and other input terminals of the gate circuit 398 and 400 are connected to the plate of the right tube in the multivibrator 232.

The output signals from the gate circuits 396 and 400 pass through an "or" network 404 to an input terminal of a gate circuit 406. The gate circuit 406 also receives voltages at other input terminals from the plates of the left tubes in the multivibrators 263 and 368 and the plate of the right tubes in the multivibrator 370. Other input terminals of the gate circuit 406 are connected to the stationary contact of the switches 258 and 388 and through the line 386 to the counter 290. The signals from the gate circuit 406 pass to the grid of the left tube in the multivibrator 370.

In like manner, the signals from the gate circuits 398 and 402 pass through an "or" network 408 to an input terminal of a gate circuit 410. Connections are made to other input terminals of the gate circuit 410 from the plates of the left tubes in the multivibrators 263, 368 and 370 and from the stationary contacts of the switches 258 and 388. Signals also pass to an input terminal of the gate circuit 410 through the line 386 from the counter 290. The output signals from the gate circuit 410 are applied through an "or" network 412 to the grid of the right tube in the multivibrator 370. The "or" network 412 also receives signals from a gate circuit 414 having input terminals connected to the plate of the left tube in the multivibrator 378 and to the gate circuit 316 also shown in Figure 3.

The voltage on the grid of the left tube in the multivibrator 368 is determined by the signals passing through a gate circuit 418. Input terminals of the gate circuit 418 are connected to the adder 272, to the plate of the left tube in the multivibrator 263 and to the plate of the right tube in the multivibrator 368. Connections are made to other input terminals of the gate circuit 418 from the stationary contact of the switch 388, through the line 250 from the counter 222 and through the line 386 from the counter 290.

The grid of the right tube in the multivibrator 368 receives the signals passing through an "or" network 420 from the gate circuit 414 and from a gate circuit 422. Connections are made to input terminals of the gate circuit 422 from the "or" network 408, and from the plates of the left tubes in the multivibrators 263 and 368. Other input terminals of the gate circuit 422 have voltages applied to them from the stationary contact of the switches 258 and 388 and through the line 386 from the counter 290.

Figure 2:
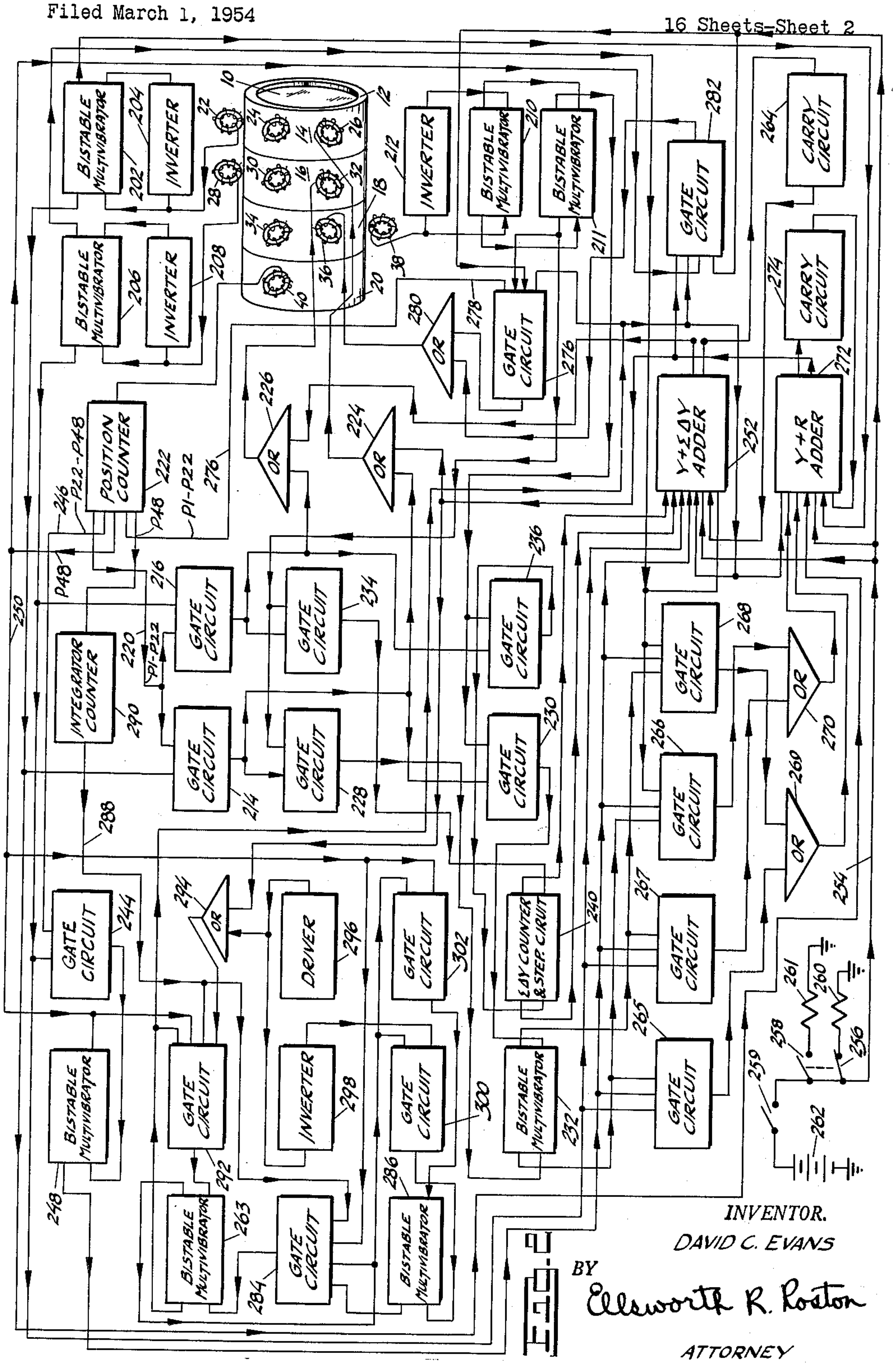
Figures 2, 3, 4 and 5 are schematic diagrams, partly in block form and partly in perspective, illustrating in some detail certain of the electrical features constituting the digital differential analyzer shown in Figure 1.
Figure 5:
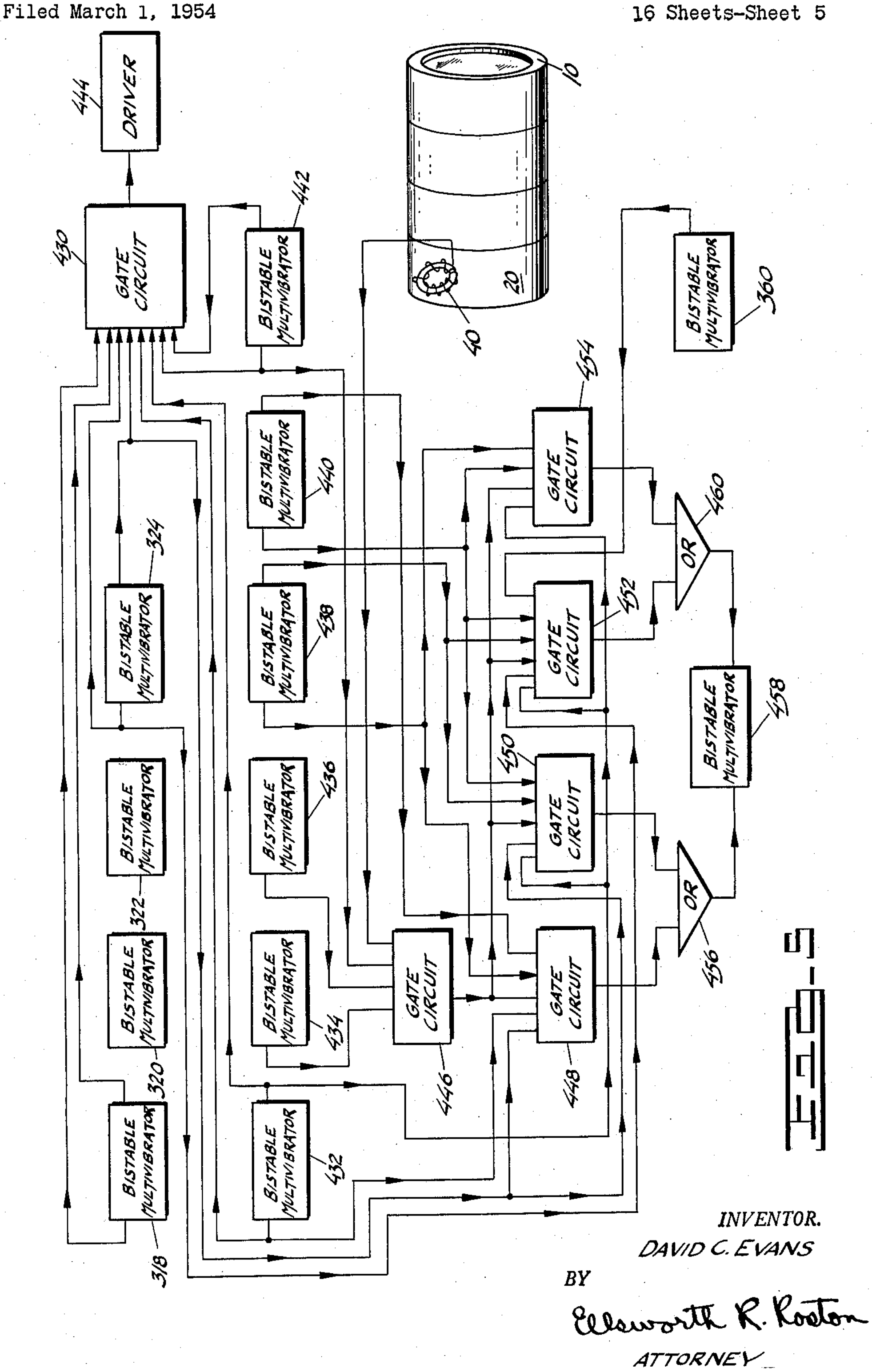

The bistable multivibrators 318, 320, 322, and 324 shown in Figure 2 are connected to a gate circuit 430 shown in Figure 5. Only the connections from the gate circuits 318 and 324 are shown connected for purposes of simplification. Bistable multivibrators 432, 434, 436, 438, 440 and 442 are also connected to the gate circuit 430. The bistable multivibrators 432, 434, 436, 438, 440 and 442 respectively correspond to the multivibrators $F_1$, $F_2$, $F_3$, $F_4$, $F_5$ and $F_6$ shown in Figures 18 to 23, inclusive of U.S. Patent 2,900,134. Like their corresponding multivibrators in the co-pending application, the multivibrators 432, 444, 436, 438, 440 and 442 provide a count from "1" to "48" for successive pulse positions in each integrator.

Although the gate circuit 430 is shown as a single block, it actually comprises a plurality of "and" circuits and "or" networks in a manner which will be disclosed in detail hereinafter. These circuits and networks are shown as a single block for purposes of simplification. The output from the gate circuit 430 is applied to a driver 444 which is similar in construction and operation to the driver 296 shown in Figure 2.

Connections are made to a gate circuit 446 from the plates of the left tubes in the multivibrators 434, 436 and 442. An input terminal of the gate circuit 446 also has a voltage applied to it from the coil 40 in the channel 20. The output from the gate circuit 446 passes to input terminals of gate circuits 448, 450, 452 and 454.

In addition to receiving the voltage from the gate circuit 446, the gate circuit 448 receives input voltages from the plates of the right tubes in the multivibrators 324 and 440 and from the plates of the left tubes in the multivibrators 432 and 438. Similarly, other input terminals of the gate circuit 450 are connected to voltages from the plates of the left tubes in the multivibrators 324 and 440 and to the plates of the right tubes in the multivibrators 432 and 438. The output signals from the gate circuits 448 and 450 pass through an "or" network 456 to the grid of the left tube in a bistable multivibrator 458.

Like the gate circuit 450, the gate circuit 452 receives voltages from the plates of the right tubes in the multivibrators 432 and 438 and the plate of the left tube in the multivibrator 440. The gate circuit 452 also receives input voltages from the plates of the right tubes in the multivibrators 324 and 360. In addition to its connection to the gate circuit 446, the gate circuit 454 has input terminals connected to the plates of the left tubes in the multivibrators 438 and 440 and to the plate of the right tube in the multivibrator 432. The output signals from the gate circuits 452 and 454 pass through an "or" network 460 to the grid of the right tube in the multivibrator 458.

As previously disclosed, the tape 170 is shown in Figure 6. The tape is mounted on a sprocket wheel 470 and on wheels 472 and is adapted to be driven by the sprocket wheel 470 in a forward direction as indicated by an arrow 474. The rotation of the sprocket wheel 470 is controlled by a pawl 476 adapted to be actuated by an armature 478. The position of the armature 478 is controlled by a solenoid 480.

One terminal of the solenoid 480 is grounded, and the other terminal is connected to the plate of the left tube in a multivibrator 484. The grid of the left tube in the multivibrator 484 receives its voltage from the output terminal of a gate circuit 482 having input terminals to the plates of the left tubes in the multivibrators 308 and 330 shown in Figure 3.

The tape 170 also has second and third sequences of holes 174 and 176 as will be seen in Figure 6. The sequences 174 and 176 do not necessarily have a hole in each position corresponding to the positions provided by the holes 172. A switch 486 is associated with the second sequence of holes 174 for closure upon the appearance of a hole. Similarly, a switch 488 is associated with the sequence of holes 176 to close when a wheel appears in the sequence.

Figure 7:
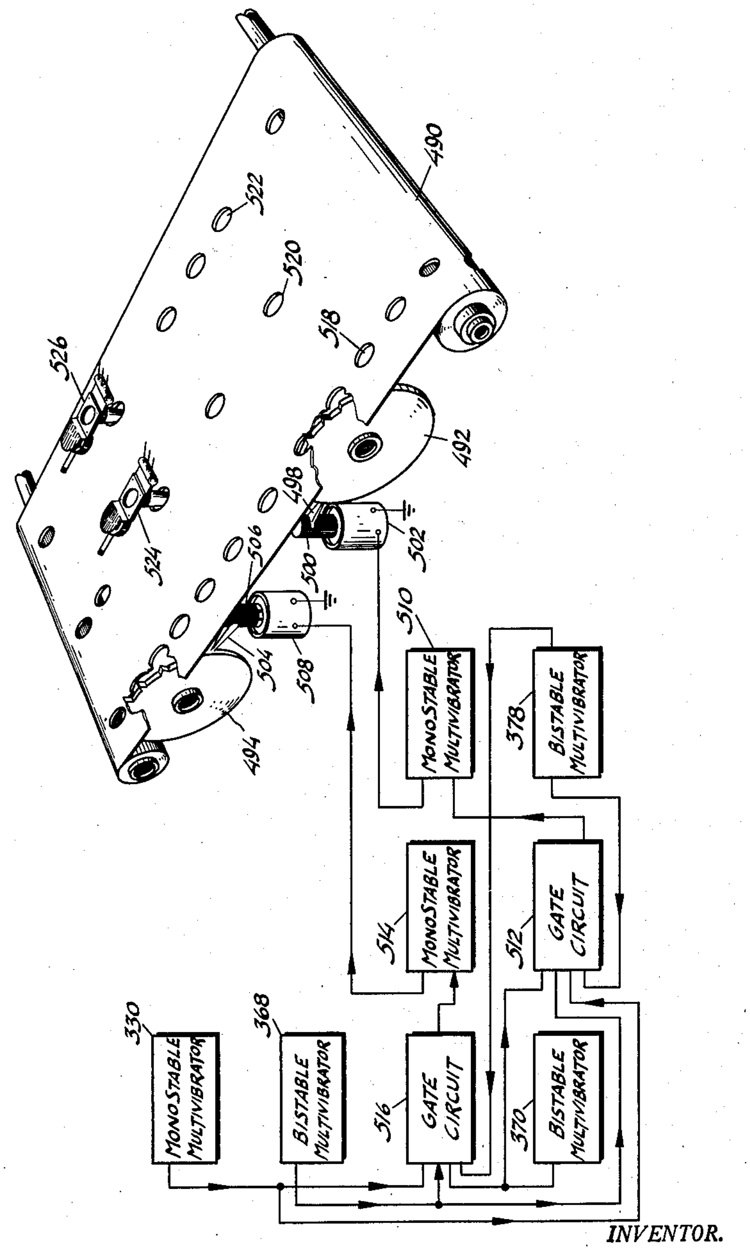
Figure 8:
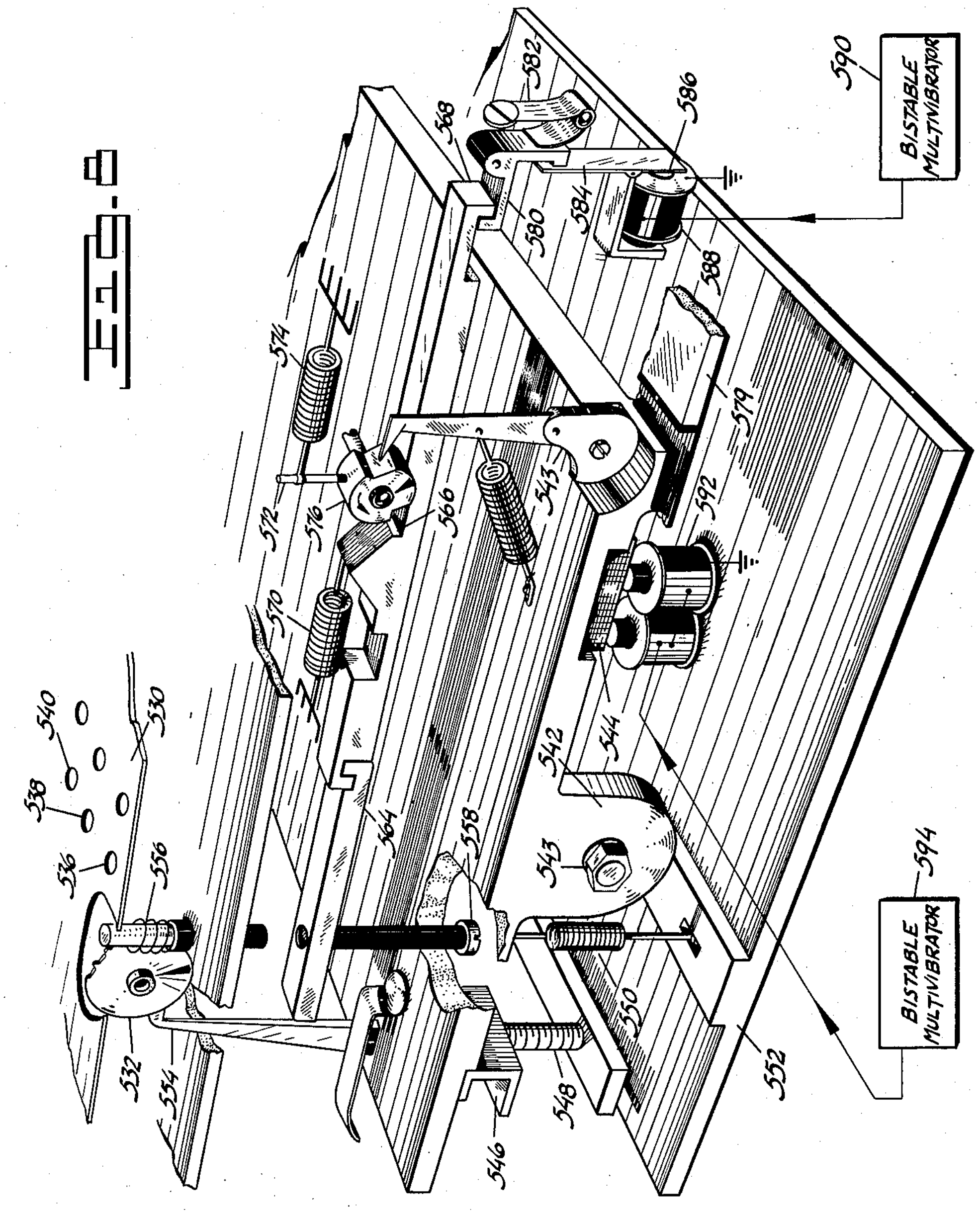

A tape 490 corresponding to the tape 170 is shown in Figure 7. The tape is adapted to be driven on sprocket wheels 492 and 494. A pawl 498, an armature 500 and a solenoid 502 are associated with the sprocket wheel 492 in a manner similar to the association of the pawl 476, the armature 478 and the solenoid 480 with the sprocket wheel 470 shown in Figure 6. Similarly a pawl 504, an armature 506 and a solenoid 508 are associated with the sprocket wheel 494 to drive the wheel in an opposite direction to that in which the sprocket wheel is driven.

One terminal of the solenoid 502 is grounded and the other terminal is connected to the plate of the left tube in a mono-stable multivibrator 510. The grid of the left tube in the multivibrator 510 receives its voltage from a gate circuit 512 having input terminals connected to the plates of the left tubes in the multivibrators 330, 368, 370 and 378. Similarly, the solenoid 508 has a grounded terminal and a second terminal connected to the plate of the left tube in a monostable multivibrator 514. Voltages are applied to the grid of the left tube in the multivibrator from a gate circuit 516 having input terminals connected to the plates of the left tubes in the multivibrators 330, 368 and 370 and to the plate of the right tube in the multivibrator 378.

The tape 490 is provided with a sequence of holes 518 corresponding to the holes 172 in the tape 170. The holes 518 are adapted to fit on teeth in the sprocket wheels 492 and 494. The tape 490 is also provided with second and third sequences of holes 520 and 522 corresponding to the holes 174 and 176 in the tape 170. Switches 524 and 526 are associated with the holes 520 and 522 in a manner similar to that in which the switches 486 and 488 are associated with the holes 174 and 176.

Figure 8:
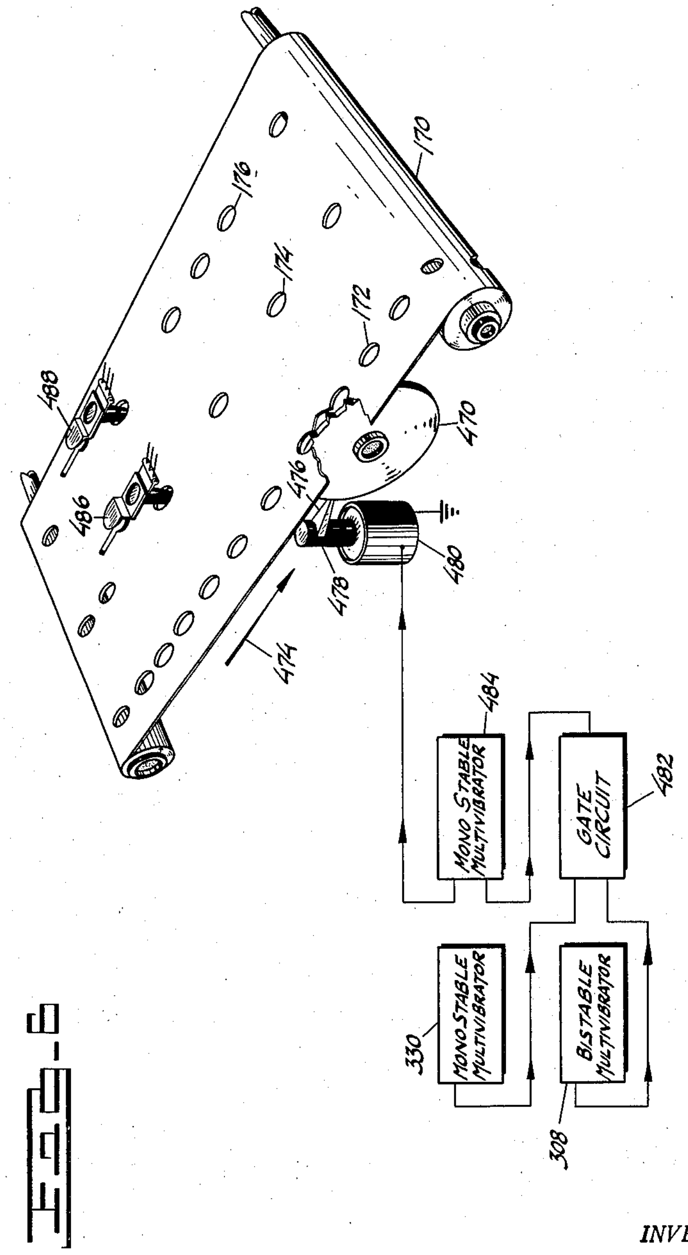

A third tape 530 is shown in Figure 8. The tape is supported on a sprocket wheel 532 and on other wheels (not shown). A first sequence of holes 536 corresponding to the holes 172 in the tape 170 is adapted to be provided in the tape 530 to provide a guide for the movement of the tape. Second and third sequences of holes 538 and 540 are also adapted to be provided in the tape to give a permanent record of a particular quantity being computed in the analyzer. The holes 538 and 540 respectively correspond to the holes 174 and 176 in the tape 170.

A punch hammer 542 is positioned below the tape 530 and is pivotable on a pin 543. An armature 544 made from a suitable magnetic material is provided on the hammer 542 at an intermediate position to the right of the stud 543, and an extending hooker arm 545 is provided at an extreme right position. A stop 546 is positioned below the punch hammer 542 at the extreme left end of the hammer and is adjustably positioned by a screw 548. A spring 550 is supported between the hammer 542 and the walls of a housing 552 at a position intermediate the stud 543 and the stop 546.

One end of a pawl 554 is secured to the hammer 542, and the other end of the pawl 554 is adapted to engage the teeth of the sprocket wheel 532 so as to move the sprocket 532 from one hole to the next in the sequence 536. The holes 536 are produced by a finger 556 which is actuated upwardly by a stud 558 supported by the hammer 542. A spring 560 is mounted on the finger 556 to become constrained upon an upward movement of the finger.

In like manner, a finger 562 is positioned adjacent the sequence of holes 536 to punch a hole when actuated. A selector bar 564 is positioned below the finger 562 in longitudinal displacement from the finger. The selector bar 564 has a groove 566 at an intermediate position and a detent 568 at its extreme right end as shown in Figure 8. A spring 570 is attached to the selector bar 564 to become constrained upon a longitudinal displacement of the bar.

A vane 572 extends into the groove 566. The vane 572 is pivotable at an intermediate position and is attached to a spring 574 which is adapted to become constrained upon a pivotal movement of the vane. A ratchet 576 is pivotable with the vane 572 and is disposed adjacent the hooker arm 545 for engagement by the arm. The movable contact of a normally closed switch 579 is positioned below the hooker arm 545 and is adapted to become displaced from the stationary contact of the switch upon a pivotable movement of the arm.

In its normal positioning, the detent 568 engages one arm of a bell crank lever 580, the other arm of which has a force applied to it by a latch spring 582. The second arm of the bell crank lever 580 is pivotable at an intermediate position and is attached at its bottom and to an armature 586 of a solenoid 588 for movement with the armature.

One terminal of the solenoid 588 is grounded and the other terminal is connected to the plate of the left tube in a bistable multivibrator 590. Similarly, a pair of solenoids 592 are in series between the plate of the left tube in a bistable multivibrator 594 and ground. A pair of solenoids 592 are provided to make certain that the punch hammer 542 will be actuated when the solenoids are energized. The solenoid 592 is positioned below the armature 544 on the punch hammer 542 to rock the hammer when energized.

Figure 9:
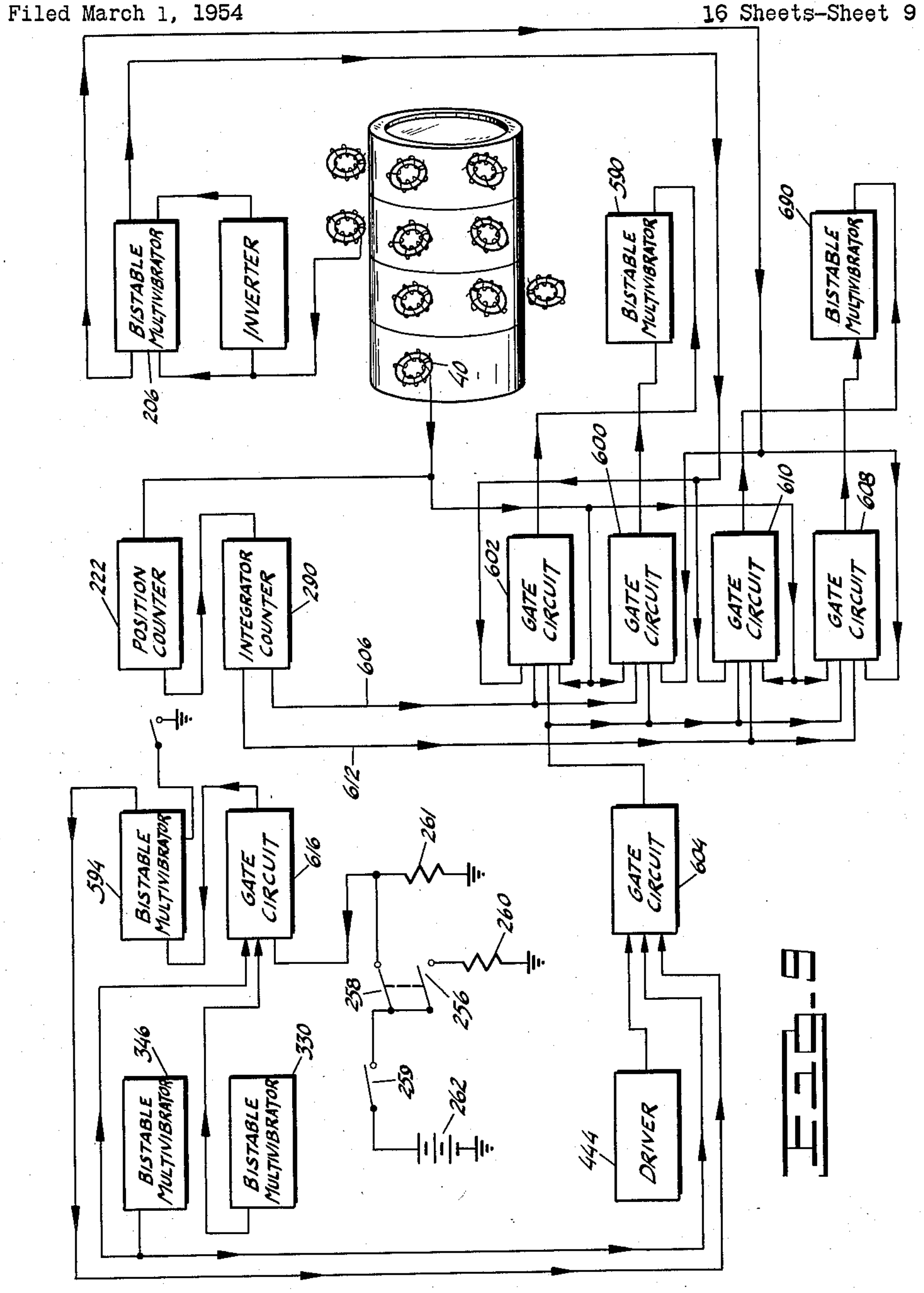
Figures 9 and 10 are schematic diagrams, partly in block form and partly in perspective, illustrating in some detail other electrical features in the digital differential analyzer.

The multivibrator 590 and a corresponding multivibrator 600 associated with the holes 540 are shown in Figure 9. The grids of the left and right tubes in the multivibrator 590 respectively receive voltages from gate circuits 600 and 602. Input terminals of the gate circuits 600 are connected to a gate circuit 604, to the coil 40, to the plate of the left tube in the multivibrator 206 and through a line 606 to the counter 290. The gate circuit 602 also has input terminals connected to the gate circuit 604, to the coil 40 and through the line 606 to the counter 290. In addition, a voltage is applied to the input terminals of the gate circuit 602 from the plate of the right tube in the multivibrator 206.

Connections are made to input terminals of the gate circuit 604 from the driver 444, from the plate of the left tube in the multivibrator 346 and from the plate of the right tube in the multivibrator 594 also shown in Figure 8. The output from the gate circuit 604 is applied to gate circuits 608 and 610 as well as to the gate circuits 600 and 602. Other input terminals of the gate circuit 608 receive voltages from the coil 40, from the plate of the left tube in the multivibrator 206 and through a line 612 from the counter 290. Similarly, other input terminals of the gate circuit 610 are connected to the coil 40, to the plate of the right tube in the multivibrator 206 and through the line 612 to the counter 290. The output signals from the gate circuits 608 and 610 respectively pass to the grids of the left and right tubes in the multivibrator 600.

The grid of the right tube in the multivibrator 594 is connected to the movable contact of the switch 579 and the stationary contact of the switch is grounded. The grid of the left tube in the multivibrator 594 has voltage applied to it from a gate circuit 616, input terminals of which are connected to the plates of the left tubes in the multivibrators 330 and 346 and to the stationary contact of the switch 258.

Figure 10:
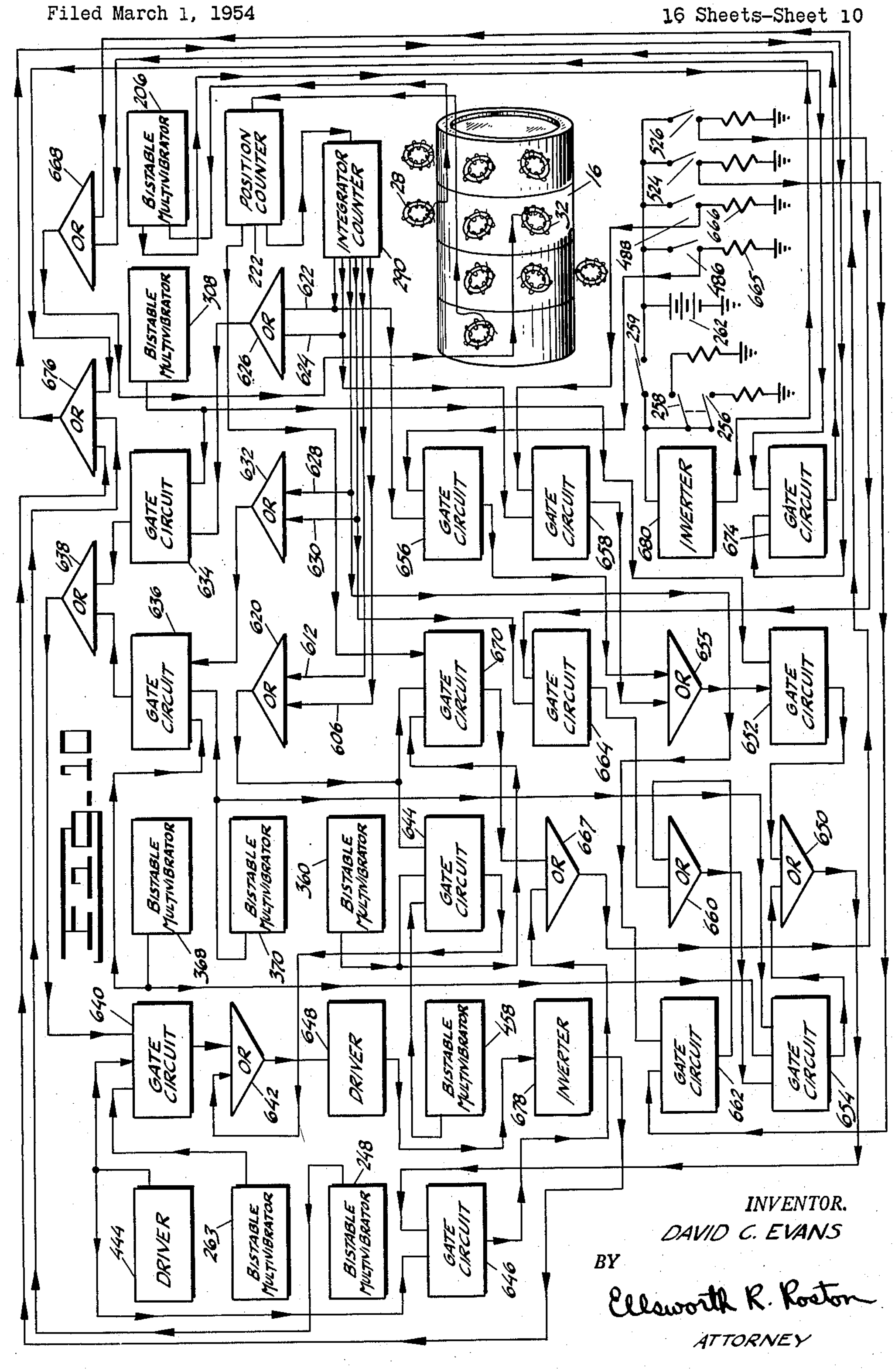

The lines 606 and 612 shown in Figure 9 are connected to an "or" network 620 shown in Figure 10. Similarly, lines 622 and 624 are connected to the counter 290 and to an "or" network 626 and lines 628 and 630 pass the particular voltages from the counter 290 to an "or" network 632. The signals passing through the "or" networks 626 and 632 are respectively applied to input terminals of gate circuits 634 and 636.

Connections are made to a second input terminal of the gate circuit 634 from the plate of the left tube in the multivibrator 308 and to other input terminals of the gate circuit 636 from the plates of the left tubes in the multivibrators 368 and 370. The signals from the gate circuits 634 and 636 pass through an "or" network 638 to an input terminal of a gate circuit 640 having other input terminals connected to the driver 444 and to the plate of the right tube in the multivibrator 263. The signals from the gate circuit 640 are applied to an "or" network 642. The "or" network 642 also receives signals from a gate circuit 644 having input terminals connected to the "or" network 620 and to the plates of the left tubes in the multivibrators 360 and 458.

The signals passing through the "or" network 642 are introduced to a driver 648. Input terminals of the gate circuit 646 have voltages applied to them from the driver 444 and from an "or" network 650. Signals in turn pass through the "or" network 650 from gate circuits 652 and 654.

Connections are made to input terminals of the gate circuit 652 from the plate of the left tube in the multivibrator 308 and from an "or" network 655 which receives the voltages from gate circuits 656 and 658. The gate circuit 656 has input terminals connected to the stationary contact of the switch 486 and through the line 622 to the counter 290. In like manner, input terminals of the gate circuits 658 receive voltages from the stationary contact of the switch 488 and through the line 624 from the counter 290.

Input terminals of the gate circuit 654 are connected to the plates of the left tubes in the multivibrators 368 and 370 and to the output terminal of an "or" network 660. Signals pass through the "or" network 660 from gate circuits 662 and 664. The gate circuit 662 has input signals applied to it from the stationary contact of the switch 524 and through the line 628 from the counter 290. In like manner, input signals are introduced to the gate circuit 664 from the stationery contact of the switch 526 and through the line 630 from the counter 290. The stationary contacts of the switches 486 and 488 are also respectively connected to grounded resistances 665 and 666.

The signals from the gate circuit 646 pass through "or" networks 667 and 668 to the coil 32 for recordation in the channel 16. The "or" network 667 also receives the signals from a gate circuit 670 having input terminals connected to the "or" network 620, the grid of the left tube in the multivibrator 360 and through a line 672 to the counter 222. In addition to its connection to the "or" network 667 the "or" network 668 is connected to a gate circuit 674 having input terminals connected to the plate of the left tube in the multivibrator 206 and to an "or" network 676. Signals pass through the "or" network 676 from the plate of the right tube in the multivibrator 248 and from inverters 678 and 680. The inverter 678 is connected to the output of the driver 648, and the inverter 680 is connected to the movable contacts of the switches 256 and 258.

As previously disclosed, a pulse is provided in the channel 14 in one of the first 22 positions for each integrator to control the occurrence of the $\Delta x$ increment for the integrator every time that the integrator is presented for computation. The particular position in which the coding pulse is recorded for the integrator undergoing computation is dependent upon which of the other integrators sends $\Delta x$ increments into the integrator undergoing computation. Since the interrelationship between integrators remains constant during the solution of a problem, the coding pulse in the channel 14 in one of the first 22 positions for each integrator remains constant during the solution of the problem. As a result, these pulses have to be retained during the solution of a problem.

Retention of the pulses in the channel 14 is provided by the multivibrator 202 (Figure 2), the gate circuit 214 and the "or" network 224. The pulses in the channel 14 having a first polarity of magnetization are converted by the coil 28 to pulses of relatively high voltage. These pulses are then introduced to the grid of the left tube in the multivibrator 202 so as to cut off the tube. When the left tube in the multivibrator 202 becomes cut off, a high voltage is produced on the plate of the tube and is introduced to the gate circuit 214.

The gate circuit 214 is opened by a signal from the counter 222 when the first pulse in each integrator is picked up by the coil 40. The gate circuit 216 remains open so that information in the channel 14 up to and including the 22nd pulse position for each integrator can pass through the gate circuit. During the time that the gate circuit 214 remains open, any positive pulse produced on the plate of the left tube in the multivibrator 202 passes through the gate circuit to the "or" network 224. The network 224 in turn passes to the coil 26 any positive pulses introduced to it, and the coil 26 records this information in the channel 14 as signals having a first polarity of magnetization. In this way, the coil 26 operates to produce a magnetic field in the channel 14 similar to the pattern of electrical signals induced in the coil 22.

In like manner, a pulse of low voltage is induced in the coil 22 to indicate the integer "0" for a pulse position. This voltage pulse is inverted by the inverter 204 and induced as a positive pulse to the grid of the right tube in the multivibrator 202 to cut off the tube and to produce a positive pulse on the plate of the tube. Since the right tube in the multivibrator 202 becomes cut off upon the introduction of such a pulse, the left tube becomes conductive. This causes a pulse of low voltage to pass to the coil 26 for recordation in the channel 14.

Similarly, the multivibrator 206, the gate circuit 216, the "or" network 226 and the coil 32 in Figure 2 operate to recirculate in the channel 16 the positive coding information in the first 22 positions for each integrator. As previously disclosed, positive pulses may be provided in the channel 16 in the first 22 positions for each integrator to indicate whether any variations in the value of the dependent quantity $y$ will be made for the integrator.

The gate circuits 234 and 236 operate to determine the polarity of each $\Delta y$ increment. The gate circuits 234 and 236 provide such a determination since they receive all of the coding pulses passing through the gate circuit 216. Since the gate circuit 234 is also connected to the plate of the left tube in the multivibrator 211, it can open for the passage of a signal only when a high voltage is produced on the plate of the left tube in the multivibrator 211 at the time that a pulse passes through the gate circuit 216. A relatively high voltage is produced on the plate of the left tube in the multivibrator 211 only when a relatively high voltage is induced in the coil 38. As previously disclosed, the coil 38 indicates in adjacent pulse positions an overflow in the cumulative value of the $y\Delta x$ increments for each of the 22 integrators in the analyzer.

Since each signal passing through the gate circuit 234 provides an indication of a positive $\Delta y$ increment for an integrator, each of these signals causes the numerical indications provided by the counter 240 to increase by an integer in a positive direction. For example, a signal passing to the counter 240 from the gate circuit 234 may cause the counter to provide a numerical indication of +3 when an indication of +2 was previously provided by the counter. Similarly, the indications in the counter 40 may change from —3 to —2 upon the passage of a signal through the gate circuit 234. The content of the counter 240 is stepped out to be combined with the value $y$ in a binary serial manner. One line from the counter 240 to the adder 252 carries pulses to indicate "ones" while the other line provides the negation of the pulse signal.

As previously disclosed, a positive $\Delta y$ increment for an integrator is indicated by the simultaneous triggering of the left tubes in the multivibrator 206 and 211 into states of non-conductivity in one of the first 22 positions for the integrator. Similarly, a negative $\Delta y$ increment is indicated by a non-conductivity of the right tube in the multivibrator 211 at the time that left tube of the multivibrator 206 becomes cut off in one of the first 22 positions for the integrator. Because of the high voltage produced on the plate of the right tube in the multivibrator 211, signals pass through the gate circuit 236 to the counter 240.

Since the counter 240 is adapted to provide negative count as well as a positive count of the $\Delta y$ increments it operates upon the induction of signals from the gate circuit 236 to subtract an integer from the resultant value of the counter. For example, the indications in the counter 240 are changed from +4 to +3 when a signal is introduced to the counter from the gate circuit 236.

As previously disclosed, the counter 240 is formed from a plurality of multivibrators arranged in cascade relationship. These multivibrators retain the information relating to the cumulative value of the $\Delta y$ increments for each integrator until after the 22nd pulse position for the integrator. Upon the appearance of the first pulse in the channel 16 after the first 22 pulse positions the counter 240 is operated to pass the information in each of the multivibrators in the counter sequentially to the adder 252. For example, the information in the first multivibrator in the counter passes to the adder 252 in a first pulse position; the information in the second multivibrator passes to the adder in the next pulse position, etc.

Upon the occurrence of the first positive pulse in the channel 16 after the first 22 positions for each integrator, a signal passes through the gate circuit 244. This signal passes through the gate circuit 244 because of the high voltage imposed by the counter 222 on the line 246 after the 22 pulse positions for each integrator. The signal passing through the gate circuit 244 triggers the left tube in the multivibrator 248 into a state of non-conductivity. The left tube in the multivibrator 248 then remains cut off until pulse position 48 for each integrator. At pulse position 48, a signal passes from the counter 222 through the line 250 to the grid of the right tube in the multivibrator 248 to trigger the tube into a state of non-conductivity. In this way, the multivibrator 248 is prepared at the end of each integrator for proper operation in the pulse positions of the next integrator.

When the left tube in the multivibrator 248 becomes cut off upon the occurrence of the first pulse in the channel 16 after the first 22 pulse positions for each integrator, a relatively high voltage is produced on the plate of the tube. This voltage is introduced to the adder 252 to produce an operation of the adder. The adder then becomes operative provided that relatively high voltages are also simultaneously produced on the plate of the left tube in the multivibrator 263 and on the movable contacts of the switches 256 and 258.

As disclosed in detail in U.S. Patent 2,900,134, a relatively high voltage is produced on the plate of the left tube in the multivibrator 263 during the time that the analyzer is actually proceding with the computation of a problem and during certain periods in which information is being filled into the analyzer for the solution of a problem. A relatively high voltage is not produced on the plate of the left tube in the multivibrator 263 during the time that the analyzer may be idle during successive periods of computation.

Since the switches 256 and 258 are ganged, one of the switches is always closed. These switches correspond to the switches designated as the $\phi$ and $\theta$ switches in Figure 50 of U.S. Patent 2,900,134. Thus, when the switch 259 is manually closed, current flows through a circuit including the battery 262, the switch 259, one of the switches 256 and 258 and one of the resistances 260 and 261. This current causes a relatively high voltage to be produced across either the resistance 260 or the resistance 261 for introduction to the adder 252. As disclosed in U.S. Patent 2,900,134, the switch 260 is manually closed to produce a high voltage for introduction to the adder 252 only when the digital differential analyzer is actually performing computations or when it is idling between successive periods of computation on a problem.

It has been disclosed above that the plate of the left tube in the multivibrator 248 has a high voltage only during periods of computation and filling of information. Furthermore, the movable contacts of the switches 256 and 258 have a high voltage only during periods of computation or idling. As will be seen, relatively high voltages can be simultaneously obtained from these members only during periods of actual computation. For this reason the adder 252 is operative only during the time that computation is actually proceding towards the solution of a problem.

During its periods of operation, the adder 252 arithmetically combines the signals from the counter 240 with the signals produced by the multivibrator 206. Thus, the added 252 combines the cumulative value of the $\Delta y$ increments for each integrator with the value of $y$ for the integer to obtain a new value of $y$ for the integrator. The arithmetical combination of the values of $y$ and $\Delta y$ for each integrator is obtained for each pulse position in sequence as the drum 10 rotates. For example, the arithmetical combination of the indications $y$ and $\Delta y$ in the 25th pulse position for a particular integrator may first be obtained. The arithmetical combination of the values of $y$ and $\Delta y$ may thereafter be sequentially obtained for the 26th and the following pulse positions for the integrator.

Sometimes, upon the arithmetical combination of the values of $y$ and $\Delta y$ for a particular pulse position, the adder 252 may obtain a full binary indication of "2." In binary form, an indication of "2" is equivalent to a value of "0" for the pulse position and a carry of "1" to the next highest digit. For example, when a binary indication of "1" for $y$ in the 26th position is added to a binary indication of "1" for $\Delta y$ in the same position, the resultant value may be "0" in the 26th position with a carry of "1" into the 27th position. This carry is provided by the circuit 264.

A carry may also be provided from a first pulse position to the next position when a carry from the position immediately preceding the first position is added to the integer "1" indicating the value of either $y$ or $\Delta y$ for the first position. For example, a carry may be provided from pulse position 29 to pulse position 30 as a result of an addition in pulse position 29. The addition of this carry indication with an integer "1" indicating the value of the dependent quantity $y$ for pulse position 30 causes a carry to be obtained for pulse position 31. To review, the several inputs to the adder 252 include, (from top to bottom): two lines for carrying the pulses representative of $\Sigma\Delta y$ and the negation of these pulses; a line for carrying the pulses representative of $y$; three lines for carrying a two-state signal which must be high in each case for the adder to operate; a line for carrying pulses representing carry digits from the addition; and a line for carrying the negation signal of the pulses representative of $y$.

By arithmetically combining the values of $y$, $\Delta y$ and the carry indication for each pulse position, a new value of $y$ is obtained. The new indication of $y$ for each pulse position passes sequentially through the "or" network 226 and produces a corresponding signal pattern in the coil 32. This signal pattern causes the coil 32 to record in the channel 16 the new value of $y$ for each pulse position. The information relating to the new value of $y$ subsequently passes from the coil 28 through the multivibrator 206 to the adder 252 for utilization by the adder. After the information has been utilized by the adder 252, it is erased by the coil 30.

The occurrence of each $\Delta x$ increment for an integrator and the polarity of each such increment are determined in a manner similar to that disclosed above for the $\Delta y$ increments. Thus, a $\Delta x$ increment occurs for an integrator when a pulse of relatively high voltage is produced on the plate of the left tube in the multivibrator 202 in one of the first 22 positions for the integrator. The $\Delta x$ increment is positive when a relatively high voltage is produced on the plate of the left tube in the multivibrator 211 at the instant that a relatively high voltage appears on the plate of the left tube in the multivibrator 202. The $\Delta x$ increment is negative if a relatively high voltage is not produced on the plate of the left tube in the multivibrator 211 at the same instant as a relatively high voltage on the plate of the left tube in the multivibrator 202.

Because of its connections to the plates of the left tubes in the multivibrators 202 and 211, the gate circuit 228 passes only signals representing positive $\Delta x$ increments. These signals pass to the grid of the left tube in the multivibrator 232 and trigger the tube into a state of non-conductivity. Similarly, the gate circuit 230 passes signals representing only negative $\Delta x$ increments, and these signals trigger the right tube in the multivibrator 232 into a state of non-conductivity. In this way, the voltages produced on the plates of the left and right tubes in the multivibrator 232 for each integrator provide an indication as to whether the $\Delta x$ increment for integrator is positive or negative.

When the left tube in the multivibrator 232 is cut off, a relatively high voltage is introduced from the plate of the tube to input terminals of the gate circuits 265 and 266. Since the gate circuits 265 and 266 also receive voltages from the plate of the left tube in the multivibrator 248, the gate circuits are able to pass signals only after the occurrence of the start pulse for each integrator.

Upon the opening of the gate circuit 265 by the voltages from the multivibrators 232 and 248, the gate circuit passes the pulses of high voltage from the plate of the left tube in the multivibrator 206. As previously disclosed, these pulses provide an indication representing the integer "1" for different pulse positions in the channel 16 for each integrator. Since such indications represent the dependent quantity for each integrator, they may be designated by "Y" in conformity with the designations in co-pending application Serial No. 217,478.

When relatively high voltages are simultaneously introduced to the gate circuit 265 from the plates of the left tubes in the multivibrators 206 and 232, the gate circuit passes a signal to the "or" network 269. Since the left tube in the multivibrator 206 provides signals indicative of "Y" and the left tube in the multivibrator 232 indicates $+\Delta x$ when its voltage is high, each signal passing to the "or" network 269 indicates the value $(Y)(\Delta x)$ for a particular pulse position. The value $(Y)(\Delta x)$ is an "and" proposition which is true only when both Y and $\Delta x$ are simultaneously true. The value $(Y)(\Delta x)$ corresponds in binary form to the integer "1" for different pulse positions.

For a value of "0" for a pulse position in the channel 16, a relatively high voltage is produced on the plate of the right tube in the multivibrator 206. The positive pulse on the plate of the right tube in the multivibrator 206 passes through the gate circuit 266 when relatively high voltages are simultaneously produced on the plates of the left tubes in the multivibrators 202 and 248. In this way, the pulses passing through the gate circuit 266 to the multivibrator 206 indicate a value of $Y'$ for different pulse positions. As disclosed in co-pending application Serial No. 217,478, $Y'$ is the inverse of the value Y and indicates the value "0" for the different pulse positions. This causes the signals passing through the gate circuit 262 to provide an indication of $(Y')(\Delta x)$ for the different pulse positions.

As previously disclosed, the right tube in the multivibrator 232 becomes cut off for negative $\Delta x$ increments. This causes a relatively high voltage to be produced on the plate of the right tube in the multivibrator 232 for introduction to the gate circuits 267 and 268. Because of its connection to the plate of the left tube in the multivibrator 206, the gate circuit 267 passes signals only when a relatively high voltage is introduced in the coil 28. Thus the signals passing through the gate circuit 267 provide an indication of $(Y)(-\Delta x)$.

As is well known, $(Y)(-\Delta x)$ is arithmetically equivalent to $(-Y)(+\Delta x)$. Furthermore, $-Y$ is equivalent to $+Y'$ since each indicates in binary form a low value which is the inverse of Y. Thus the signals passing through the gate circuit 267 effectively provide an indication of $(Y')(\Delta x)$ and correspond to the signals passing through the gate circuit 266. The signals from the gate circuits 266 and 267 may be designated as $Y_a'$ in a manner similar to that disclosed in U.S. Patent 2,900,134 and shown in Figures 45 and 46.

In like manner, the signals passing through the gate circuit 268 provide an indication of $(Y')(-\Delta x)$. Since $Y'$ is equivalent to $-Y$, $(Y')(-\Delta x)$ equals $(y)(+\Delta x)$. Thus, the signals passing through the gate circuit 268 correspond to the signals passing through the gate circuit 265 and provide an indication of a value designated as $Y_a$ in U.S. Patent 2,900,134.

The value $Y_a$ or $Y_a'$ for each pulse position in an integrator represents the particular value of the $y\Delta x$ increment which is obtained for the pulse position in the integrator when the pulse position is presented in its turn for computation. The value of $Y_a$ or $Y_a'$ is combined by the adder 272 with the signals from the multivibrator 202. As previously disclosed, these signals represent after the 22nd position for each integrator the cumulative value of the $y\Delta x$ increments for the integrator. In this way, the adder 272 obtains a new value of the cumulative $y\Delta x$ increments for the integrator every time that the integrator is presented for computation. The indications obtained by the adder 272 pass through the "or" network 224 for recordation by the coil 26 in the channel 14. These indications are subsequently utilized by the coil 22 and are thereafter erased by the coil 24 so that new indications may be inserted into the channel.

It should be appreciated that the adder 272 becomes operative only after the 22nd pulse position for each integrator because of its connection to the plate of the left tube in the multivibrator 248. Furthermore, the adder becomes operative only during the time that relatively high voltages are introduced to it from the plate of the left tube in the multivibrator 263 and from the movable contacts of the switches 256 and 258. As previously disclosed, relatively high voltages are simultaneously obtained from these members only during the time that the analyzer is actually computing a problem. Reviewing, the input lines to the adder 272, from top to bottom, are: a line carrying a two-state signal which must be high for the adder to operate; two lines individually carrying pulses representative of the value $y$, and the negation of these pulses; a line carrying pulses representing $y\Delta x$; a line carrying a two-state signal which must be high for the adder 272 to operate; a line carrying the negation of the pulses representing $y\Delta x$; and a line carrying the carry-digit pulses from the carry circuit 274.

It has been previously disclosed that an overflow in the cumulative value of the $y\Delta x$ increments for each integrator is obtained at pulse position 48 for the integrator. A positive overflow is indicated by a relatively high voltage from the adder 272 at this position, and a negative overflow is indicated by a relatively low voltage from the adder. Each positive overflow from the adder 272 at pulse position 48 passes through the gate circuit 282 and the "or" network 280 for recordation by the coil 36 in the channel 18. The gate circuit 282 opens at this position because of its connection through the line 250 to the counter 222. The gate circuit opens only during the time that the analyzer is actually proceeding with a computation since it has input terminals connected to the plate of the left tube in the multivibrator 263 and to the movable contacts of the switches 256 and 258.

During the first 47 positions of each integrator, the gate circuit 276 opens to recirculate the information in the channel 18. The gate circuit opens during these pulse positions because of its connection through the line 278 to the counter 222. The gate circuit opens only during periods of actual computation because of its connections to the plate of the left tube in the multivibrator 263 and to the movable contacts of the switches 256 and 258.

By the combined action of the gate circuits 276 and 282, the overflow information for each integrator is retained until the integrator is again presented for computation. At this time new overflow information is substituted for the old information. In this way, the most recent overflow information is made available to each integrator to provide for a proper determination of the $\Delta x$ and $\Delta y$ increments for the integrator.

The information in the channel 18 is made available to each integrator at the proper times during computation because of the precession provided by the multivibrators 210 and 211. The multivibrator 211 in effect delays the information from the multivibrator 210 by one pulse position and causes the information recorded in the channel 18 by the coil 36 to become available for utilization 49 pulse positions later instead of 48 pulse positions later. Since 49 pulse positions is one pulse position longer than a complete integrator, the overflow information in the channel 18 becomes available to each integrator at a different time from the other integrators. The necessity for precession during periods of actual computation is fully disclosed in the above-referenced U.S. Patent 2,900,134 beginning at line 57 of column 37, and in Figures 34 and 35 of the drawings.

The system disclosed in the Patent 2,900,134 is able to provide indications of only +1 or −1. It is not able to provide an indication of "0" for such values as $\Delta x$ and $\Delta y$. Furthermore, the system is not able to provide indications of "0" for the overflow into a channel corresponding to the channel 18 of the cumulative value of the $y\Delta x$ increments for an integrator.

Because of the ability of the analyzer to indicate values of only +1 or −1, the analyzer has to operate sometimes in what has been designated in the above-referenced Patent 2,900,134 as the "plus one-minus one" relationship. This relationship is fully disclosed in that patent application beginning at line 14 of column 43 of the specification and in Figure 43 of the drawings.

The "plus one-minus one" relationship can be seen by an example such as the addition of a value of $R=0$ to $Y_a=0$, where R is the value of the cumulative value of the $y\Delta x$ increments in the channel 14. As will be seen in Figure 17, a value of R for an integrator is represented by a binary indication of "0" in each information position in the channel 14 after the 22nd pulse position for the integrator. The value of $Y_a$ is also represented by a binary indication of 0 for each information position except for a binary indication of "1" in pulse position 47. A binary indication of "1" is provided in pulse position 47 for an integrator to indicate that the value of Y for the integrator is positive. This is shown in U.S. Patent 2,900,134.

Figure 17:
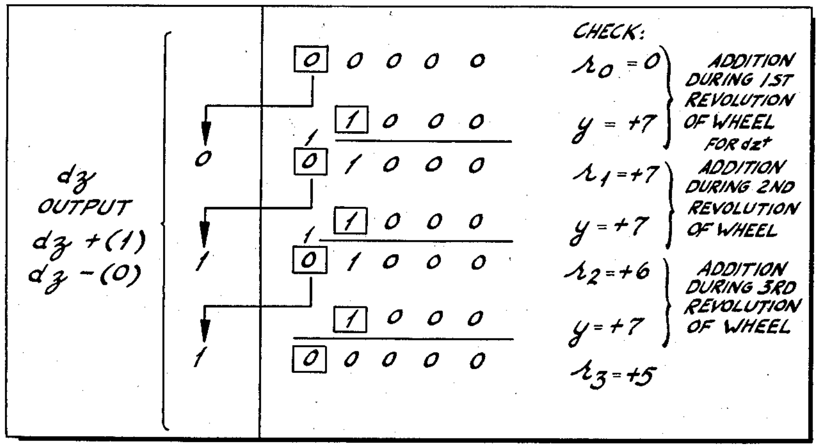
Figure 17 is a chart illustrating the operation of certain of the components forming a part of the analyzer shown in Figure 1 and in Figures 2 to 10, inclusive, when the analyzer is undergoing a special form of computation.

As will be seen in Figure 17, the addition of the binary indications representing $Y_a=0$ to the binary indications representing $R=0$ causes an overflow indication of "0" to be obtained the first time that the integrator is presented for computation. This binary value of "0" indicates that a negative overflow has occurred. The value of R after the addition is indicated in Figure 17 and is represented by a binary indication of "0" in each pulse position except position 47. In this position, a binary indication of "1" is provided.

Upon the presentation of the integrator for computation a second time, the addition of $Y_a=0$ to R causes a binary overflow of "1" to be obtained at pulse position 47. This binary value indicates that a positive overflow has occurred in the cumulative value of the $y\Delta x$ increments for the integrator. The value of R at the end of the integrator then returns to a binary indication of 0 for each pulse position including pulse position 47.

A positive overflow does not occur at pulse position 47 when $Y_a=0$ is added to R upon the next presentation of the integrator for computation. However, a positive overflow does occur at pulse position 47 when $Y_a=0$ is added to R upon the fourth presentation of the integrator for computation. It can thus be seen that the overflow indications from the integrator alternate between binary values of "0" and "1" upon successive presentations of the integrator for computation. The resultant value of all of the overflows is "0." This is the proper value since no overflow can actually occur when the value of $Y_a$ is 0.

As previously disclosed, the polarity of the $\Delta x$ and $\Delta y$ increments for each integrator are controlled by the overflow indications from certain other integrators dependent upon the problem to be solved. Because of this interrelationship, an integrator undergoing a "plus one-minus one" relationship as disclosed above may cause the polarity of the $\Delta x$ increments in a related integrator to vary alternately between "+1" and "−1". Similarly a $\Delta y$ increment for a related integrator may vary alternately between "+1" and "−1" upon the successive presentations of the integrator for computation.

When the $\Delta x$ increment for an integrator changes alternately from "+1" to "−1," this integrator may also undergo a "plus one-minus one" relationship for its output quantity if the value of the dependent quantity $y$ for the integrator remains substantially constant. It will thus be seen that the "plus one-minus one" relationship may occur in the output quantity for an integrator where the value of $Y_a$ for the integrator is different from 0 at the times that the integrator is presented for computation.

After the computation has proceeded for some time, an overflow in the cumulative value of the $y\Delta x$ increments may occur for a particular integrator such as integrator "7." Upon the occurrence of such an overflow, a signal passes through the gate circuit 306 (Figure 3), provided that that the switch 312 has previously been manually closed. A signal is able to pass through the gate circuit 306 only upon the closure of the switch 312 since only at this time is a relatively high voltage introduced to the gate circuit from the stationary contact of the switch 312. A signal passes through the gate circuit 306 only for integrator "7" because of the connection from the counter 290 through the line 310 to the gate circuit.

The signal passing through the gate circuit 306 triggers the left tube in the multivibrator 308 into a state of non-conductivity. Because of the connections to the gate circuit 306, the operation of the left tube in the multivibrator 308 may be given by the logical equation $$h_{M1}=P_{48}QI_7S_7G \qquad (1)$$

where:

$h_{M1}$=a signal introduced to the grid of the left tube in the multivibrator 308 to trigger the tube into a state of non-conductivity;

$P_{48}$=a high voltage on the line 250 at pulse position 48 for an integrator;

$I_7$=a high voltage on the line 310 to indicate integrator "7";

$S_7$=a high voltage on the stationary contact of the switch 312;

$Q$=a relatively high voltage from the adder 272 to indicate an overflow from the adder; and $G$=a relatively high voltage on the plate of the left tube in the multivibrator 263 to indicate that computation is actually proceeding.

Upon the production of a relatively high voltage on the plate of the left tube in the multivibrator 308, a signal passes through the "or" network 364 (Figure 3), the driver 296 (Figures 2 and 3) and the "or" network 294 (Figure 2) to the gate circuit 292 in Figure 2. Because of its particular connections, the gate circuit 292 then passes a signal at pulse position 48 of integrator "22." As will be noted, position 48 of integrator "24" constitutes the last pulse position in the analyzer before the integrators are again presented for computation in the next cycle of operation.

The signal passing through the gate circuit 292 triggers the right tube in the multivibrator 263 into a state of non-conductivity and causes the left tube in the multivibrator to become conductive. The triggering of the right tube in the multivibrator 263 by a signal passing through the gate circuit 292 from the driver 296 may be given by the following logical expression:

$$_{0}g=I_{22}GH_{M}C$$

where:

$_{0}g$=a signal introduced to the grid of the right tube in the multivibrator 263 to trigger the tube into a state of non-conductivity;

$I_{22}$=a relatively high voltage on the line 288 to indicate integrator "22";

$G$=a relatively high voltage on the plate of the left tube in the multivibrator 263 to indicate that computation has actually been proceeding;

$H_M$=a relatively high voltage passing through the driver 296 from a stage such as the plate of the left tube in the multivibrator 308 shown in Figure 3; and $C$=a signal produced by the coil 40 in each pulse position as the drum 10 rotates.

When the right tube in the multivibrator 263 becomes cut off, the resultant relatively low voltage on the plate of the left tube in the multivibrator prevents the adders 252 (Figure 2) and 272 from operating to obtain new values of $y$ and $y\Delta x$ for each integrator. The low voltage on the plate of the left tube in the multivibrator 263 also prevents the gate circuit 276 from passing the signals in the channel 18 in a precessing manner.

During the time that the left tube in the multivibrator 263 remains cut off to provide for actual computation by the analyzer, a relatively high voltage is introduced from the multivibrator to the gate circuit 302. Since the gate circuit 302 also receives a voltage through the line 250 from the counter 222, a signal passes through the gate circuit at pulse position 48 for each integrator. This signal causes the right tube in the multivibrator 286 to become cut off and the left tube to become conductive. The operation of the right tube in the multivibrator 286 can be expressed as:

$$_0g_1=P_{48}G \qquad (3)$$

where:

$_0g_1$=a relatively high voltage passing to the grid of the right tube the multivibrator 286 from the gate circuit 302 to trigger the tube into a state of non-conductivity; and $P_{48}$ and G have been previously defined in connection with Equation 1.

As disclosed above, the left tube in the multivibrator 263 becomes conductive upon an overflow at pulse position 48 for a control integrator such as integrator "7". The resultant relatively low voltage on the plate of the left tube in the multivibrator 263 prevents any signals from passing through the gate circuit 302. In spite of this, the right tube in the multivibrator 286 remains cut off. This results from the fact that a signal is unable to pass through the gate circuit 300 because of an inversion by the inverter 298 of the relatively high voltage from the driver 296. The operation of the driver 296 in producing a relatively high voltage at this time will be disclosed in detail hereinafter.

Since a signal is unable to pass through the gate circuit 300 to the grid of the left tube in the multivibrator 286, the left tube in the multivibrator remains conductive. The resultant relatively low voltage from the plate of the left tube in the multivibrator 286 prevents a signal from passing through the gate circuit 284 to trigger the left tube in the multivibrator 263 into a state of non-conductivity. In this way, the analyzer continues in a state of idling until the left tube in the multivibrator 263 is triggered into a state of non-conductivity.

When the right tube in the multivibrator 263 (Figure 2) becomes cut off and a high voltage is produced by the driver 296, a signal passes through the gate circuit 372 (Figure 3) to the grid of the normally conductive left tube in the multivibrator 330. This signal occurs at pulse position 48 for integrator "22" because of the connection of the gate circuit 372 through the line 250 to the counter 222 and through the line 350 to the counter 290. The signal passing through the gate circuit 372 triggers the left tube in the multivibrator 330 into a state of non-conductivity.

The operation of the left tube in the multivibrator 330 can be expressed by the logical equation $$m=H_MI_{22}P_{48}CG'M_0(\phi+\theta) \qquad (4)$$

$m$=a voltage introduced to the grid of the left tube in the multivibrator 330 to trigger the tube into a state of non-conductivity;

$H_M$=a relatively high voltage from the driver 296;

$I_{22}$=a relatively high voltage on the line 350 to indicate integrator "22";

$P_{48}$=a relatively high voltage on the line 250 to indicate pulse position 48 for each integrator;

$C$=the signal produced by the coil 40 for each pulse position;

$G'$=a relatively high voltage on the plate of the right tube in the multivibrator 263 to indicate that the analyzer is idling;

$M_0$=a relatively high voltage on the plate of the left tube in the multivibrator 350; and $\phi+\theta$=a relatively high voltage on the movable context of the switches 256 and 258 to indicate that the analyzer is either computing or idling.

Upon the triggering of the left tube in the multivibrator 330 into a state of non-conductivity, the right tube in the multivibrator becomes conductive. The right tube remains conductive for a relatively long period such as a few revolutions of the drum 10. The right tube in the multivibrator 330 remains conductive for this period because of the characteristics imparted to the different parameters in the multivibrator such as the capacitances coupling the plate of each tube to the grid of the other tube. After the drum 10 has revolved through the particular period such as a few revolutions, the monostable multivibrator 330 operates within itself to trigger the right tube in the multivibrator back into a state of non-conductivity. This causes a relatively high voltage to be produced on the plate of the right tube in the multivibrator for introduction to the gate circuit 372.

The gate circuit 372 then becomes prepared for the passage of a signal at pulse position 48 of integrator "22" the next time that integrator "22" is presented in the analyzer. At pulse position 48 of integrator "22", a signal passes through the gate circuit 372 to trigger the left tube in the multivibrator 330 into a state of non-conductivity. In this way, the left tube in the multivibrator 330 is triggered at periodical intervals into a state of non-conductivity during the time that the analyzer is idling.

At the time that the first signal passes through the gate circuit 372 to the grid of the right tube in the multivibrator 330, the right tubes in the multivibrators 318 (Figure 3), 320, 322, 324, and 342 are all cut off. In this pattern, the multivibrators provide an indication of the integer "1". After the left tube in the multivibrator 330 has become cut off for the first time and at the instant that the left tube subsequently becomes conductive by the internal operation of the multivibrator, a signal passes through the gate circuit 334.

The signal passing through the gate circuit 334 triggers the normally conductive left tube in the multivibrator 318 into a state of non-conductivity. The operation of the left tube in the multivibrator 318 is controlled by the logical equation $$m_1=M_0M_1', \qquad (5)$$

where:

$m_1$=a signal passing through the gate circuit 334 to trigger the left tube in the multivibrator 318 into a state of non-conductivity;

$M_0$=a relatively high voltage on the plate of the left tube in the multivibrator 330 and actually represents the trailing edge of the pulse of high voltage on the plate of the left tube in the multivibrator; and $M_1'$=a relatively high voltage on the plate of the right tube in the multivibrator 318.

The left tube in the multivibrator 318 remains cut off until the next time that a relatively high voltage is produced on the plate of the left tube in the multivibrator 330. As previously disclosed, this occurs after the passage of a second signal through the gate circuit 372. After the left tube in the multivibrator 330 has become cut off a second time, a signal passes through the gate circuit 326 and the "or" network 328 to the grid of the right tube in the multivibrator 318. This signal triggers the right tube in the multivibrator 318 into a state of non-conductivity.

The logical equation controlling the operation of the right tube in the multivibrator 318 by a signal passing through the gate circuit 326 can be represented as $$ {}_0m_1 = M_0M_1 \quad (6) $$

where:

${}_0m_1$=a signal passing to the grid of the right tube in the multivibrator 318 to trigger the tube into a state of non-conductivity;

$M_1$=a relatively high voltage on the plate of left tube in the multivibrator 318; and $M_0$ has been defined in the previous equation.

It will be seen that the left and right tubes in the multivibrator 318 become alternately cut off upon successive triggerings of the left tube in the multivibrator 330 into a state of non-conductivity. When the left tube in the multivibrator 318 becomes cut off a first time, a signal passes through the gate circuits 326 and 336 to the grid of the left tube in the multivibrator 320 to trigger the tube into a state of non-conductivity. The operation of the left tube in the multivibrator 320 is controlled by the logical equation $$ m_2 = M_0M_1M_2' \quad (7) $$

where:

$m_2$=a signal passing to the grid of the left tube in the multivibrator 320 to trigger the tube into a state of non-conductivity;

$M_2'$=a relatively high voltage on the plate of the right tube in the multivibrator 320; and $M_0$ and $M_1$ have previously been defined in Equations 5 and 6.

When the left tube in the multivibrator 318 again becomes cut off, a signal passes through the gate circuits 326 and 338 and the "or" network 340 to the grid of the right tube in the multivibrator 320. This signal causes the right tube in the multivibrator 320 to become cut off. The triggering action imposed on the right tube in the multivibrator 320 by a signal passing through the gate circuit 338 can be expressed as:

$$ {}_0m_2 = M_0M_1M_2 \quad (8) $$

where:

${}_0m_2$=a signal passing through the gate circuit 338 to trigger the right tube in the multivibrator 320 into a state of non-conductivity;

$M_2$=a relatively high voltage on the plate of the left tube in the multivibrator 320; and $M_0$ and $M_1$ have previously been defined.

As may be seen, the left and right tubes in the multivibrator 320 become alternately triggered into states of non-conductivity on successive instances that the left tube in the multivibrator 318 becomes non-conductive. Similarly, the left and right tubes in the multivibrator 322 become cut off upon successive triggerings of the left tube in the multivibrator 320 into a state of non-conductivity. The left and right tubes in the multivibrators 324 and 342 in turn become alternately cut off in accordance with successive instances that a relatively high voltage is produced on the plate of the left tube in the multivibrators 322 and 324, respectively.

The operation of the multivibrators 322, 324, and 342 can be given by the following logical expressions:

$$ m_3 = M_0M_1M_2M_3' \quad (9) $$

$$ {}_0m_3 = M_0M_1M_2M_3 \quad (10) $$

$$ m_4 = M_0M_1M_2M_3M_4' \quad (11) $$

$$ {}_0m_4 = M_0M_1M_2M_3M_4 \quad (12) $$

$$ m_5 = M_0M_1M_2M_3M_4M_5' \quad (13) $$

$$ {}_0m_5 = M_0M_1M_2M_3M_4M_5 \quad (14) $$

where:

$m_3$=a signal passing to the grid of the left tube in the multivibrator 322 to trigger the tube into a state of non-conductivity;

$M_3$=a relatively high voltage on the plate of the left tube in the multivibrator 322;

${}_0m_3$=a signal passing to the grid of the right tube in the multivibrator 322 to trigger the tube into a state of non-conductivity;

$M_3'$=a relatively high voltage on the plate of the right tube in the multivibrator 322; and $m_5$, ${}_0m_5$, $M_5$ and $M_5'$, $m_4$, ${}_0m_4$, $M_4$ and $M_4'$ are corresponding signals and voltages for the multivibrators 324 and 342, respectively; and The other terms have previously been defined.

As will be seen, a signal passes through the "or" network 328 from the gate circuit 331 as well as from the gate circuit 326. A signal passes through the gate circuit 331 at the end of the period for initially filling information into the analyzer. A signal passes through the gate circuit 330 at this time because of the inversion by the inverter 332 of the voltage on the stationary contact of the switch 256. Since the switch 259 is open during the filling operation, a relatively low voltage is produced on the stationary contact of the switch 256 and this voltage is converted by the inverter 332 into a high voltage for introduction to the gate circuit 331. In this way, the gate circuit 331 operates to insure that the multivibrator 318 is placed in proper operation at the beginning of the period of actual computation so that the multivibrator will provide an indication of "0" at this time.

The signal from the gate circuit 331 not only passes through the "or" network 328 to the grid of the right tube in the multivibrator 318 but also through the "or" network 340 to the grid of the right tube in the multivibrator 320 and through corresponding "or" networks to the grids of the right tubes in the multivibrators 322, 324, and 342. The operation of the right tubes in the multivibrators 318, 320, 322, 324, and 342 is thus controlled in accordance with the logical equations:

$$ {}_0m_1 = \phi' C \quad (15) $$

$$ {}_0m_2 = \phi' C \quad (16) $$

$$ {}_0m_3 = \phi' C \quad (17) $$

$$ {}_0m_4 = \phi' C \quad (18) $$

$$ {}_0m_5 = \phi' C \quad (19) $$

where:

$\phi'$=a relatively low voltage on the stationary contact of the switch 256; and $C$=a signal from the coil 40 for each pulse position; and the other terms have previously been defined.

Every time that the left tube in the multivibrator 330 becomes cut off after the passage of a signal through the gate circuit 372, the gate circuit 482 (Figure 6) becomes triggered into a state of non-conductivity. This results in the passage of a signal to the multivibrator 484. The operation of the left tube in the multivibrator 484 can be logically expressed as $$ a = M_0H_{M_1} \quad (20) $$

where:

$a$=a signal passing through the gate circuit 482 to the grid of the left tube in the multivibrator 484 to trigger the tube into a state of non-conductivity;

$M_0$=a relatively high voltage on the plate of the left tube in the multivibrator 330; and $H_{M1}$=a relatively high voltage on the plate of the left tube in the multivibrator 308.

When the left tube in the multivibrator 484 becomes triggered into a state of non-conductivity, it remains cut off for a particular period of time such as one or two revolutions of the drum. During this time, sufficient current flows from the plate of the left tube in the multivibrator 484 through the solenoid 480 to produce an actuation of the armature 478. The actuation of the armature 478 in turn produces a downward movement of the pawl 476 and a rotation of the sprocket wheel 470 through an angular distance equivalent to one tooth on the wheel. This causes the tape 170 to be moved forwardly from one of the holes 172 to the next hole in the sequence.

With the tape 170 disposed in a particular position, the switch 486 may be positioned above one of the holes 174. Since the switch is spring-loaded, the movable contact extends downwardly through the hole and engages the stationary contact of the switch. This causes current to flow through a circuit shown in Figure 10 and including the battery 262, the switch 486 and the resistance 665. The resultant relatively high voltage on the stationary contact of the switch 486 causes the gate circuit 656 to become opened when integrator "5" is presented in the analyzer. A signal then passes through the gate circuit 656 and the "or" network 655 to the gate circuit 652.

Because of the connections to its input terminals, the gate circuit 652 opens only upon the production of a relatively high voltage on the plate of the left tube in the multivibrator 308. As previously disclosed, such a voltage is produced during the time that the analyzer is idling as a result of an overflow in control integrator "7." The signal from the gate circuit 652 passes through the "or" network 650 to the gate circuit 646, which also receives voltages from the drivers 444 and 644.

As will be disclosed in detail hereafter, the driver 644 has a high voltage only at a particular pulse position for each integrator. Since the high voltage passing to the gate circuit 646 from the "or" network 650 occurs only for integrator "5," a signal passes through the gate circuit 646 only at a particular pulse position for integrator "5." This signal passes through the "or" networks 667 and 668 to the coil 32 for recordation in the channel 16.

The operation of the gate circuits 656, 652, and 646 in providing for the recordation in the channel 16 of a signal at a particular position in integrator "5" may be expressed by the following logical equation:

$$Y = A_1 I_5 H_{M_1} N Y_1 \qquad (21)$$

where:

$Y$=a relatively high voltage recorded in the channel 16 for a particular pulse position;

$A_1$=a relatively high voltage on the stationary contact of the switch 486 upon the closure of the switch;

$I_5$=a relatively high voltage on the line 622 to indicate integrator "5";

$H_{M_1}$=a relatively high voltage on the plate of the left tube in the multivibrator 308;

$N$=a relatively high voltage from the driver 444; and $Y_1$=a relatively high voltage from the driver 644 at a particular pulse position for each integrator.

In like manner, the switch 488 in Figure 6 closes when it is positioned above a hole in the sequence of holes 176. Upon the closure of switch 488, a relatively high voltage is produced on the stationary contact of the switch for introduction to the gate circuit 658. The gate circuit 658 also receives a relatively high voltage from the line 624 upon the presentation of integrator "6" during each revolution of the drum "10." The gate circuit 658 then passes a signal through the "or" network 655 to the gate circuit 652.

Upon the introduction of a signal from the gate circuit 658, the gate circuit 652 operates in conjunction with the gate circuit 646 to pass a signal to the coil 32 at a particular pulse position in integrator "6." This pulse position corresponds to the pulse position in integrator "5" at which the gate circuit 646 passes a signal to the channel 16. In this way, a signal is recorded in the channel 16 at the same pulse position for both integrators "5" and "6."

The operation of the gate circuits 658, 652 and 646 in providing for the recordation of information in the channel 16 at a particular pulse position for integrator "6" may be expressed as follows:

$$Y = B_1 I_6 H_{M_1} N Y_1 \qquad (22)$$

where:

$B_1$=a relatively high voltage on the stationary contact of the switch 488;

$I_6$=a relatively high voltage on the line 624 to indicate integrator "6" and Y, $H_{M_1}$, N and $Y_1$ have previously been defined in Equation 21.

In like manner, signals are recorded in the channel 16 in other pulse positions for integrators "5" and "6" as the tape 170 is advanced by the solenoid 480 shown in Figure 6. The signals are recorded in the different pulse positions for integrators "5" and "6" in accordance with the pattern of the holes 174 and 176, respectively. The pattern of the holes 174 and 176 is dependent upon the value of the function to be inserted into the analyzer, as will be disclosed in detail hereafter.

It has previously been disclosed that the multivibrators 318, 320, 322, and 324 shown in Figure 3 count on a digital basis from "1" to "16." The pattern of operation of the different multivibrators for successive digits between "1" and "16" is shown in Figure 17. As shown in Figure 17, the integer "1" represents a relatively high voltage on the plate of the left tube in a particular multivibrator, and the value "0" represents a relatively high voltage on the plate of the right tube in the multivibrator. This pattern is compared by the gate circuit 430 (Figure 5) with the signals from the multivibrators 432, 434, 436, 438, 440, and 442.

In co-pending application Serial No. 217,478, it has been disclosed that multivibrators corresponding to the multivibrators 432, 434, 436, 438, 440, and 442 count the pulse positions for each integrator from "1" to "48." For each pulse position, the multivibrators 432, 434, 436, 438, 440 and 442 have a different pattern of operation. For example, the pattern of operation of the multivibrators for pulse positions 32 to 47 of each integrator is shown in Figure 19. As shown in Figure 19, the integer "1" represents a relatively high voltage on the plate of the left tube in a particular multivibrator, and the value "0" represents a relatively high voltage on the plate of the right tube in the multivibrator.

The gate circuit 430 compares the pattern of indications in the multivibrators 318, 320, 322, and 324 with the pattern of indications in the multivibrators 432, 434, 436, 448, 440, and 442. For example, the gate circuit 430 opens only at pulse position 32 when the multivibrators 318, 320, 322, and 324 are operative in a pattern representing the integer "1." Similarly, the gate circuit 430 opens at pulse positions 33, 34, 35, etc., when the multivibrators 318, 320, 322, and 324 indicate values of "2," "3," "4," etc. In this way the gate circuit 430 opens in the successive pulse positions between pulse position 32 and pulse position 47 as the tape 170 is advanced by the solenoid 480.

It will be seen that the gate circuit 430 actually comprises a somewhat complex inter-relationship of "and" circuits and "or" networks. The gate circuit has been represented in the drawings as a single block for purposes of convenience because of the belief that persons skilled in the art will understand its operation from the above disclosure and from the following logical equation:

$$\begin{aligned} Y_1 = {} & F_1F_2F_3F_4F_5'F_6M_1'M_2'M_3'M_4' \qquad (23) \\ & + F_1'F_2'F_3'F_4'F_5F_6M_1M_2'M_3'M_4' \\ & + F_1F_2'F_3'F_4'F_5F_6M_1'M_2M_3'M_4' \\ & + F_1'F_2F_3'F_4'F_5F_6M_1M_2M_3'M_4' \\ & + F_1F_2F_3'F_4'F_5F_6M_1'M_2'M_3M_4' \\ & + F_1'F_2'F_3F_4'F_5F_6M_1M_2'M_3M_4' \\ & + F_1F_2'F_3F_4'F_5F_6M_1'M_2M_3M_4' \\ & + F_1'F_2F_3F_4'F_5F_6M_1M_2M_3M_4' \\ & + F_1F_2F_3F_4'F_5F_6M_1'M_2'M_3'M_4 \\ & + F_1'F_2'F_3'F_4F_5F_6M_1M_2'M_3'M_4 \\ & + F_1F_2'F_3'F_4F_5F_6M_1'M_2M_3'M_4 \\ & + F_1'F_2F_3'F_4F_5F_6M_1M_2M_3'M_4 \end{aligned}$$

$$+F_1F_2F_3'F_4F_5F_6M_1'M_2'M_3M_4 +F_1'F_2'F_3F_4F_5F_6M_1M_2'M_3M_4$$
$$+F_1F_2'F_3F_4F_5F_6M_1'M_2M_3M_4 +F_1'F_2F_3F_4F_5F_6M_1M_2M_3M_4$$

where:

$Y$=a signal passing through the gate circuit 430 and the driver 444;

$F_1$, $F_2$, $F_3$, $F_4$, $F_5$, and $F_6$=relatively high voltages on the plates of the left tubes in the multivibrators 432, 434, 436, 438, 440, and 442, respectively;

$F_1'$, $F_2'$, $F_3'$, $F_4'$, $F_5'$, and $F_6'$=relatively high voltages on the plates of the right tubes in the multivibrators 432, 434, 436, 438, 440, and 442, respectively; and $M_1$, $M_2$, $M_3$, $M_4$ have previously been defined.

As previously disclosed, information is inserted into the channel 16 in pulse positions 32 to 47, inclusive, for integrators "5" and "6." This information is inserted into the channel 16 in accordance with the coded information represented by the sequences of holes 174 and 176 in the tape 170. The reason for inserting information into two integrators such as integrators "5" and "6" will now be disclosed in detail.

In accordance with the Gregory-Newton formula, a function $$y=f(u) \qquad (24)$$

may be represented in quadratic form by $$y=f(a+nw)+x\Delta f(a+nw)+\frac{x(x-1)}{2}\Delta^2 f(a+nw) \qquad (25)$$

where:

$$u=a+xw \qquad (26)$$

The derivation of the above information is shown in "The Calculus of Finite Differences" by Whittaker and Robinson and in other authoritative mathematical treatises. In Equation 25, $f(a+nw)$ represents one of a series of tabular values $f(a)$, $f(a+w)$ . . . $f(a+nw)$ . . .

By differentiating Equation 25 with respect to $x$, $$\frac{dy}{dx}=\Delta f(a+nw)+\left(x-\frac{1}{2}\right)\Delta^2 f(a+nw) \qquad (27)$$

Equation 4 may be actually written as $$dy=dx\Delta f(a+nw)+dx\left(x-\frac{1}{2}\right)\Delta^2 f(a+nw) \qquad (28)$$

Similarly, the differentiation of Equation 27 with respect to $x$ gives $$\frac{d^2y}{dx^2}=\Delta^2 f(a+nw) \qquad (29)$$

Figure 18:
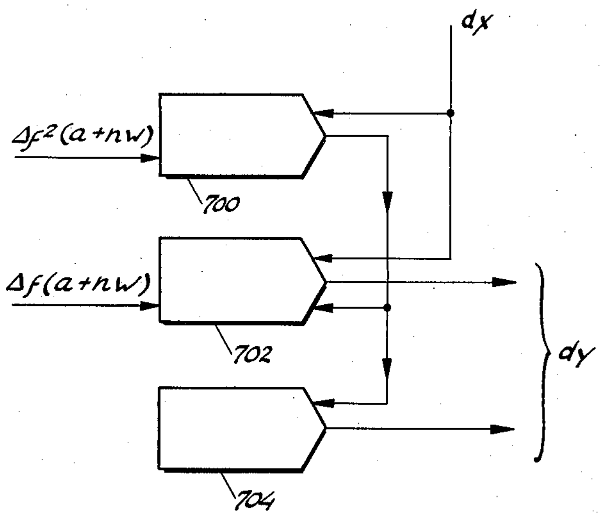
Figure 18 is a schematic diagram illustrating the relationship between different integrators which receive empirical information for utilization by the analyzer.

A convenient way of obtaining Equation 28 with only three integrators is shown in Figure 18. These integrators are designated as 700, 702, and 704 in Figure 18. As will be seen, the value $\Delta f^2(a+nw)$ is inserted into the integrator 700 as the dependent quantity for the integrator and the value $\Delta f(a+nw)$ is inserted into the integrator 702 as the dependent quantity for that integrator. The integrators 700 and 702 may actually correspond to integrators "5" and "6" in the above discussion.

Since the dependent quantity for the integrator 700 equals $\Delta f^2(a+nw)$ and since the independent quantity introduced to the integrator represents $dx$, the output from the integrator 700 represents $dx\Delta f^2(a+nw)$. The output from this integrator is introduced to the integrator 704 as the independent quantity for the integrator. By inverting these indications and shifting them by one pulse position, the integrator 704 produces an output quantity equal to $\frac{1}{2}dx\Delta f^2(a+nw)$.

The output from the integrator 700 is also introduced to the integrator 702 as part of the dependent quantity for the integrator. Since the integrator 702 also has the value $\Delta f(a+nw)$ introduced to it as part of its dependent quantity, the resultant value of the dependent quantity for the integrator is $\Delta f(a+nw)+xdx\Delta f^2(a+nw)$. By differentially combining the dependent quantity for the integrator 702 with the value of $dx$ representing the independent quantity, an output equal to $$dx\Delta f(a+nw)+xdx\Delta f^2(a+nw)$$

Thus, the combined output quantities from the integrators 702 and 704 represent the value of $dy$ given in Equation 28. This value may then be utilized as an empirical value in other integrators dependent upon the problem to be solved.

Since the tape 170 can only be moved in a forwardly direction by the solenoid 480, the value $x$ can only increase as the computation proceeds. In mathematics, the term "monotonic" is generally applied to a function which can only increase or remain constant but which cannot decrease. Since $dx$ is the quantity which is monotonic, the quantity $y$ obtained from the integrators 702 and 704 is a function of a monotonic argument. Although $y$ is the function of a monotonic argument, its value may either increase or decrease at any time.

Since "time" is a monotonic argument in that it can only increase, the quantity $y$ from the integrators 702 and 704 may be "time." Actually, if integrator "7" controlling the operation of the integrator 308 (Figure 3) representing $H_{m1}$ has a constant value for its dependent quantity, an overflow in the cumulative value of the $y\Delta x$ increments for the integrator will be periodically obtained. Since a $\Delta x$ increment for the integrators 700 and 702 representing integrators "5" and "6" can only be obtained upon an overflow from integrator "7," the $\Delta x$ increments for these integrators will represent time.

When the information in the tape 170 has been filled in pulse positions 32 to 47, inclusive, for integrators "5" and "6," the left tubes in the multivibrators 318, 320, 322, and 324 shown in Figure 3 are cut off. This pattern of operation by the multivibrators corresponds to an indication of "16" by the multivibrators. Upon such a pattern of operation in the multivibrators 322, 324, 326, and 328, a signal passes through the gate circuit 316 and triggers the right tube in the multivibrator 308 into a state of non-conductivity. The operation of the right tube in the multivibrator 308 can be expressed by the logical equation:

$$O^hM_1=M_1M_2M_3M_4 \qquad (30)$$

where:

$O^hM_1$=a signal passing through the gate circuit 316 to trigger the right tube in the multivibrator 308 into a state of non-conductivity; and The other terms have previously been defined.

The left tube in the multivibrator 316 becomes conductive upon the triggering of the right tube in the multivibrator and causes a relatively low voltage to be produced on its plate. Since this voltage is introduced to the driver 296, the driver prevents a signal from passing through the gate circuit 372 to trigger the right tube in the multivibrator 330 into a state of non-conductivity. This prevents the multivibrator 482 shown in Figure 6 from being triggered to advance the tape 170. The signals also cannot be recorded from the tape in the channel 16 because of the operation of the relatively low voltage on the plate of the left tube in the multivibrator 308 in preventing signals from passing through the gate circuit 652 shown in Figure 10.

The relatively low voltage from the driver 296 causes the gate circuit 300 (Figure 2) to open for the passage of a signal to the grid of the left tube in the multivibrator 286. This signal triggers the left tube in the multivibrator 286 into a state of non-conductivity and causes a relatively high voltage to be produced on the plate of the tube. Upon the production of this high voltage, the gate circuit 284 opens at pulse position 48 of integrator "22" and passes a signal to the grid of the left tube in the multivibrator 263.

The signal passing through the gate circuit 284 triggers the left tube in the multivibrator 263 into a state of non-conductivity so that a relatively high voltage is produced on the plate of the tube. The relatively high voltage on the plate of the left tube in the multivibrator 263 is introduced to the gate circuits 276 and 282 and to the adders 252 and 272 to produce an operation of these stages. The operation of these stages causes computation for the solution of a mathematical problem to be resumed.

The logical equation controlling the triggering of the left tube in the multivibrator 263 into a state of non-conductivity by a signal passing through the gate circuit 284 is $$g=P_{48}I_{22}G'G_1 \qquad (31)$$

where:

$g$=a signal passing to the grid of the left tube in the multivibrator 263 to trigger the tube into a state of non-conductivity;

$G'$=a relatively high voltage on the plate of the right tube in the multivibrator 263;

$G_1$=a relatively high voltage on the plate of the left tube in the multivibrator 286; and The other terms have previously been defined.

As disclosed above, the tape 170 can only be moved in a forwardly direction. Because of this, the information recorded in integrators "5" and "6" relates to a function of a monotonic argument. Sometimes it is desired to record empirical information relating to a function of a non-monotonic argument. In such a function, the value of the independent quantity at times increases and at other times decreases. This may be seen in Figure 13 where the value of $x$ may initially have a value 710, may subsequently advance to a value 712 and may thereafter decrease to the value 710. In such a function, the value of the dependent quantity may increase at times and decrease at other times just as in a function of a monotonic argument.

Since a function of a non-monotonic argument may have either an increase or a decrease in the value of its independent quantity, the tape 490 shown in Figure 7 may either be moved forwardly by energizing the solenoid 502 or backwardly by energizing the solenoid 508. The energization of the solenoids 502 and 508 is controlled by the operation of the multivibrators 368, 370, and 378 shown in Figure 4.

The operation of the left tube in the multivibrator 378 is controlled by signals passing through the "or" network 380. Signals pass through the "or" network 380 from the gate circuit 382 to indicate a positive $\Delta x$ increment for a control integrator such as integrator "11." Integrator "11" is similar in its operation for functions having a non-monotonic argument to the operation of integrator "7" for functions having a monotonic argument. A signal can pass through the gate circuit 382 only when the switch 388 has been manually caused to produce a relatively high voltage on the stationary contact of the switch.

A signal is able to pass through the gate circuit 382 only at pulse position 47 for integrator "11." This results from the connection to the gate circuit of the line 384 from the counter 222. Pulse position 47 is chosen to insure that the information from the multivibrator 232 is still available for utilization. As previously disclosed, the multivibrator 232 indicates a positive $\Delta x$ increment when a relatively high voltage is produced on the plate of the left tube in the integrator.

The signal passing through the network 382 triggers the left tube in the multivibrator 378 into a state of non-conductivity. The operation of the multivibrator 378 by a signal passing through the gate circuit 382 can be logically expressed as follows:

$$f_M=P_{47}B_5I_{11}S_{11}H_1'E_1' \qquad (32)$$

where:

$f_M$=a signal passing to the grid of the left tube in the multivibrator 378 to trigger the tube into a state of non-conductivity;

$P_{47}$=a relatively high voltage on the line 384 to indicate pulse position 47 for each integrator;

$I_{11}$=a relatively high voltage on the line 386 to indicate Integrator "11" in each revolution of the drum 10;

$S_{11}$=a relatively high voltage on the stationary contact of the switch 388;

$H_1'$=a relatively high voltage on the plate of the right tube in the multivibrator 368; and $E_1'$=a relatively high voltage on the plate of the right tube in the multivibrator 370.

The reason for including $H_1'$ and $E_1'$ in the above logical equation will be disclosed in detail hereinafter.

Just as the left tube in the multivibrator 378 is triggered into a state of non-conductivity to indicate a positive $\Delta x$ increment in integrator "11," the right tube in the multivibrator is triggered into a state of non-conductivity to indicate a negative $\Delta x$ increment for the integrator. The right tube in the multivibrator 378 is triggered into a state of non-conductivity by a signal passing through the gate circuit 392. The operation of the right tube in the multivibrator 378 can be expressed by the logical equation as follows:

$$_of_M=P_{47}B_5'I_{11}S_{11}H_1'E_1' \qquad (33)$$

where:

$_of_M$=a signal passing to the grid of the right tube in the multivibrator 378 to trigger the tube into a state of non-conductivity;

$B_5'$=a relatively high voltage on the plate of the right tube in the multivibrator 232 to indicate a negative $\Delta x$ increment; and The other terms in the equation have been defined in Equation 32.

The multivibrator 368 indicates the occurrence of an overflow in the cumulative value of the $y\Delta x$ increment at pulse position 48 for integrator "11." This results from the passage of a signal through the gate circuit 418 to the grid of the left tube in the multivibrator 368 to trigger the tube into a state of non-conductivity. The passage of a signal through the gate circuit 418 upon an overflow indication at pulse position 48 from integrator "11" occurs because of the connections to the gate circuit from the carry circuit 274 and through the lines 250 and 386 from the counters 222 and 290, respectively.

The operation of the left tube in the multivibrator 368 by a signal passing through the gate circuit 418 occurs in accordance with the following logical equation:

$$h_1=P_{48}D_2I_{11}S_{11}GH_1' \qquad (34)$$

where:

$h_1$=a signal passing to the grid of the left tube in the multivibrator 368 to trigger the tube into a state of non-conductivity;

$P_{48}$=a relatively high voltage on the line 250 to indicate pulse position 48 for each integrator;

$D_2$=a relatively high voltage from the carry circuit 274 during the operation of the adder 272 shown in Figure 2;

$G$=a relatively high voltage on the plate of the left tube in the multivibrator 263 to indicate that computation is actually proceeding; and The other terms have previously been defined.

When an overflow occurs in integrator "11" to trigger the left tube in the multivibrator 368 into a state of non-conductivity, the multivibrator 370 becomes operative. The multivibrator 370 then provides an indication as to whether the $\Delta x$ increment in the next cycle of computation has the same polarity as the $\Delta x$ increment which has just produced the overflow from integrator "11." The left tube in the multivibrator 370 becomes triggered into a state of non-conductivity to indicate that the two successive $\Delta x$ increments both have the same polarity, and the right tube in the multivibrator becomes triggered into a state of non-conductivity to indicate that the two successive $\Delta x$ increments have opposite polarities.

Since the gate circuit 396 is connected to the plate of the left tube in the multivibrator 378, it indicates that the $\Delta x$ increment in a first cycle of computation is positive. The gate circuit is also connected to the plate of the left tube in the multivibrator 232. Because of this connection, a relatively high voltage is introduced to the gate circuit 396 from the plate of the left tube in the multivibrator 232 to indicate a positive $\Delta x$ increment. In this way, the gate circuit 296 passes a signal when two successive $\Delta x$ increments are both positive.

Similarly, the gate circuit 400 passes a signal when two successive $\Delta x$ increments are both negative. This results from the introduction of input signals to the gate circuit from the plates of the right tubes in the multivibrators 232 and 378. The signals from the gate circuits 396 and 400 pass through the "or" network 404 to the gate circuit 406.

Upon an overflow in the cumulative value of the $y\Delta x$ increments for integrator "11," the gate circuit 406 passes a signal to the left tube in the multivibrator 370 to trigger the tube into a state of non-conductivity. The gate circuit 406 passes a signal at this time because of its connections to the plate of the left tube in the multivibrator 368 and through the line 386 to the counter 290. The gate circuit 406 passes a signal only when the computation is to proceed through more than one cycle. This results from the introduction to the gate circuit of signals from the plate of the left tube in the multivibrator 263 and from the stationary contact of the switch 258.

The operation of the left tube in the multivibrator 370 can be expressed logically as:

$$e_1=(F_MB_5+F_M'B_5')I_{11}S_{11}H_1E_1'G\theta \qquad (35)$$

where:

$e_1$=a signal passing to the grid of the left tube in the multivibrator 370 to trigger the tube into a state of non-conductivity;

$E_1'$=a relatively high voltage on the plate of the right tube in the multivibrator 370;

$\theta$=a relatively high voltage on the stationary contact of the switch 258 to indicate that the analyzer is undergoing more than one cycle of computation;

$F_M$=a relatively high voltage on the plate of the left tube in the multivibrator 378;

$F_M'$=a relatively high voltage on the plate of the right tube in the multivibrator 378; and The other terms have previously been defined.

It will be seen from the above equation that a relatively high voltage is produced on the plate of the left tube in the multivibrator 370 only when an overflow in integrator "11" is followed by a $\Delta x$ increment of the same polarity as the one which produced the overflow.

Just as the gate circuits 396 and 400 operate to indicate two successive $\Delta x$ increments of opposite polarity, the gate circuits 398 and 402 operate to indicate two successive $\Delta x$ increments of opposite polarity. Because of its connections, the gate circuit 398 indicates a first positive $\Delta x$ increment and a second negative $\Delta x$ increment. In like manner, the gate circuit 402 indicates that a first $\Delta x$ increment is negative and a second $\Delta x$ increment is positive.

The signals from the gate circuits 398 and 402 pass through the "or" network 408 to the gate circuit 410. Upon the passage of a signal through the gate circuit 410, the right tube in the multivibrator 370 is triggered into a state of non-conductivity. The operation of the right tube in the multivibrator 370 by a signal passing through the gate circuit 410 occurs when the following logical equation is true:

$$_0e_1=(F_MB_5+F_M'B_5')I_{11}S_{11}H_1E_1G\theta \qquad (36)$$

where:

$_0e_1$=a signal passing to the grid of the right tube in the multivibrator 370 to trigger the tube into a state of non-conductivity;

$E_1$=a relatively high voltage on the plate of the left tube in the multivibrator 370; and The other terms have previously been defined.

The simultaneous occurrence of relatively high voltages on the plates of the left tubes in the multivibrators 368 and 370 indicates that an overflow has occurred and that the next $\Delta x$ increment is of the same polarity as the $\Delta x$ increment producing the overflow. When these voltages become simultaneously high, they eliminate any possibility that the "plus one-minus one" relationship may be occurring. As previously disclosed, the "plus one-minus one" relationship for an integrator occurs during the time that the cumulative value of the $y\Delta x$ increments for an integrator is not actually changing or is not changing very rapidly. Because of this, positive and negative overflows from the integrator are alternately indicated by the analyzer.

By requiring the voltages on the plates of the left tubes in the multivibrators 368 and 370 to be simultaneously high, the cumulative value of the $y\Delta x$ increment for integrator "11" has to actually change. This change has to be sufficient to produce an overflow in the cumulative value of the $y\Delta x$ increments for the integrator. Only upon the simultaneous occurrence of such high voltages from the multivibrators 368 and 370 can a signal pass through the gate circuit 366 (Figure 3) and the "or" network 368 to the driver 296.

As previously disclosed, the right tube in the multivibrator 263 (Figure 2) is triggered by a signal passing through the gate circuit 292 upon the production of a relatively high voltage in the driver 296. The resultant production of a relatively low voltage on the plate of the left tube in the multivibrator 263 prevents the gate circuits 276 and 282 and the adders 252 and 272 from operating. In this way, the analyzer is unable to proceed with computation and idles until a relatively high voltage is produced on the plate of the left tube in the multivibrator 263 for the commencement of a new period of computation.

Upon the production of a relatively high voltage on the plate of the right tube in the multivibrator 263, signals are able to pass through the gate circuit 372 (Figure 3) to trigger the monostable multivibrator 330. Every time that the multivibrator 330 is triggered, either the monostable multivibrator 510 (Figure 7) or the monostable multivibrator 514 is triggered. When the $\Delta x$ increments producing the overflow in integrator "11" are positive, a signal passes through the gate circuit 512 and triggers the left tube in the monostable multivibrator 510 into a state of non-conductivity. This results from the connection of the gate circuit 512 to the plate of the left tube in the multivibrator 378.

The operation of the multivibrator 510 can be expressed as:

$$b_1=M_0H_1E_1F_M \qquad (37)$$

where:

$b_1$=a signal passing through the gate circuit 512 to the grid of the left tube in the multivibrator 510 to trigger the tube into a state of non-conductivity; and The other terms have been previously defined.

Upon the production of a relatively high voltage on the plate of the left tube in the multivibrator 510, a signal passes through the solenoid 502 to actuate the armature 500 and the pawl 498 for the rotation of the sprocket wheel 492 in a forwardly direction.

The tape 490 (Figure 7) is advanced in a forwardly direction by the solenoid 502 every time that the left tube in the multivibrator 330 becomes cut off. Upon the advancement of the tape 490, new holes in the sequences 520 and 522 are presented to the switches 524 and 526, respectively. When the switch 524 lies above a hole, it closes because of its spring loading. This causes a signal to pass through the gate circuit 662 (Figure 10) when a relatively high voltage is produced on the line 628 for a particular integrator such as integrator "9."

The signal from the gate circuit 662 passes through the "or" network 660, the gate circuit 654 and the "or" network 650 to the gate circuit 646 when the plates of the left tube in the multivibrators 368 and 370 are simultaneously high. The signal then passes through the gate circuit 646 at a particular pulse position in integrator "9" in accordance with the instructions from the driver 444. The signal passing through the gate circuit 646 is recorded by the coil 32 in the channel 16 at the particular pulse position for integrator "9."

The operation of the gate circuits 662, 654 and 646 in providing for the recordation of a signal in the channel 16 can be given as:

$$Y=B_1I_9H_1E_1NY_1 \quad (38)$$

where:

$Y$=the recordation of a high voltage in the channel 16 for a particular pulse position;

$B_1$=a relatively high voltage on the stationary contact of the switch 524;

$I_9$=a relatively high voltage on the line 628 to indicate integrator "9";

$Y_1$=a relatively high voltage from the driver 444 to indicate a particular pulse position between positions 32 and 47 for each integrator;

$N$=a relatively high voltage from the driver 644; and the other terminals have previously been defined.

Similarly, the switch 526 (Figures 7 and 10) closes when it is positioned above one of the holes 522 (Figure 7). Upon the closing of the switch 526, a signal passes through the gate circuits 664, 654 and 646 for the recordation of information in the channel 16 in the particular pulse position for integrator "10." The operation of the gate circuits 664, 654, and 646 may be expressed by the following logical equation:

$$Y=B_2I_{10}H_1E_1NY \quad (39)$$

where:

$B_2$=a relatively high voltage on the stationary contact of the switch 526;

$I_{10}$=a relatively high voltage on the line 630 to indicate the integrator "10"; and The other terms have previously been defined.

Upon each triggering of the multivibrator 330, information relating to a successive pulse position in the positions 32 to 47, inclusive, is filled from the tape 490 into the channel 16 for integrators "9" and "10." This information is inserted into the channel 16 to provide for the solution of Equation 28 by the integrators 700, 702 and 704 shown in Figure 18. As the information is filled into successive positions between positions 32 and 47, inclusive, the count in the multivibrators 318, 320, 322 and 324 digitally increases. At pulse position 47, the left tubes in the multivibrators 318, 320, 322 and 324 are all cut off. Since the left tube in the multivibrator 378 is also cut off for a positive $\Delta x$ increment, a signal passes through the gate circuit 414 (Figure 4) and the "or" network 420 and triggers the right tube in the multivibrator 368 into a state of non-conductivity. The logical equation controlling the triggering of the right tube in the multivibrator 368 by a signal passing through the gate circuit 414 is:

$${}_0h_1=F_MM_1M_2M_3M_4 \quad (40)$$

A signal also passes through the gate circuit 414 and the "or" network 412 and triggers the right tube in the multivibrator 370 into a state of non-conductivity. The triggering of the right tube in the multivibrator 370 by such a signal can be expressed as:

$${}_0e_1=F_MM_1M_2M_3M_4 \quad (41)$$

Since relatively high voltages are no longer produced on the plates of the left tubes in the multivibrators 368 and 370, the driver 296 no longer produces a relatively high voltage. This causes the left tube in the multivibrator 363 to be triggered into a state of non-conductivity and computation to be resumed.

Similarly, a signal passes through the gate circuit 516 (Figure 7) when the $\Delta x$ increments producing an overflow in integrator "11" are negative. This results from the connection of the gate circuit 516 to the plate of the right tube in the multivibrator 378. The signal passing through the gate circuit 516 triggers the left tube in the multivibrator 514 into a state of non-conductivity. The logical equation controlling the operation of the left tube in the multivibrator 514 by a signal passing through the gate circuit 516 is:

$$b_2=M_0H_1E_1F_M' \quad (42)$$

where:

$b_2$=a signal passing to the grid of the left tube in the multivibrator 514 to trigger the multivibrator into a state of non-conductivity;

$F_M'$=a relatively high voltage on the plate of the right tube in the multivibrator 378; and The other terms have previously been defined.

Every time that the left tube in the multivibrator 514 becomes cut off, sufficient current flows through the solenoid 508 to actuate the armature 506. The armature 506 actuates the pawl 504 to produce a rotation of the sprocket wheel through an arc equivalent to one tooth. The sprocket wheel 594 rotates in an opposite direction to the rotation produced on the sprocket wheel 470 by the solenoid 502. This causes the tape 490 to move in a rearwardly direction.

The tape 490 moves through a distance equivalent to that between successive holes 518 every time that the left tube in the multivibrator 330 is cut off. Furthermore, with each triggering of the left tube in the multivibrator 330, the count produced by the multivibrators 318, 320, 322, 324 and 342 (Figure 3) advances by one integer. When the tape 490 has moved backwardly through 32 positions, the count provided by the multivibrators 318, 320, 322, 324 and 342 is equal to "32." At this count, the left tube in the multivibrator 342 becomes cut off.

The left tube in the multivibrator 342 becomes triggered into a state of non-conductivity upon a count of "16," as shown logically by Equation 13 above. Equation 14 indicates that the right tube in the multivibrator 342 becomes triggered into a state of non-conductivity upon a count of "32." At this instant, the left tube in the multivibrator 342 becomes conductive. The resultant fall in voltage on the plate of the left tube in the multivibrator 342 causes a signal to pass through the "or" network 380 and the left tube in the multivibrator 378 to be triggered into a state of non-conductivity. By triggering the left tube in the multivibrator 378 into a state of non-conductivity, the negative polarity of the $\Delta x$ increments is in effect changed into a positive polarity.

Since the left tubes in the multivibrators 368 and 370 are still cut off, signals now pass through the gate circuit 512 (Figure 7) every time that the left tube in the multivibrator 330 becomes cut off. These signals trigger the left tube in the multivibrator 510 into a state of non-conductivity and produce a forward movement of the tape 474 as disclosed above. In this way, the tape 490 is advanced in a forwardly direction through 16 positions until relatively high voltages are simultaneously produced on the plates of the left tubes in the multivibrators 318, 320, 322 and 324.

After the tape 490 has moved forwardly through 16 positions, a signal passes through the gate circuit 414 (Figure 4) as disclosed above and triggers the right tubes in the multivibrators 368 and 370 into states of non-conductivity. A signal passes through the gate circuit 414 at this time because of the relatively high voltage on the plate of the left tube in the multivibrator 378. Computation is resumed when the right tubes in the multivibrators 368 and 370 become cut off.

As will be seen, for a negative $\Delta x$ increment the tape 490 is first retracted through 32 pulse positions. The first 16 positions relate to coded information for the $\Delta x$ increment previously inserted into the analyzer. If the tape were retracted only through the first 16 positions, a constant value would be recorded in the analyzer. By retracting the tape through the second plurality of 16 positions, prior information other than that just recorded in the tape is made available for recordation.

The analyzer constituting this invention not only operates to introduce empirical information into certain integrators in the analyzers but also operates to provide a permanent record of certain information being computed by the analyzer. Just as the operation of the analyzer is interrupted by an overflow in control integrators "7" and "11" to provide for the insertion of new information into the analyzer, the operation of the analyzer is interrupted by an overflow in control integrator "22" to provide a permanent record of certain quantities being computed by the analyzer. Upon an overflow in control integrator "22," a signal passes through the gate circuit 348 (Figure 3) and triggers the left tube in the multivibrator 346 into a state of non-conductivity.

The operation of the left tube in the multivibrator 346 by a signal passing through the gate circuit 348 can be expressed by the logical equation:

$$h_{M3}=P_{48}I_{22}S_{22}QG\theta \qquad (43)$$

where:

$h_{M3}$=a signal passing to the grid of the left tube in the multivibrator 346 to trigger the tube into a state of non-conductivity;

$I_{22}$=a relatively high voltage on the stationary contact of the switch 352;

$Q$=a relatively high voltage from the adder 272 to indicate a carry from pulse position 47 to pulse position 48 of integrator "22";

$G$=a relatively high voltage on the plate of the left tube in the multivibrator 263 to indicate that computation has actually been proceeding; and $\theta$=a relatively high voltage on the stationary contact of the switch 238 to indicate that the analyzer is undergoing more than one cycle of computation. As will be seen, the switch 352 must be manually closed in order for a permanent record to be made of an output quantity.

The relatively high voltage on the plate of the left tube in the multivibrator 346 passes through the "or" network 364 (Figure 3) and the driver 296 to the gate circuit 292 (Figure 2). As previously disclosed, a signal then passes through the gate 292 and triggers the right tube in the multivibrator 263 into a state of non-conductivity. This prevents computation from proceeding until the left tube in the multivibrator 263 becomes subsequently triggered into a state of non-conductivity.

When a relatively high voltage is produced by the driver 296, signals pass periodically through the gate circuit 372 (Figure 3) and trigger the multivibrator 330. Every time that the trailing edge of a high voltage pulse is produced on the plate of the left tube in the multivibrator 330, a signal passes through the gate circuit 616 (Figure 9) to the grid of the left tube in the multivibrator 594. This signal triggers the left tube in the multivibrator 594 into a state of non-conductivity. The logical equation controlling the triggering of the left tube in the multivibrator 594 is $$j=\theta H_{M3}M_0 \qquad (44)$$

where:

$j$=a signal passing to the grid of the left tube in the multivibrator 594 to trigger the tube into a state of non-conductivity;

$H_{M3}$=a relatively high voltage on the plate of the left tube in the multivibrator 346; and $M_0$ has previously been defined.

The triggering of the left tube in the multivibrator 594 causes a relatively high voltage to be produced on the plate of the tube. Because of this high voltage, sufficient current flows through the solenoids 592 (Figure 8) for the solenoid armatures to attract the armature 544. The punch hammer 542 then pivots in a clock-wise direction on the pin 543. As the hammer pivots, it moves the stud 558 and the finger 556 upwardly so that a hole is punched by the finger in the tape 530. This hole forms one of the sequence of holes 536. The pivotal movement of the hammer 542 also causes the pawl 554 to be actuated so as to produce a rotation of the sprocket wheel 532 through an arc equivalent to one tooth on the sprocket wheel. This causes the tape 530 to be advanced through a distance equivalent to that between a pair of adjacent holes 536.

As the hammer 542 moves in a clockwise direction as a result of the triggering action on the multivibrator 594, it engages the movable contact of the switch 579 and produces an electrical discontinuity between the movable and stationary contacts of the switch. The resultant opening of the switch 544 causes the voltage on the cathode of the right tube in the multivibrator 594 to rise. This rise in voltage in turn causes the right tube in the multivibrator 594 to become cut off. The right tube in the multivibrator 594 becomes cut off only after the tape 530 has advanced from one position to the next.

After the right tube in the multivibrator 594 becomes cut off, the information in a pair of integrators such as integrators "8" and "12" is recorded on the tape 530 in coded form. Information is recorded for a pair of integrators so that this information may be subsequently introduced to a pair of integrators such as the integrators 700 and 702 in Figure 18 for utilization in the solution of other mathematical problems. As previously disclosed, the integrators 700, 702 and 704 operate on the information introduced to the integrators 700 and 702 to provide information relating to an empirical quantity.

The information in integrators "8" and "12" is recorded on the tape 530 (Figure 8) after the tape has been advanced to a new position upon the triggering of the left tube in the multivibrator 594. Recordation of a positive signal for a particular pulse position in the channel 16 for control integrator "8" is provided by a signal passing through the gate circuits 604 (Figure 9) and 600 to the grid of the left tube in the multivibrator 590. This signal triggers the left tube in the multivibrator 590 into a state of nonconductivity. The operation of the left tube in the multivibrator 590 may be logically expressed as:

$$y_2=YI_8Y_1J'H_{M3}C \qquad (45)$$

where:

$y_2$=a signal passing to the grid of the left tube in the multivibrator 590 to trigger the tube into a state of non-conductivity;

$I_8$=a relatively high voltage on the line 606 to indicate integrator "8";

$Y$=a relatively high voltage in the channel 16 for a particular pulse position;

$Y_1$=a relatively high voltage from the driver 444 to indicate a particular pulse position for each integrator;

$J'$=a relatively high voltage on the plate of the right tube in the multivibrator 594 to indicate that the tape 590 has been advanced; and The other terms have previously been defined.

The relatively high voltage produced on the plate of the left tube in the multivibrator 590 causes sufficient current to flow through the solenoid 588 (Figure 8) for the solenoid to actuate the armature 586. The armature in turn pivots the lever 584 in a clockwise direction and causes the lever to pivot the bell case lever 580 in a counter-clockwise direction against the action of the latch spring 582. Such a pivotal move of the bell crank lever 580 releases it from the detent 568 so that the spring 570 is free to move the selector bar 564 to a position under the finger 556. Because of the positioning of the selector bar 564 under the finger 556, the hammer 542 moves the selector bar and the finger upwardly when the hammer is subsequently pivoted. The upward movement of the finger 556 causes a hole to be punched in the tape to form one of the sequence of holes 538.

In case a relatively low voltage has been recorded in the channel 16 in a particular pulse position for integrator "8," the right tube in the multivibrator 590 (Figures 8 and 9) is triggered into a state of non-conductivity by a signal passing through the gate circuits 604 (Figure 9) and 602. The logical equation controlling the triggering of the right tube in the multivibrator 590 can be logically expressed as:

$$_0y_2 = Y'I_8Y_1J'H_{M3}C \qquad (46)$$

where:

$_0y_2$=a signal passing to the grid of the right tube in the multivibrator 590 to trigger the tube into a state of non-conductivity;

$Y'$=a relatively low voltage in the channel 16 for a particular pulse position; and The other terms have previously been defined.

Since the right tube in the multivibrator 590 is cut off, the left tube in the multivibrator is conductive and a relatively low voltage is produced on the plate of the tube. This prevents the solenoid 588 (Figure 8) from being energized sufficiently to actuate the armature 586. The bell crank lever is thus maintained in engaging relationship with the detent 568 so as to prevent the selector bar 564 from being shifted to a position under the finger 556. In this way, the hammer 542 is not able to move the finger 562 upwardly when it is thereafter pivoted.

In like manner, a hole is punched in one of the sequences of holes 540 when a relatively high voltage has been recorded for a particular pulse position in the channel 16 for integrator "12." This hole is punched because of the triggering of the left tube in the multivibrator 600 (Figure 9) into a state of non-conductivity by a signal passing through the gate circuits 604 and 608. The operation of the left tube in the multivibrator 600 can be logically expressed as:

$$y_3 = YI_{12}Y_1J'H_{M3}C \qquad (47)$$

where:

$y_3$=a signal passing to the grid of the left tube in the multivibrator 600 to trigger the tube into a state of non-conductivity;

$I_{12}$=a relatively high voltage on the line 612 to indicate integrator "12"; and The other terms have previously been defined.

A hole is not punched at a particular position in the sequence of holes 540 (Figure 8) when a relatively low voltage has been recorded in the channel 16 for a particular pulse position in integrator "12." This results from the triggering of the right tube in the multivibrator 600 (Figure 9) by a signal passing through the gate circuits 604 and 610. The triggering of the right tube in the multivibrator 600 is controlled by the logical equation:

$$_0y_3 = Y'I_{12}Y_1J'H_{M3}C \qquad (48)$$

where:

$_0y_3$=a signal passing to the grid of the right tube in the multivibrator 600 to trigger the tube into a state of non-conductivity; and The other terms have previously been defined.

As the tape 530 advances from one position to the next, the count in the multivibrator 318, 320, 322 and 324 also increases on a digital basis. When the count reaches a value of "16" represented by a relatively high voltage on the plates of the left tube in the multivibrator 318, 320, 322 and 324, a signal passes through the gate circuit 358 (Figure 3). A signal passes through the gate circuit 358 at this time because of the relatively high voltage on the plate of the left tube in the multivibrator 346. The signal from the gate circuit 358 passes through the "or" network 356 and triggers the right tube in the multivibrator 346 into a state of non-conductivity.

The triggering of the right tube in the multivibrator 346 by a signal passing through the gate circuit 358 can be logically expressed as $$_0h_{M3} = M_1M_2M_3M_4H_{M3} \qquad (49)$$

where:

$_0h_{M3}$=a signal passing to the grid of the right tube in the multivibrator 346 to trigger the tube into a state of non-conductivity; and The other terms have been previously defined.

Ordinarily a relatively low voltage is produced by the driver 296 when the right tube in a control multivibrator such as the multivibrator 346 is triggered into a state of non-conductivity. However, the signal from the gate circuit 358 passes to the grid of the left tube in the multivibrator 360 as well as to the grid of the right tube in the multivibrator 346. This signal triggers the left tube in the multivibrator 360 into a state of non-conductivity and causes a relatively high voltage to be produced on the plate of the tube. The high voltage from the multivibrator 360 passes through the "or" network 364 to the driver 296 to maintain the voltage from the driver relatively high. The production of a relatively high voltage on the plate of the left tube in the multivibrator 360 is controlled by the logical equation:

$$g_p = M_1M_2M_3M_4H_{M3} \qquad (50)$$

where:

$g_p$=a signal passing to the grid of the left tube in the multivibrator 360 to trigger the tube into a state of non-conductivity; and The other terms have been previously defined.

The production of the relatively high voltage on the plate of the left tube in the multivibrator 360 continues for substantially one revolution of the drum 10 through each of the different integrators. This results from the fact that the multivibrators 318, 320, 322 and 324 are triggered upon the introduction of a relatively high voltage from the multivibrator 330, which itself becomes triggered at pulse position 48 of integrator "22." Because of the connections to the gate circuit 362, a signal passes through the gate circuit to the grid of the right tube in the multivibrator 360 at the beginning of integrator "22". the next time that integrator "22" appears. This signal triggers the right tube in the multivibrator 360 into a state of non-conductivity. The logical equation controlling the operation of the right tube in the multivibrator 360 is:

$$_0g_p = G_pP_1I_{22}S_{22} \qquad (51)$$

where:

$_0g_p$=a signal passing to the grid of the right tube in the multivibrator 360 to trigger the tube into a state of non-conductivity;

$G_p$=a relatively high voltage on the plate of the left tube in the multivibrator 360; and The other terms have been previously defined.

When pulse position 32 of each integrator is presented for computation, a signal passes through the gate circuits 446 (Figure 5) and 448 and the "or" network 456 to the grid of the left tube in the multivibrator 458. The signal triggers the left tube in the multivibrator 458 into a state of non-conductivity. The logical equation controlling the triggering of the left tube in the multivibrator 458 by the signal passing through the gate circuits 446 and 448 is:

$$t = F_1F_2F_3F_4F_5'F_6M_4'C \qquad (52)$$

where:

$t$=a signal passing to the grid of the left tube in the multivibrator 458 to trigger it into a state of non-conductivity; and The other terms have been previously defined.

The term $M_4'$ is included since the right tube in the multivibrator 324 is cut off during the time that information in the tapes 170 (Figure 6) and 490 (Figure 7) is being filled into the analyzer in pulse positions 32 to 39, inclusive, for particular integrators. The right tube in the multivibrator 324 is also cut off during the time that information in pulse positions 32 to 39, inclusive, for other integrators is being recorded in the tape 539 (Figure 8).

Upon the presentation of pulse position 39 in each integrator, the right tube in the multivibrator 458 becomes cut off by a signal passing through the gate circuits 446 and 452 and the "or" network 460. The triggering of the right tube in the multivibrator is controlled by the logical expression:

$$_0t=F_1'F_2F_3F_4'F_5F_6M_4'G_p'C \quad (53)$$

where:

$_0t$=a signal passing to the grid of the right tube in the multivibrator 458 to trigger the tube into a state of non-conductivity;

$G_p'$=a relatively high voltage on the plate of the right tube in the multivibrator 360; and The other terms have previously been defined.

The term $M_4'$ is included since the right tube in the multivibrator 324 is cut off during the pulse positions 32 and 39 inclusive, for each integrator. The term $G_p'$ is included since the right tube in the multivibrator 360 is cut off at all times, except for one revolution of the drum 10 after the left tubes in the multivibrators 318, 320, 322 and 324 have become cut off.

At pulse position 39, the left tube in the multivibrator 324 becomes cut off during the time that information is being inserted into the analyzer from the tapes 170 and 490 and during the time that information is being recorded into the tape 530 from the analyzer. The left tube in the multivibrator 324 then remains cut off between pulse positions 40 and 47, inclusive. When the left tube in the multivibrator 324 becomes cut off, a signal passes through the gate circuits 446 and 450 and the "or" network 456 at pulse position 40 to the grid of the left tube in the multivibrator 458. This signal triggers the left tube in the multivibrator 458 into a state of non-conductivity. The triggering action imposed on the left tube in the multivibrator 458 by a signal passing through the gate circuits 446 and 450 can be logically expressed as:

$$t=F_1F_2F_3F_4'F_5F_6M_4C \quad (54)$$

where all of the terms have previously been defined.

As previously disclosed, the last tube in the multivibrator 458 becomes cut off at pulse position 32 for each integrator and becomes conductive after pulse position 39. Since the left tube in the multivibrator 458 then becomes cut off again at pulse position 40 during the time that empirical information is being inserted into the analyzer or is being recorded from the analyzer, the left tube in the multivibrator 458 is effectively cut off for all pulse positions between pulse positions 32 and 47, inclusive, for each integrator during the operation of the analyzer on empirical information. At pulse position 47, the right tube in the multivibrator 458 becomes cut off by a signal passing through the gate circuits 446 and 454 and the "or" network 460. The operation of the right tube in the multivibrator 460 by such a signal can be expressed by the logical equation:

$$_0t=F_1'F_2F_3F_4F_5F_6C \quad (55)$$

It has previously been disclosed that information is recorded into integrators "5" and "6" or into integrators "9" and "10" during the time that a relatively high voltage has been produced by the driver 644 shown in Figure 10. The driver 644 produces a relatively high voltage for a particular pulse position in integrator "5" and "6" during the time that the analyzer is idling because of the production of a relatively high voltage on the plate of the left tube in the integrator 308 (Figures 3 and 10). The particular pulse position is represented by a relatively high voltage from the driver 444 (Figures 5 and 10). The driver 644 also produces a relatively high voltage for the particular pulse position in integrators "9" and "10" when the plates of the left tubes in the multivibrators 368 and 370 are simultaneously cut off. As previously disclosed, the left tube in the multivibrators 368 and 370 are cut off during the time that empirical information is being inserted from the tape 490 (Figure 7) into integrators "9" and "10."

In addition to producing a relatively high voltage at particular times as disclosed above, the driver 644 also produces a relatively high voltage between positions 32 and 47, inclusive, for integrators "8" and "12" during the time that a relatively high voltage is produced on the plate of the left tube in the multivibrator 360. As previously disclosed, the left tube in the multivibrator 360 is cut off during the time that information is being recorded in the tape 530 (Figure 8) and specifically during the last revolution of the drum 10 before computation is resumed. The logical equation controlling the production of a relatively high voltage by the driver 644 is $$N=Y_1G'[(I_5+I_6)H_{m1}+(I_9+I_{10})H_1E_1]+G_pT(I_8+I_{12}) \quad (56)$$

$N$=a relatively high voltage from the driver 644;

$G_p$=a relatively high voltage on the plate of the left tube in the multivibrator 360;

$T$=a relatively high voltage on the plate of the left tube in the multivibrator 458; and The other terms have been previously defined.

During the time that empirical information is being inserted into the analyzer in integrators "5" and "6" or in integrators "9" and "10," the information already inserted into the channel 16 for these integrators is recirculated. The information is recirculated by signals passing through the "or" network 676, the gate circuit 674 and the "or" network 668 to the coil 32. The gate circuit opens to provide such a recirculation because of the connection of the "or" network 676 to the inverter 678, which inverts the signals from the driver 644. As disclosed above, a relatively high voltage is produced by the driver 644 only during the particular pulse position in which empirical information is being inserted into integrators "5" and "6" or into integrators "9" and "10."

In addition to the recirculation of empirical information previously inserted into integrators "5" and "6" or into integrators "9" and "10," the coding information in each of the integrators is also recirculated during the time that the computer is idling between successive periods of computation. The recirculation of coding information occurs because of the operation of the "or" network 676, the gate circuit 674 and the "or" network 668. One of the input terminals of the "or" network 676 is connected to the plate of the right tube in the multivibrator 248. Since the left tube in the multivibrator 248 is cut off only after the first 22 positions for each integrator, a relatively high voltage is produced on the plate of the right tube in the multivibrator for the first 22 positions of each integrator. This voltage opens the gate circuit 674 for the recirculation of the coding information in the channel 16 for each integrator.

The "or" network 676 also receives signals from the inverter 680, which is connected to the movable contacts of the switches 256 and 258. Because of the operation of the inverter 680, a relatively high voltage is introduced to the "or" network 676 from the inverter when a low voltage is produced on the movable contacts of the switches 256 and 258. As previously disclosed, a low voltage is produced on the movable contacts of the switches 256 and 258 during the time that information is being filled into the analyzer before the initiation of actual computation. This causes the information inserted into the analyzer during the "fill" operation to be recirculated in the channel.

The operation of the "or" network 676, the gate circuit 674 and the "or" network 668 in recirculating information in the channel 16 can be expressed as $$Y_0=Y[N'+\phi'\theta'+S'] \quad (57)$$

where:

$Y_0$=a relatively high voltage passing to the coil 32 for a particular pulse position for recordation in the channel 16;

$Y$=a relatively high voltage induced in the coil 28 for a particular pulse position;

$N'$=a relatively low voltage from the driver 644;

$\phi'\theta'$=a relatively low voltage on the movable contacts of the switches 256 and 258; and $S'$=a relatively high voltage on the plate of the right tube in the multivibrator 248.

After the information in integrators "8" and "12" has been recorded in coded form on the tape 530, the information is eliminated from the channel 16 so that a fresh step of computation can be initiated. The information is eliminated for all pulse positions except pulse position 47 because of the operation of the gate circuit 670, which opens at pulse position 31 for integrators "8" and "12" during the time that a relatively high voltage is produced on the plate of the left tube in the multivibrator 360. The information at pulse position 47 is made positive in the channel 16 for integrators "8" and "12" since a positive pulse at this position associated with no pulses in other positions indicates that the dependent quantity for the integrator is zero. The insertion of a positive pulse only at pulse position 47 for integrators "8" and "12" is controlled by the logical equation $$Y=YG_pP_{47}(I_8+I_{12})$$

where all of the terms have previously been defined.

It should be appreciated that the system disclosed above for inserting empirical information into the analyzer and for recording information computed by the analyzer can be incorporated into other digital differential analyzers than that disclosed in U.S. Patent 2,900,134. For example, the system disclosed above can be easily adapted for use with the digital differential analyzer disclosed in U.S. Patent 2,850,232.

Although this invention has been disclosed and illustrated with reference to particular inventions, the principles involved are suspectible of numerous other inventions which will be apparent to persons skilled in the art. The invention is, therefore, to be limited only as indicated by the scope of the appended claims.

What is claimed is:

1. A digital differential analyzer comprising: a plurality of integrators, each including, a first integrator register means for accumulating signal-represented variations in a dependent quantity of a mathematical function, second integrator register means, transfer means adapted to receive signal-represented variations in an independent quantity of a mathematical function, said transfer means functioning to register in said second register means signal-represented values of the product of the value accumulated in said first register means and said variations in an independent quantity, upon each occurrence of said signal-represented variations in an independent quantity; means for forming output signals upon the occurrence of a predetermined value in said second register; means for interconnecting said integrators whereby said output signals from certain of said integrators are introduced to other of said integrators as variations in a quantity of said mathematical function; information storage means to function in conjunction with said plurality of integrators for storing information signals and means for replacing the content of selected of said integrator register means, under control of said output signals, with information signals from said storage means.

2. A digital differential analyzer comprising: a plurality of integrators, each including, a first integrator register means for accumulating signal-represented variations in a dependent quantity of a mathematical function, second integrator register means, transfer means adapted to receive signal-represented variations in an independent quantity of a mathematical function, said transfer means functioning to register in said second register means signal-represented values of the product of the value accumulated in said first register means and said variations in an independent quantity, upon each occurrence of said signal-represented variations in an independent quantity; means for forming output signals upon the occurrence of a predetermined value in said second register; means for interconnecting said integrators whereby said output signals from certain of said integrators are introduced to other of said integrators as variations in a quantity of said mathematical function; information storage means to function in conjunction with said plurality of integrators for storing information signals and means for replacing the content of selected of said first integrator register means, under control of said output signals, with information signals from said storage means.

3. A digital differential analyzer comprising: a plurality of integrators, each including, a first integrator register means for accumulating signal-represented variations in a dependent quantity of a mathematical function, second integrator register means, transfer means adapted to receive signal-represented variations in an independent quantity of a mathematical function, said transfer means functioning to register in said second register means signal-represented values of the product of the value accumulated in said first register means and said variations in an independent quantity, upon each occurrence of said signal-represented variations in an independent quantity; means for forming output signals upon the occurrence of a predetermined value in said second register; means for interconnecting said integrators whereby said output signals from certain of said integrators are introduced to other of said integrators as variations in a quantity of said mathematical function; means adapted to be connected to receive information signals representative of certain information dependent upon a problem to be solved; and means for replacing the content of selected of said integrator register means, under control of said output signals, with said certain information represented by said information signals.

4. Apparatus according to claim 3 wherein said integrator register means comprise magnetic register means, and wherein said storage means comprise punch-tape means.

5. A digital differential analyzer comprising: a plurality of integrators, each including, a first integrator register means for accumulating signal-represented variations in a dependent quantity of a mathematical function, second integrator register means, transfer means adapted to receive signal-represented variations in an independent quantity of a mathematical function, said transfer means functioning to register in said second register means signal-represented values of the product of the value accumulated in said first register means and said variations in an independent quantity, upon each occurrence of said signal-represented variations in an independent quantity; means for forming output signals upon the occurrence of a predetermined value in said second register; means for interconnecting said integrators whereby said output signals from certain of said integrators are introduced to other of said integrators as variations in a quantity of said mathematical function; storage means for storing information; means for replacing the content of selected of said integrator register means, under control of said output signals, with information signals from said storage means; and means for controlling said storage means in accordance with the sign of the value represented by said output signals.

References Cited in the file of this patent

UNITED STATES PATENTS

| | | |
|---|---|---|
| 2,701,095 | Stibitz | Feb. 1, 1955 |
| 2,749,037 | Stibitz | June 5, 1956 |
| 2,787,416 | Hansen | Apr. 2, 1957 |
| 2,850,232 | Hagen et al. | Sept. 2, 1958 |
| 2,852,187 | Beck | Sept. 16, 1958 |

FOREIGN PATENTS

| | | |
|---|---|---|
| 1,055,460 | France | May 5, 1952 |
| 745,816 | Great Britain | Mar. 7, 1956 |

OTHER REFERENCES

"A New Type of Differential Analyzer," by Bush and Caldwell, Journal of the Franklin Institute, vol. 240, No. 4, October 1945, pages 255–326.

Mathematical Tables and Other Aids to Computation (MTAC–1), vol. VI, No. 38, pages 102–112, April 1952.

Math Tables and Other Aids to Computation, "Fundamental Concepts of the Digital Differential Analyzer Method of Computation," vol. VI, No. 37, January 1952, pages 41 to 53.